United States Patent [19]

Farley et al.

[11] Patent Number: 5,257,185
[45] Date of Patent: Oct. 26, 1993

[54] INTERACTIVE, CROSS-REFERENCED KNOWLEDGE SYSTEM

[75] Inventors: Ann W. Farley, 319 Ridgewood Rd., West Hartford, Conn. 06107; Clifford I. Waggoner, East Granby, Conn.; James W. Dutton, West Hartford, Conn.; David C. Allabaugh, East Granby, Conn.

[73] Assignee: Ann W. Farley, West Hartford, Conn.

[21] Appl. No.: 526,398

[22] Filed: May 21, 1990

[51] Int. Cl.$^5$ .................................... G06F 15/18
[52] U.S. Cl. .................... 364/419.19; 395/600
[58] Field of Search .............. 364/419, 200, 900; 395/600

[56] References Cited

U.S. PATENT DOCUMENTS

| | | | |
|---|---|---|---|
| 4,764,867 | 8/1988 | Hess | 364/200 |
| 4,868,733 | 2/1989 | Fujisawa | 364/200 |
| 4,905,163 | 2/1990 | Garber | 364/513 |
| 4,945,476 | 7/1990 | Bodick | 364/413.02 |
| 4,982,344 | 1/1991 | Jordan | 364/521 |

Primary Examiner—Donald E. McElheny, Jr.
Assistant Examiner—Andrew Bodendorf
Attorney, Agent, or Firm—Chilton, Alix & Van Kirk

[57] ABSTRACT

A knowledge system having a development configuration by which a knowledge engineer enters knowledge content into a database, and a user configuration employed by the end user to access the database for interactive learning, information retrieval, and problem solving in a specified subject area. The knowledge is organized by a hierarchy of topic nodes, with each node having an associated plurality of cross referenceable information units representing a variety of types, or categories, of information. The user can control the navigation path and information display sequence among information units in accordance with personal learning needs and style. One category can include a pattern of prompts and possible responses. The separation of knowledge content from program logic permits non-programmers to set up, modify, and maintain the knowledge content of the system.

24 Claims, 55 Drawing Sheets

| QUAL-IFIERS | TOPIC/SUB-TOPIC | CHAL. | KNOW. | REF. | WHAT'S HOT | CO. POL. | HELP | SUBJ. GLOSS. | GEN. GLOSS. | MS-CARD-FILE |
|---|---|---|---|---|---|---|---|---|---|---|
| C | PHONES | 70 C | 58 C | 62 C | 64 C | 66 C | 68 C | | | |
| B | Rotary | B | B | B | B | B | B | | | |
| B,E | Touch | B,E | B,E | B,E | B,E | B,E | B,E | | | |
| C | ANSWER MACHINES | C | C | C | C | C | C | | | |
| B | Budget | B | B | B | B | B | B | | | |
| B | Deluxe | B | B | B | B | B | B | | | |

KNOWLEDGEBASE STRUCTURE

TABLE OF CONTENTS

| QUAL-IFIERS | TOPIC/SUB-TOPIC | CHAL. | KNOW. | REF. | WHAT'S HOT | CO. POL. | HELP | SUBJ. GLOSS. | GEN. GLOSS. | MS-CARD-FILE |
|---|---|---|---|---|---|---|---|---|---|---|
| C | PHONES | 70 C | 58 C | 62 C | 64 C | 66 C | 68 C | | | |
| B | Rotary | B | B | B | B | B | B | | | |
| B,E | Touch | B,E | B,E | B,E | B,E | B,E | B,E | | | |
| C | ANSWER MACHINES | C | C | C | C | C | C | | | |
| B | Budget | B | B | B | B | B | B | | | |
| B | Deluxe | B | B | B | B | B | B | | | |

KNOWLEDGEBASE STRUCTURE

FIG. 4

USER COMPONENT

MAIN WINDOW

USER COMPONENT

SESSIONS OPTIONS

USER COMPONENT

CHOOSING A SUBJECT

USER COMPONENT

CHALLENGER WINDOW

USER COMPONENT

RESPONDING TO A CHALLENGER PROMPT/QUESTION

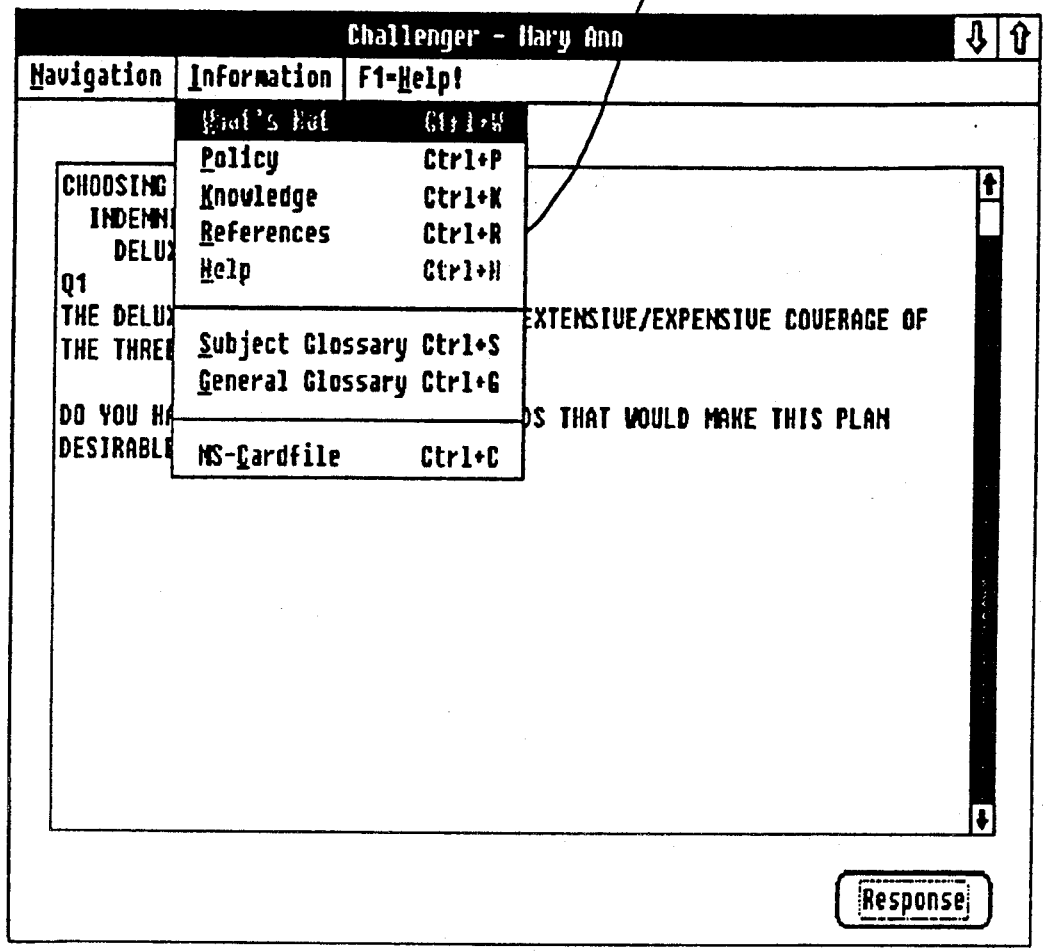
USER COMPONENT
CHALLENGER: ACCESSING SUPER-REF
FIG. 10

USER COMPONENT

RESPONDING TO CHALLENGER PROMPT/QUESTION

USER COMPONENT

MAIN WINDOW: SELECTING BROWSE SUBJECT

USER COMPONENT

BROWSE SUBJECT: TABLE OF CONTENTS WINDOW

USER COMPONENT: BROWSE SUBJECT

VIEWING MULTIPLE CATEGORIES: TEXT AND GRAPHICS

USER COMPONENT: BROWSE SUBJECT

VIEWING MULTIPLE CATEGORIES: TEXT AND GRAPHICS

USER COMPONENT: BROWSE SUBJECT

VIEWING MULTIPLE CATEGORIES: TEXT AND GRAPHICS

USER COMPONENT

REPORTS MODE: SELECTING REPORTS

SYSTEM HELP WINDOW

OUTLINE

```
SUBJECT    (level 1)

TOPIC 1   (level 2)

Subtopic   (level 3)
      Subtopic   (level 3)

Subtopic   (level 4)
         Subtopic   (level 4)

TOPIC 2   (level 2)

Subtopic   (level 3)
```

OUTLINE MAINTENANCE PROGRAM

HIERARCHY OF TOPICS

FIG. 17

SUBJECT: UTILITIES

```
OPERATIONS

Definition

Standard Operations
                Special Operations

Description

Diversity
                Management Experience
                Finances

LAWS AND REGULATIONS

Agencies
```

OUTLINE MAINTENANCE

SAMPLE OUTLINE

FIG. 18

OUTLINE MAINTENANCE: TABLE DEFINITION OF TOPIC NODES

OUTLINE MAINTENANCE: TABLE DEFINITION OF TOPIC NODES

OUTLINE MAINTENANCE

ADDING/CHANGING SUBJECT NAME

OUTLINE MAINTENANCE

ADDING/CHANGING SUBJECT NAME

CONTENT MAINTENANCE

ADDING/CHANGING TOPIC NAME

CONTENT MAINTENANCE

ADDING/CHANGING TOPIC NAME

CONTENT MAINTENANCE

ADDING/CHANGING TOPIC NAME

CONTENT MAINTENANCE

ADDING/CHANGING TOPIC NAME

CONTENT MAINTENANCE

ADDING/CHANGING TOPIC NAME

FIG. 26

CONTENT MAINTENANCE

ADDING/CHANGING TOPIC NAME

CONTENT MAINTENANCE

ADDING/CHANGING CONTENT: SELECTING SUBJECT

```
                    264       260                    258
                      \         \                    /
                  ╔═══╤═════════╤════════════════════╤═══╗
                  ║ □ │  IP-E Content Maintenance - UTILITIES - ELECTRICITY │ ⇩ ║
                  ╟───┴─────────┴────────────────────┴───╢
                  ║ Subjects  Content-Entry  Reports...  Utilities  F1-Help! ║
                  ║              TABLE OF CONTENTS              ║
         ┌────────╫─────────────────────────────────────────────╢
         │        ║ UTILITIES - ELECTRICITY                R  ↑║
         │        ║   OPERATIONS                               ║
         │        ║     DEFINITION                          R  ║
   262───┤        ║       STANDARD OPERATIONS                  ║
         │        ║         GENERATORS                      K  ║
         │        ║         ELECTRICAL ENERGY               K  ║
         │        ║         TRANSFORMERS AND WIRES          K  ║
         │        ║         GENERATING STATIONS             K  ║
         │        ║       SPECIAL OPERATIONS                   ║
         │        ║       HOT TOPICS                     W  K  ║
         │        ║     DESCRIPTION                         R  ║
         │        ║       CHALLENGER/PLANT OWNERS       C    K ║
         │        ║       FOSSIL FUEL PLANTS                K  ║
         │        ║       HYDROELECTRIC PLANTS              K  ║
         │        ║       MATERIALS                         K  ║
         │        ║     HOT TOPICS                             ║
         │        ║   LAWS AND REGULATIONS                  R  ║
         │        ║     REGULATING AGENCIES             C    K ║
         │        ║     LAWS AND REGULATIONS            C    K ║
         │        ║     HOT TOPICS                       W  K ↓║
                  ╚═════════════════════════════════════════════╝
```

CONTENT MAINTENANCE

ADDING/CHANGING CONTENT: SELECTING TOPIC

FIG. 29

CONTENT MAINTENANCE

ADDING/CHANGING CONTENT: SELECTING CATEGORY

CONTENT MAINTENANCE

ADDING/CHANGING CHALLENGER PROMPTS/QUESTIONS

CONTENT MAINTENANCE

ADDING/CHANGING CHALLENGER PROMPTS/QUESTIONS

CONTENT MAINTENANCE

ADDING/CHANGING CHALLENGER PROMPTS/QUESTIONS

CONTENT MAINTENANCE

CHALLENGER: SELECTING USER RESPONSES

CONTENT MAINTENANCE

CHALLENGER: SELECTING USER RESPONSES

CONTENT MAINTENANCE

CHALLENGER: ADDING A NEW PROMPT/QUESTION

CONTENT MAINTENANCE

GLOSSARY

CONTENT MAINTENANCE

SELECTING TOPIC QUALIFIERS

USER NAVIGATION

| Table of Contents |
|---|
| A |
| B |
|   D |
|     F |
|     G |
|       K |
|       L |
| C |
|   E |
|     H |
|     I |
|     J |

← USER SELECTS

SINGLE STEP ACTIONS

| NEXT |

| MORE INFORMATION |

| PREVIOUS |

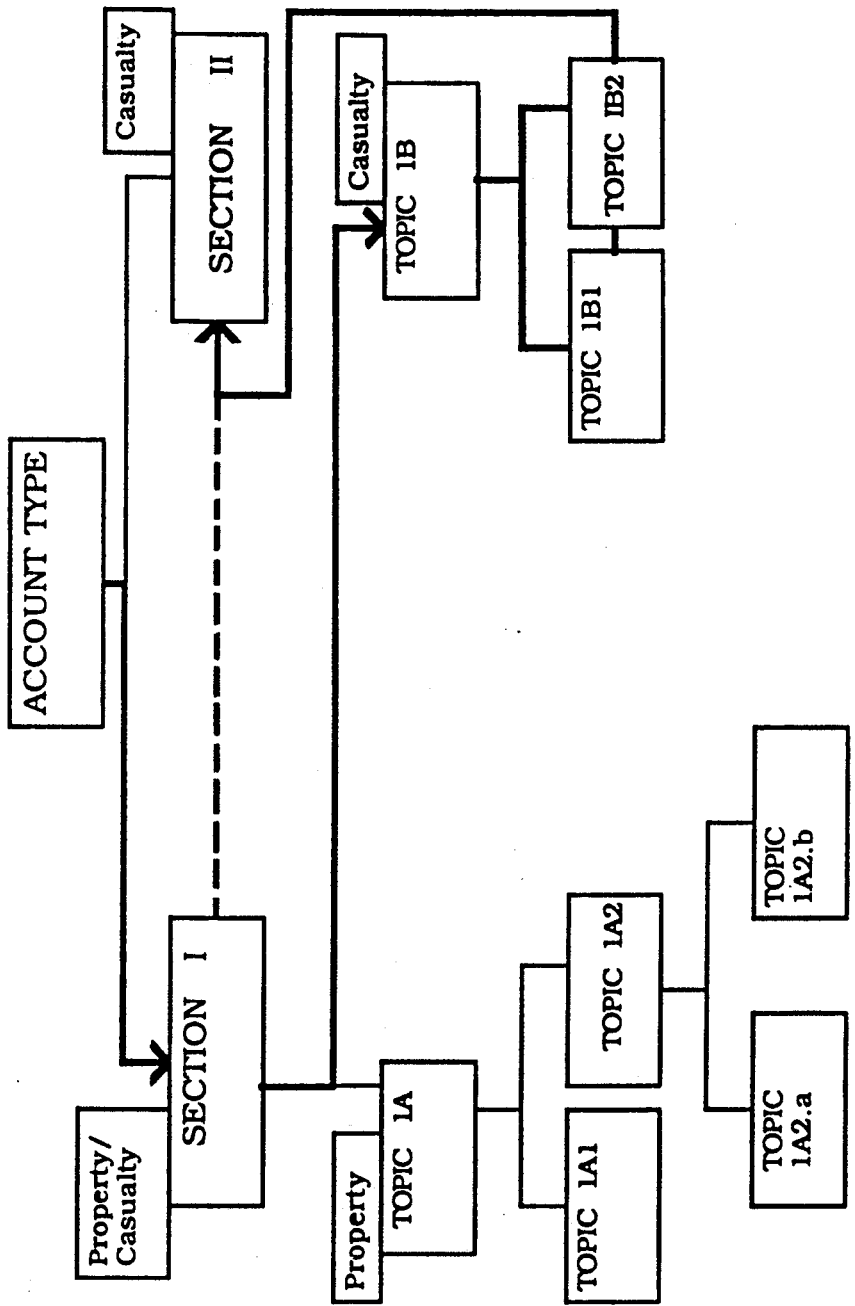

EXPERT/TRAINING SYSTEM NOVELL INTERFACE

UNDERWRITER USER COMPONENT MAIN WINDOW

CHALLENGER MAIN WINDOW

BROWSE MAIN WINDOW

FIG.47 USER COMPONENT REPORT APPLICATION

STRUCTURE MAINTENANCE MAIN WINDOW

CONTENT MAINTENANCE MAIN WINDOW

CONTENT MAINTENANCE REPORT APPLICATION

USER TABLE MAINTENANCE

INTERACTIVE, CROSS-REFERENCED KNOWLEDGE SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to knowledge systems, and more particularly, to knowledge systems adapted for interactive learning, information retrieval, and problem solving in a specified subject area.

BACKGROUND OF THE INVENTION

In a very general sense, knowledge systems can be grouped according to whether the primary purpose is for defining or checking equipment or processes, or for supporting a user in the tasks of learning, information retrieval, or problem-solving.

An example of the former type of knowledge system is U.S. Pat. No. 4,591,983, "Hierarchical Knowledge System", which describes a hierarchical knowledge base comprising a functional decomposition of a set of elements into subsets over a plurality of hierarchical levels, a plurality of predefined functions or conditions of the elements within the subsets of a plurality of the hierarchical levels, and a predefined set of operations to perform on a user-defined set of elements responsive to the functional knowledge base. Although claimed therein as a knowledge system comprising a computer having a memory storing a particular type of knowledge base, the preferred embodiment relates generally to inventory control and the processing of orders for flexibly assembling systems or items of manufacture, and more specifically to computer systems to aid in the checking of orders for products or systems to be manufactured or assembled.

An example of the other general type of knowledge system is represented by U.S. Pat. No. 4,648,037, "Method and Apparatus for Benefit and Financial Communication", which discloses and claims a system and method for making available financial and employee benefit information to any one individual of a group of individuals who are members of an employer's benefits plan. The system enables an employee to interactively access information via a terminal, concerning their savings plans, withdrawal information, explanations of provisions, employee benefit information, explanation of savings plan and benefit options, and benefit news bulletins. Thus, the second example is not utilized for controlling equipment or another process, but merely for end-user information retrieval and for personal financial problem-solving.

As the number of knowledge or information users in the workplace increases, systems that can serve as reference or help users learn job tasks, specifically information processing tasks, have evolved to address three specific areas: information distribution, employee development and improved decision-making. Primarily implemented in an off-the-job context on mainframe systems, they are known respectively as on-line reference, computer-based training and problem-solving systems.

On-line reference systems are essentially an automation of flipping through a manual. Just as one might use a table of contents and separator tabs to flip to specific information in a three-ring notebook, an on-line reference system provides menu-selections to tab down through a sequentially organized information file to retrieve and display the requested information. Such automation was designed to eliminate the costly problems of publishing and distributing the manual, and by storing it in one central resource, to eliminate the inaccuracy and inconsistency of information that results when individual pages are never updated. Because of the cost savings, many organizations eventually install several such systems, each to replace an existing manual. Since they are not cross-referenced and these individual systems are generally updated by the different departments who "own" them, the old problems of duplication and inconsistency that characterized multiple hard-copy manuals, often resurface. Other problems include content display that is difficult to read. Although studies have shown that reading a screen takes 30% longer than reading a hard-copy page, most reference systems are installed as verbatim copies of the paper bound manuals they replaced. In order to save cost and decrease the period of time required for implementation, many on-line reference systems were implemented by digital scanning or merely re-keying from hard copy. Moreover, while some may allow for rudimentary connections to other systems or remote data, cross-references and/or real integration with other systems or data is precluded due to the single-purpose, flat-file, sequential structures. To the extent cross-referencing between different knowledge content files has been attempted, this has normally been achieved by complex programming techniques which are not generalized and need skilled maintenance.

Another form of knowledge transmission has been computer-based training. These systems have typically been designed for individualized self-study by following a system-controlled sequence of presenting content, testing knowledge levels, suggesting remedial activity, and repeating lessons where necessary. A clear disadvantage, however, is that the physical structure (flat-file, sequential) and design methodology creates severe limitations: (1) It precludes any ability to address individual informational or learning style needs, e.g., the same content is presented to all, whether needed or not, pictures and text can only be presented where programmed to do so, and content can be geared to only one "average" skill level. The inherent flaws here are that there are no homogeneous audiences when relating to skill and knowledge levels, learning styles and job need. Further, people learn when they can control how and when they learn, e.g., in the sequence and the media that makes sense to them, not in the media, sequence and skill level of the instructor-developer. (2) Traditional course development methods are so tedious and time-consuming that course content is often obsolete by the time it has been developed. (3) Since training is usually a scheduled event, and not available at the time of actual need, the content learned but not applied within forty-eight hours is usually forgotten. (4) High development and maintenance costs, especially as compared to the actual developmental playback, remain a serious problem. (5) Finally, the sequential, flat-file structure precludes useful, maintainable integration with other systems or data.

Automated problem-solving systems generally fall into two different types. The inexpensive, simpler type uses a tree structure to narrow down a problem to the point whereby the system makes a specific recommendation to the user. While this provides an advantage of quick assistance in the solution of known, simple problems, the technique is also inherently system, not user-driven, which provides clear disadvantages to users: (1) It provides for little learning as the data analysis and decision-making is automated. (2) The value of the system is limited to the conditions and problems known to the programmer at the time. (3) Maintenance requires reprogramming. The other type, known as expert systems, perform the same functions with the same attendant problems but with increased severity because of its increased complexity. The heavy integration of complex logic with rules for professional application of complex knowledge is very difficult if not impossible to program. It requires the programmer to be as skilled in the expert knowledge and its application as in programming, and for all possible conditions and variables of complex problems to be predefined with an action related to each. Because of these impossible barriers, only a few real expert systems are working satisfactorily, at a cost of many millions for development and maintenance.

SUMMARY OF THE INVENTION

The present invention combines many of the advantages of the knowledge systems described immediately above while overcoming their shortcomings, and increasing the range of effective and efficient uses.

It is thus an object of the present invention to accelerate the achievement of user competency in a given subject area, by providing an integrated electronic environment in which end users can retrieve just the information they need, when they need it, in whatever way they can best understand it.

It is a more particular object to provide a development tool for an interactive, cross-referenced knowledge system that allows organizations to create customized performance support systems for raising employee competency levels faster than currently available learning or information systems.

It is a further object that such a development tool accommodate the storage and facilitate the accessibility of a wide range of information on a given subject, to support the learning, advisory, or problem-solving needs of users having a variety of starting skills and learning styles.

It is yet another object of the invention that a particular knowledge base developed for the knowledge system, be easily maintained or altered, and that the cross-referencing relationships be similarly easily maintained and altered.

The present invention enables non-technical personnel to create and maintain their own customized performance support systems for raising employee competency levels faster and easier than any other available learning, problem-solving or information distribution systems currently allows. For the first time, non-technical people can store and access fully-cross-referenced information in any form (text, graphic, audio, full-motion video), for retrieval in any combination and customized on demand for end-user's individual learning style, experience level, or information need. This cross-referenced information, for the first time, is further combined with an interactive function that employs a prompt/response Socratic type of dialogue with the user for training, informational, or task-assistance. Its relational database structure and windowing environment allow for integration and true connectivity to other systems and data, and user control over what, when and how content and activity is displayed and conducted. Client defined information units are stored in modular fashion in the knowledgebase and are organized and cross-referenced in different categories.

In both Local Area Network (LAN) and stand-alone environments, the implementation of a full knowledge system consists of information (knowledge) content specified and entered into a knowledge base by the client, and three functional components of the development tool that define the structure of and access to the knowledgebase: a User Component, a Content Maintenance Component, and an Administration Component.

Through the User Component, the end-user can (1) view this information in the Browse function by displaying and manipulating combinations of these information units in individual windows, (2) operate an interactive, prompter/response function (Challenger) for immediate on-the-job task assistance, or (3) print reports about past Challenger activity in a Reports function.

The prompting (Challenger) function uses a prompt/response technique to assist users in applying standard reference content to a specific work problem. The interactive function of the Challenger allows the system, with the use of prompts and user responses, to act as a desk-top trainer, coach, or adviser to the employee requiring assistance with a task. Its training mode is actually a broader-based learning environment, since the user has total control of what, how and when he or she learns. As a series of questions is presented to the user, the user is afforded the option of accessing one or more cross-referenced categories before answering the question. If the Challenger module is designed in an advisory mode, the system uses questions to insure that no important items are overlooked and provides expertise to insure that knowledge is properly applied to the task at hand.

The present invention thus eliminates the need for separate training, on-line reference or problem-solving systems by providing the ability to create improved, combined versions of all three, and eliminating all their programming maintenance requirements and stated disadvantages. (1) The pre-established, cross-referenced structure eliminates the need for multiple, inconsistent on-line references and allows for user-determined retrieval and simultaneous display of multiple combinations of related information. (2) Full-motion, graphics, audio and text can be accessed at any time to address any individual learning style. (3) Individual content and experience level needs can be addressed by content qualification, or data filtering, and problem-solving can be more effectively addressed by the Socratic method whereby users make their own decisions, aided by the cross-referenced knowledgebase and expertise of Challenger. (4) The use of end-user oriented table selections allow content to be added, changed and deleted without requiring programming. (5) The use of a standard multi-programming window interface allows for reduced learning time, simultaneous content display and applications execution under user—and not system—control.

Relational database tables containing cross-referenced units of information include distinct categories such as general knowledge of the subject, a summary of knowledge that has recently become important, a bibliography of sources of knowledge outside the system, a description of how to use the system, and a summary of the organizational policies concerning the subject. Each of these categories of knowledge is indexed to a hierarchical topic outline by which the user navigates through the system. The information content of the system may also include a glossary, preferably divided into a subject glossary which contains a list of terms and definitions specific to the subject, and a general or generic glossary which contains a list of terms and definitions that are common to the entire knowledge base for all subjects. In addition, one or more additional files containing full motion video, audio, graphics or text may be accessed to supplement the cross-referenced text.

The user interface is preferably based on a windowing format, so that the user can, by configuring the windows during the interactive control, not only access but also arrange the order of presentation of the selected text and other media. With such a simple "point and shoot" ability to select, the user can "hop" around to any sequence of topics that best fits the immediate need.

A further enhancement includes the use of qualifiers associated with at least one of the information topics, such that each user may, by electing to activate a qualifier, limit the number of information units available to that user. Such limitation can be by job level, department, experience level or whatever is determined useful by the organization.

The Content Maintenance Component is utilized by the client to establish a hierarchical topic structure on one or more subjects selected by the organization and to enter the actual content knowledge as discrete information units into this structure. It provides for non-technical maintainance of the content by the addition and/or altering of the topics and their associated information units.

The Administrative Component provides system security by defining four specific user types, each having specific access capability with respect to what can be read or written from, or what can be written to, the various files of each system component. Furthermore, the administrative component can control the type of information in the user component that is available to the user who selects a given qualifier code. For example, the administrative component can include a table to define authorized users, with their associated access and default qualifiers. Another table in the administrative component specifies the system responses to the user as the user navigates through the system, and permits the system manager or his designee to add, change or delete these responses. The administrative component can also include a session maintenance table for specifying the manner in which user sessions are logged, saved, and purged. The placement of all windows, boxes and "push buttons", as well as other user interface symbols and conventions, are defined and maintained therein.

Thus, in the User Configuration embodiment, the invention is in the form of an interactive learning and reference system that enables end users to access knowledge by retrieving selected information units about a subject and topic. The system includes a general purpose digital computer and associated operating system adapted to execute and be controlled by a plurality of related stored programs accessible to the computer, including a relational data base management program, a user interface program, and a learning applications program. A student terminal having input means for the student to control the interface program and output means for the interface program to visually communicate with the student is hard-wired or otherwise in communication with the computer. A relational data base containing tables of digitally stored information useful for the teaching of multiple students in a particular subject contains stored information that is selectively retrievable by the related stored programs for presentation to the students. The information includes a heirarchy of topic and subtopic nodes relevant to learning in the subject and a plurality of categories of distinct types of information. Each category contains a plurality of information units, each unit defining the smallest field of information that is retrievable by the student. Each node is associated with at least one information unit in each of at least two categories.

In the Development Configuration embodiment, the invention is in the form of a knowledge system development platform for use by a developer in an organization who is to construct a knowledge base of information content that will be accessible by end users in the organization for selectively viewing the information. The platform includes a computer, a computer operating system program for carrying out the digital processing functions of the computer, means for storing a plurality of computer application programs, means for storing a data base, and interface means for the developer to interact with the computer and programs. The means for storing a data base contains relational data base tables each having a plurality of rows for receiving and storing data entered by the developer. These data include, a plurality of nodes each corresponding to one position in a hierarchy of subject, topics and subtopics having parent/child and sibling relationships, and a plurality of information units, each information unit being stored in one of the rows and having a defined relationship with at least one node. The means for storing applications programs contains a graphics definitions program for interacting with the operating system program, an application logic program interacting with the database, a database management system program interacting with the logic program, and a language interpreter program interacting with the data base management system program, the logic program, and the graphics definition program. The logic program defines a developer module including the interface means, for the developer to enter the data into the database without altering the stored applications programs.

BRIEF DESCRIPTION OF THE DRAWINGS

These and other objects and advantages of the invention will be further described with reference to the preferred embodiment depicted in the accompanying drawings, in which:

FIG. 4 is a schematic representation of the Knowledgebase structure in accordance with the preferred embodiment of the invention;

FIG. 10 is a User Component screen display for accessing the Super Ref categories through the Challenger mode;

FIG. 17 illustrates the hierarchy of topics for entry into the Knowledge System by the knowledge engineering through the Outline Maintenance Component;

FIG. 18 is a sample outline having the four levels shown in FIG. 17, in which a topic name has been provided at each node;

FIGS. 22 23, 24, 25, 26, and 27 are screen displays from the Content Maintenance portion of the Maintenance Component, showing how a topic name can be added or changed;

FIG. 29 is a screen display from the Content Maintenance portion of the Maintenance Component, for selecting a topic whose content is to be added or changed;

FIG. 42 is a diagrammatic representation of the way in which the qualifiers affect the navigation through the topics of a subject;

DESCRIPTION OF THE PREFERRED EMBODIMENT

Figure 1A:
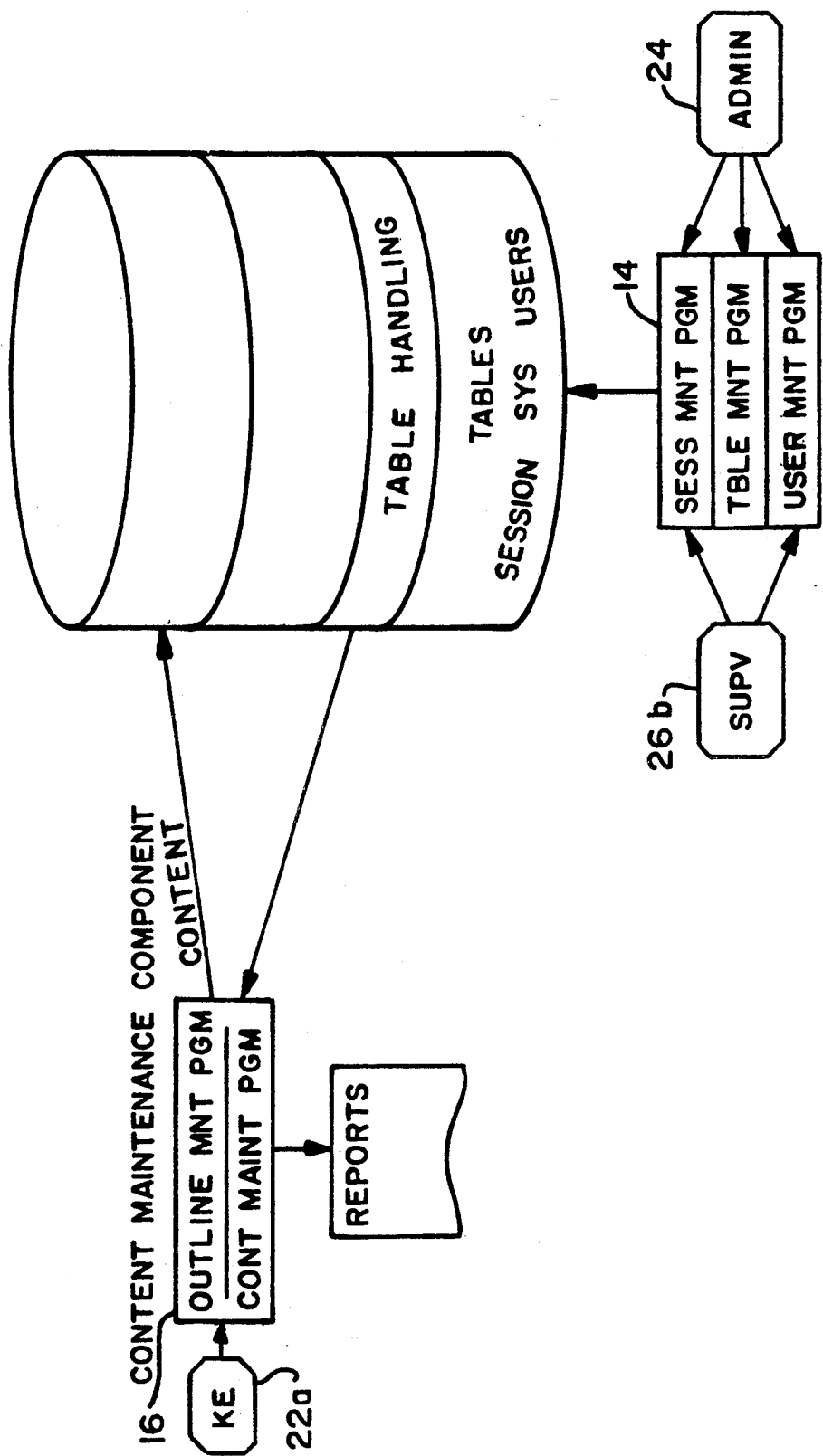
FIG. 1A is a schematic representation of the functional components and user access of the Development Configuration of the invention, in a form adapted to receive information content from a knowledge engineer.

| Table of Contents | |
|---|---|
| Description Section | Page No. |
| I. Definitions | 21 |
| II. The Knowledge System Overview | 23 |
| III. The Knowledgebase | 26 |
|   A. Super Ref | 27 |
|   B. Challenger | 28 |
|   C. Data Organization | 30 |
| IV. User Configuration Modes of Use | 33 |
|   A. Starting Session | 35 |
|   B. Challenger Mode | 37 |

| Table of Contents -continued | |
|---|---|
| Description Section | Page No. |
| C. Browse Mode | 44 |
| D. Report Mode | 46 |
| E. System Help | 47 |
| V. Development Configuration | 47 |
| A. Modes of Use | 47 |
| 1. Outline Maintenance | 48 |
| 2. Content Maintenance | 54 |
| 3. Reports | 63 |
| 4. Administrative Component | 63 |
| B. Structure | 66 |

I. DEFINITIONS

Category: One of a plurality of general types of information about a Subject that End Users might wish to retrieve from the Knowledge Base.

Client: A User organization, i.e., an individual or organization who uses the invention in one or both of the Development and User Configurations.

Data: bytes entered directly or indirectly by a User and stored in the Data Base.

Data Base: The collection of Data in the Knowledge System.

Development Configuration: The Knowledge System in the form deliverable to a Knowledge Engineer User without Outline Content or Information Content.

Information Content: Any Data entered by the User (knowledge engineer) into the Knowledge Base as part of an Information Unit (i.e., the factual content of the Information Unit).

Information Tables: Storage arrays containing Information Content.

Information Unit: Information Content that is retrievable and presented as a block (i.e., a "row" in a "table" of a "data base").

Knowledge Base: The collection of Outline Tables and Information Tables in the Knowledge System.

Knowledge System: A Knowledge Base and at least the User Component; a full Knowledge System includes a Data Base, User Component, Content Maintenance Component, and Administrative Component.

Linkage Tables: Storage arrays containing index or pointer data for (1) the cross-referencing of Information Units to Nodes, (2) the linkage of Information Units to categories, (3) the linkage of Prompts to Responses, (4) the specification of permissible navigational vectors, (5) the specification of qualifiers, etc.

Mode: Any one of the optional ways the Knowledge System can be used in the User Configuration.

Module: Any collection of hardware, firmware, Program and/or Data, that performs a specified function in the Knowledge System.

Node: A figurative position of a topic or subtopic in a Subject Outline.

Outline Content: Any number of bytes of data for defining a Subject Outline.

Outline Table: Storage arrays containing Outline Content.

Program: A collection of related coded instructions that specify one or more operations performed by a computer.

Session Base: All Data that are not part of the Knowledge Base.

Subject Outline: The hierarchy of topics and subtopics concerning a subject in the Knowledge Base.

User: An end user, knowledge engineer, supervisor, or system administrator (as described in the text).

User Configuration: A completed Knowledge System as presented to the End User, containing a Knowledgebase created by the knowledge engineer through the Content Maintenance Component.

II. THE KNOWLEDGE SYSTEM OVERVIEW

Figure 1B:
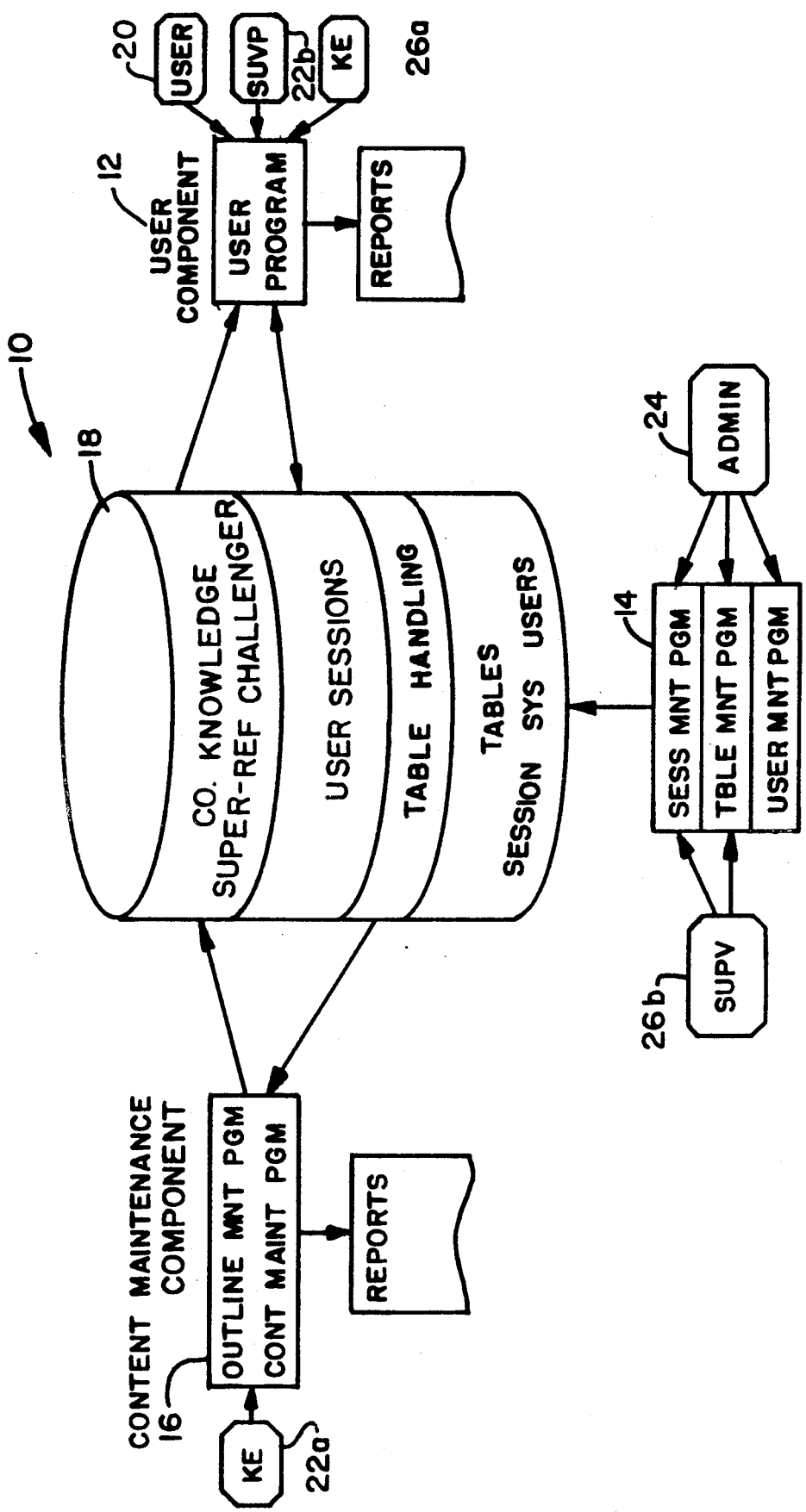
FIG. 1B is a schematic representation of the functional components and user access of the User Configuration of the invention, in a form adapted for utilization by the End User.
Figure 2A:
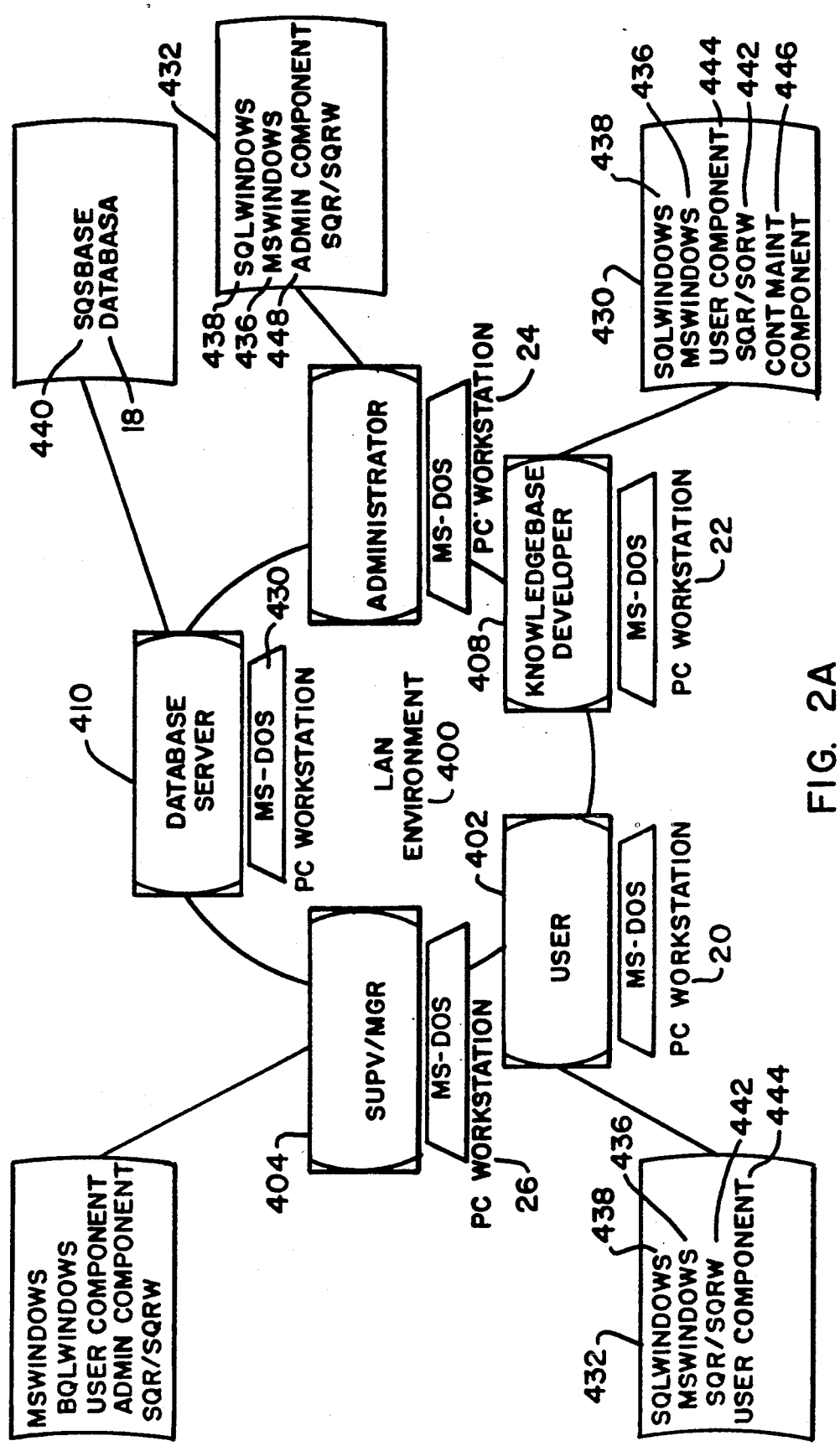
FIG. 2A is a schematic representation of the physical configuration of the knowledge system shown in FIG. 1B, as implemented on a local area network.
Figure 2B:
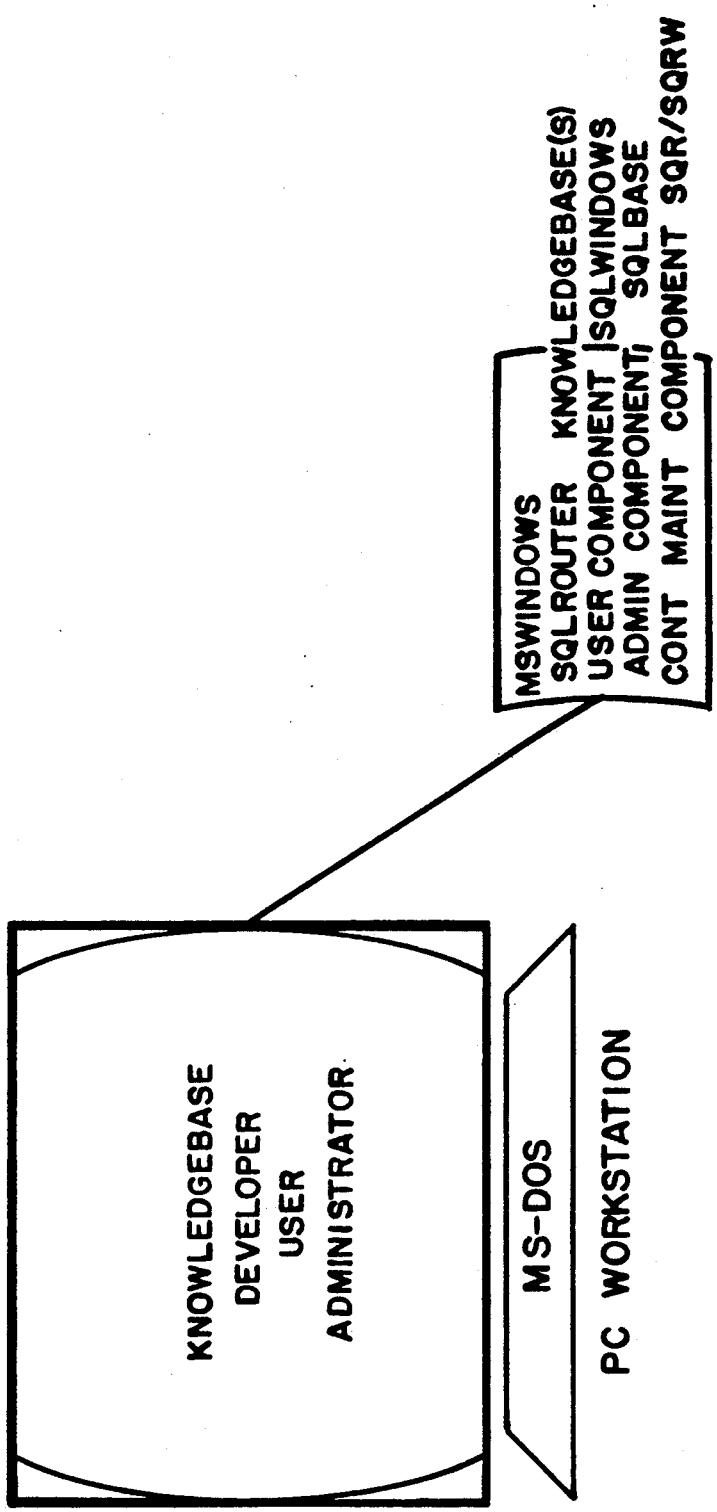
FIG. 2B is a schematic representation of the physical configuration of the knowledge system shown in FIG. 1B, as implemented on a stand-alone work station.
Figure 43:
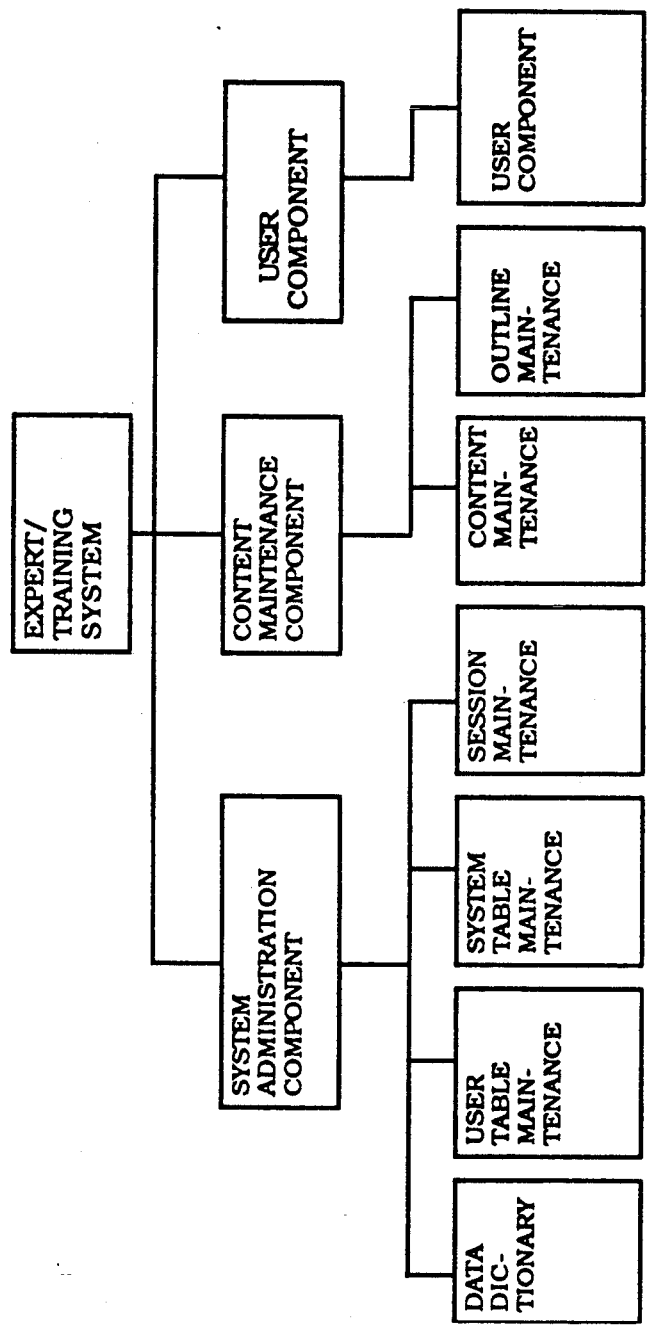
FIG. 43 is a chart which shows the types of logic programs associated with the User Component, the Content Maintenance component, and the System Administrative Component.
Figure 44:
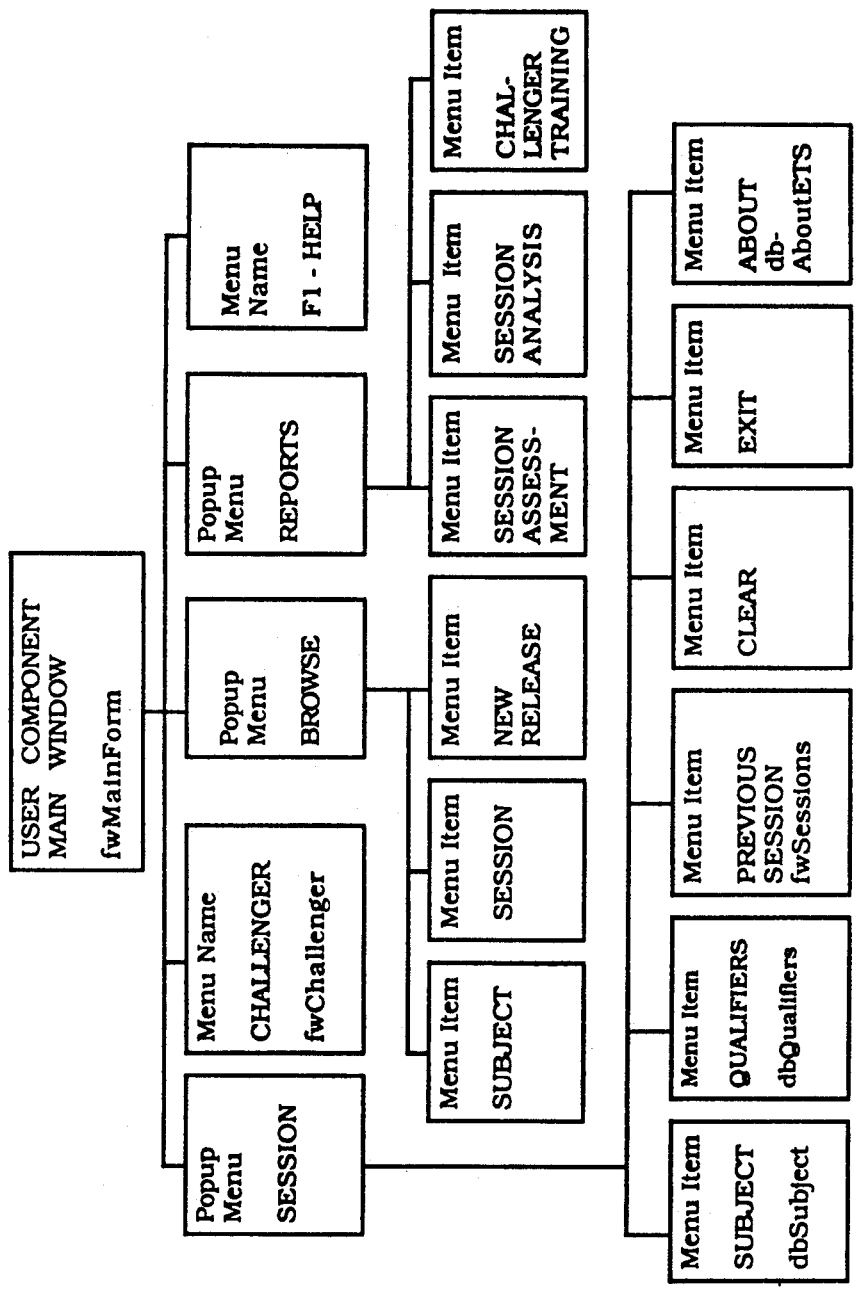
FIG. 44 is a chart showing the logic program structure associated with the User Component.
Figure 45:
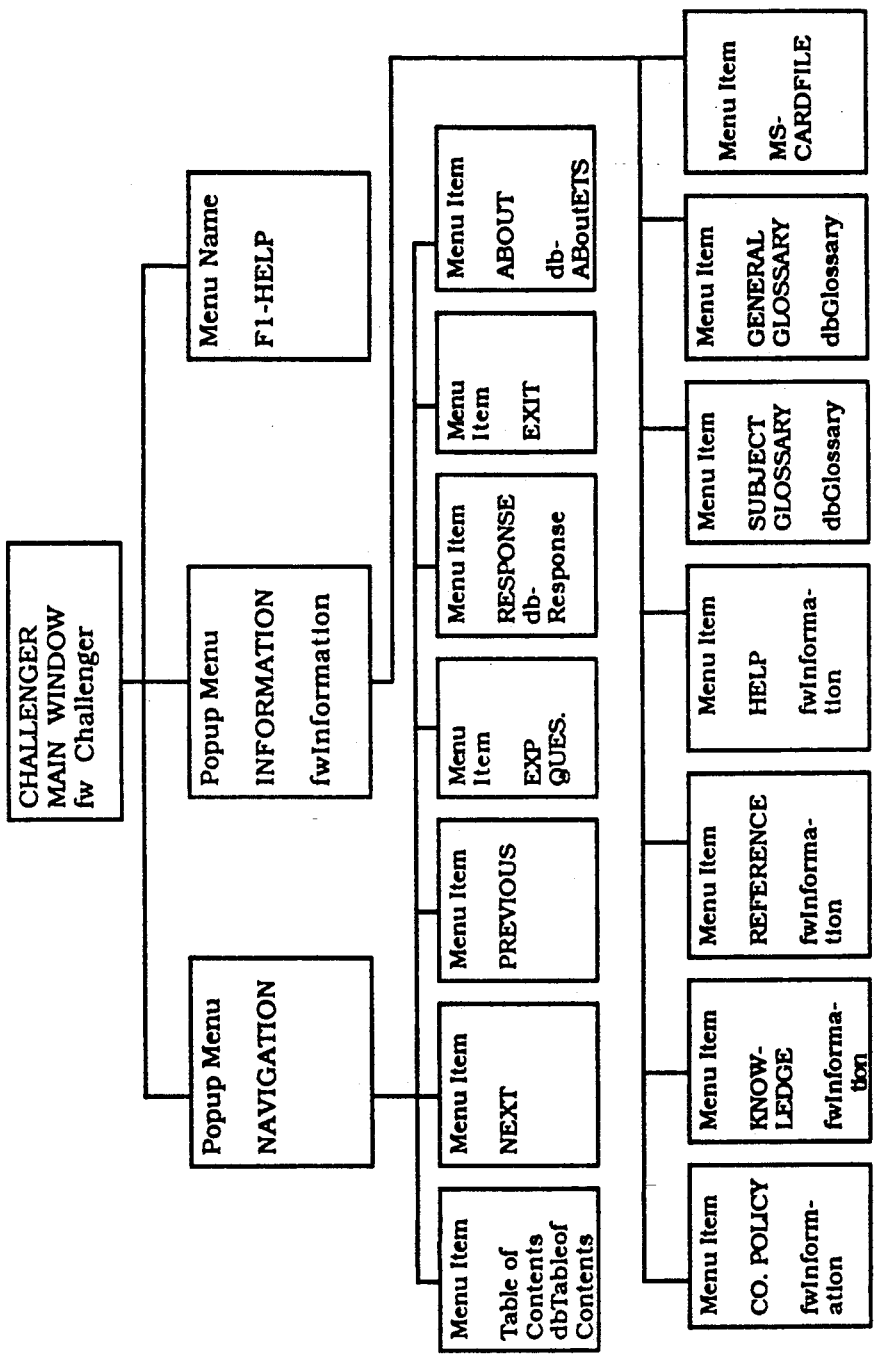
FIG. 45 is a chart showing the program structure associated with the Challenger mode of the User Component.
Figure 46:
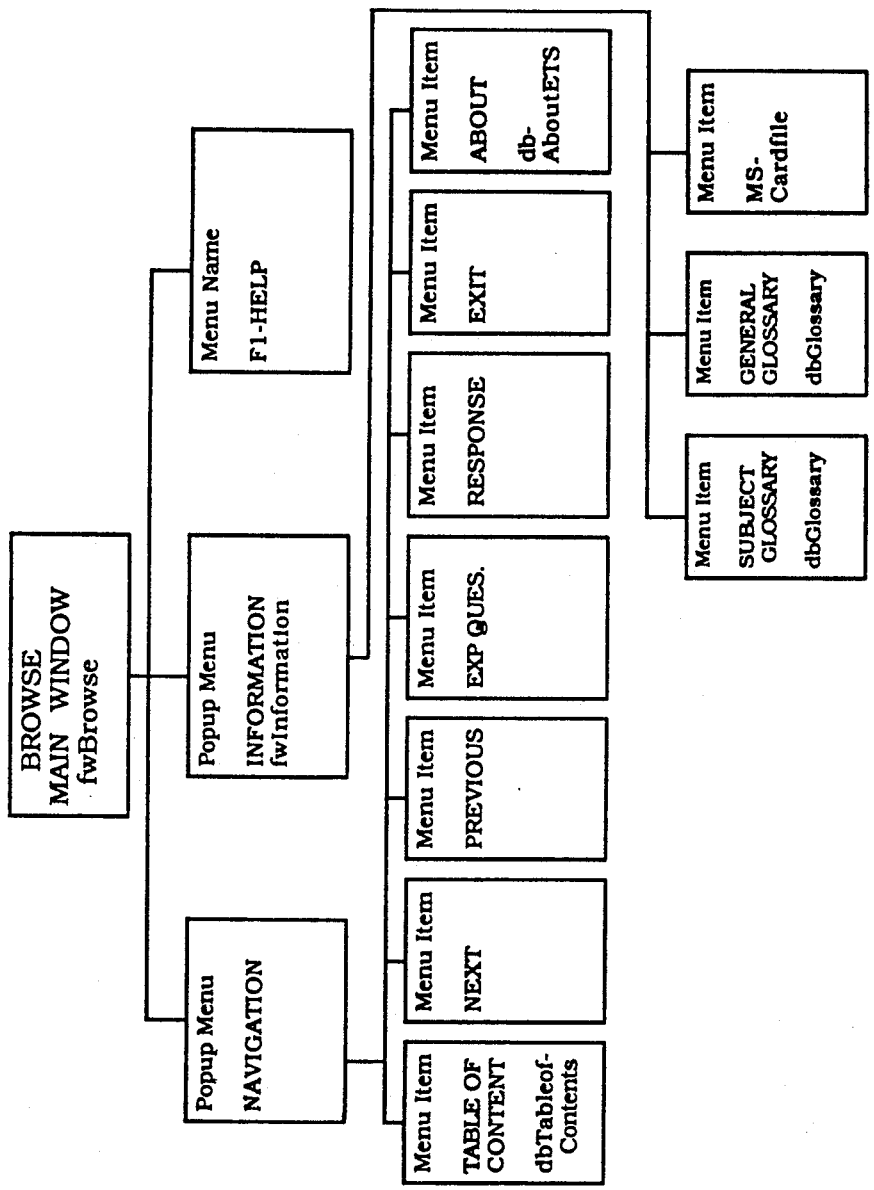
FIG. 46 is a chart showing the program structure associated with the Browse mode of the User Component.
Figure 47:
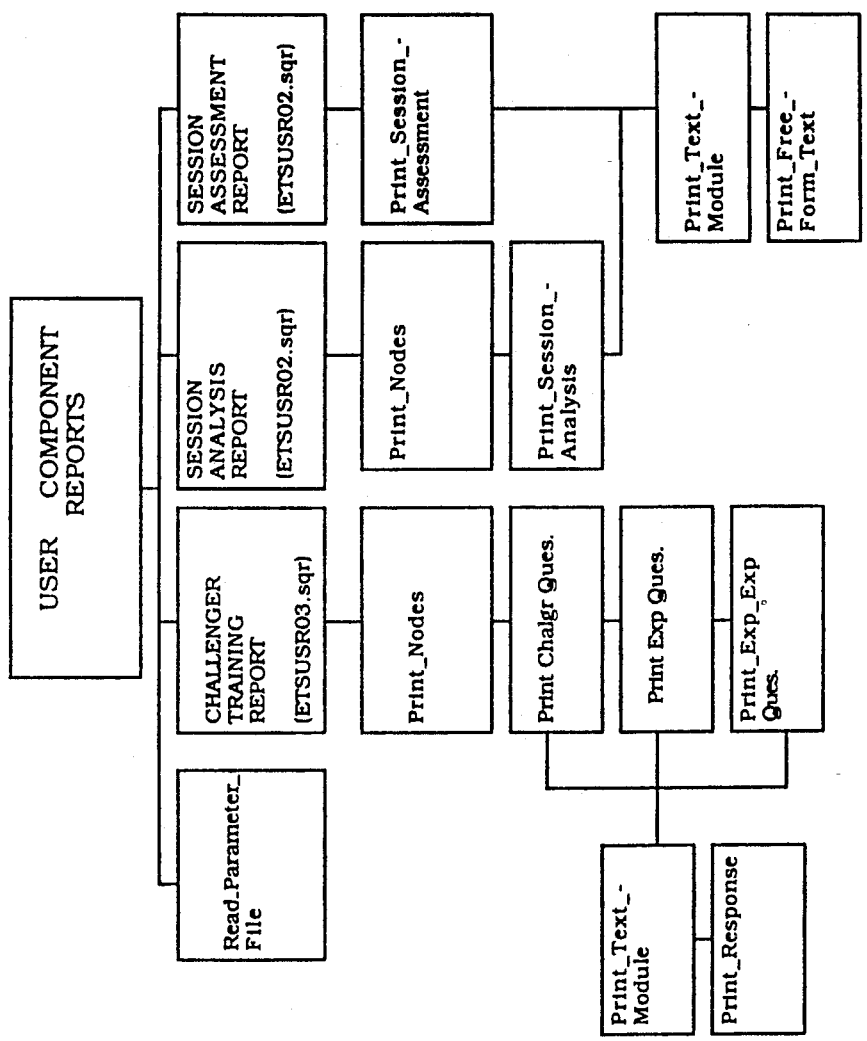
FIG. 47 is a chart showing the program structure associated with the Reports mode of the User Component.
Figure 48:
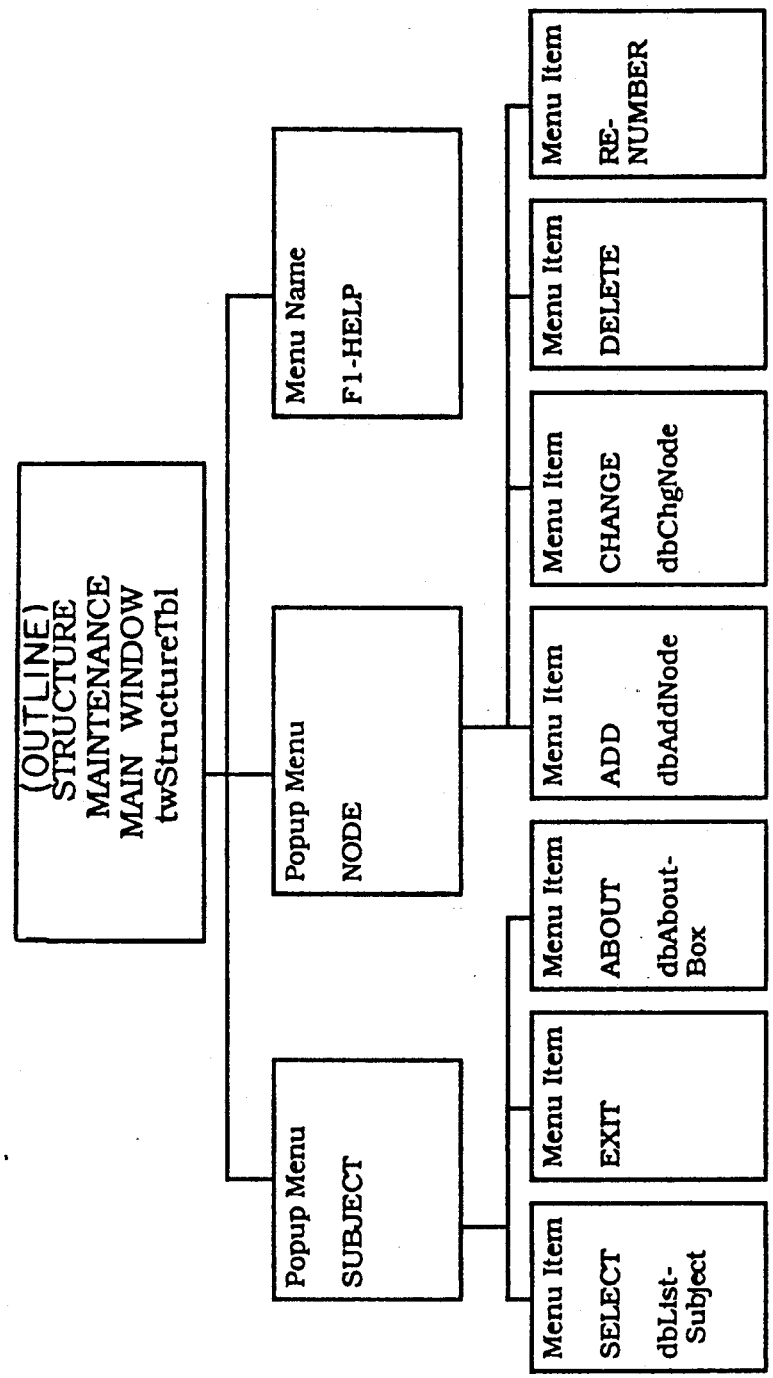
FIG. 48 is a chart showing the program structure associated with the Outline Maintenance portion of the Maintenance Component.
Figure 49:
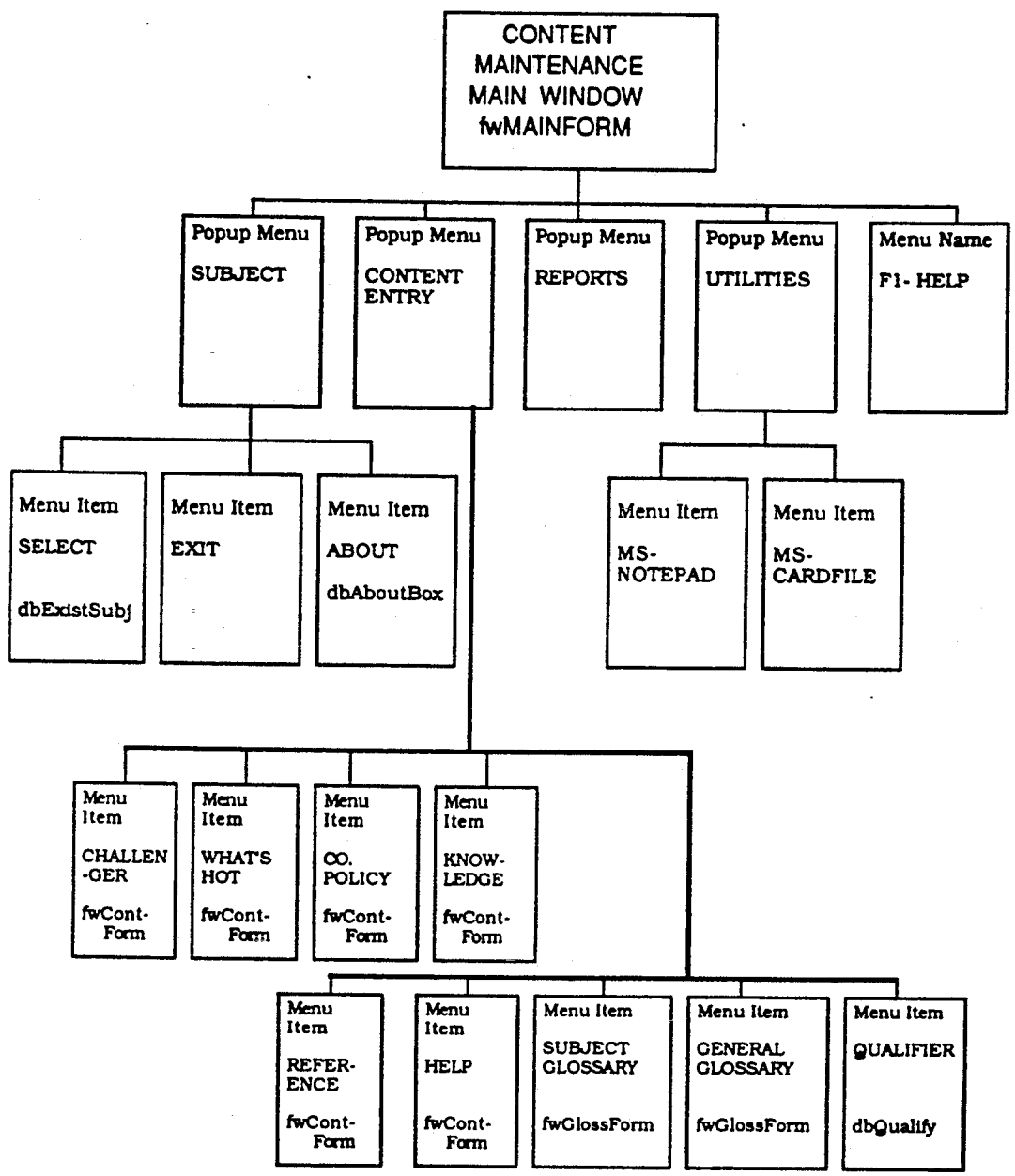
FIG. 49 is a chart showing the program structure associated with the Content Maintenance portion of the Maintenance Component.
Figure 50:
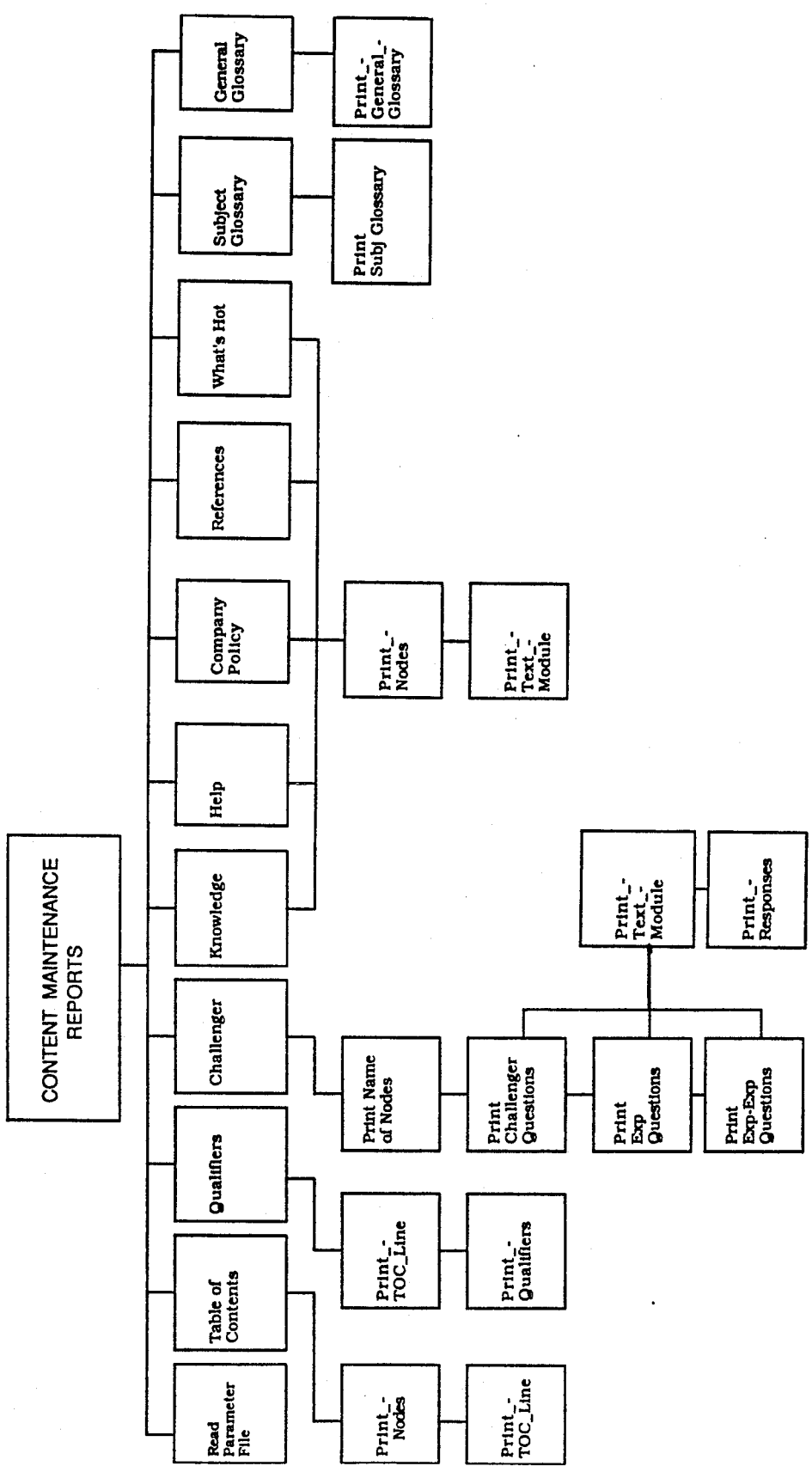
FIG. 50 is a chart showing the program structure associated with the Reports portion of the Contents Maintenance component.
Figure 51:
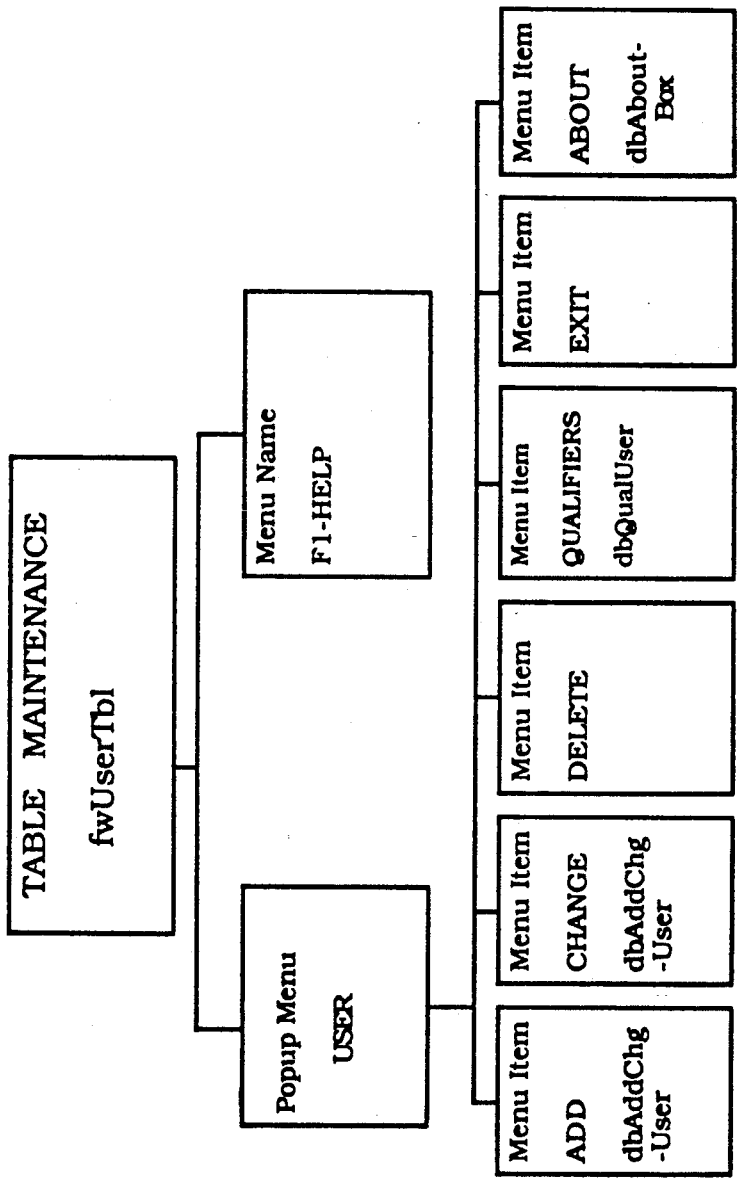
FIG. 51 is a chart showing the program structure associated with the user table maintenance portion of the Administrative Component.

FIG. 1A is a schematic representation of the Development Configuration embodiment of the present invention, and FIG. 1B is a schematic of the User Configuration. FIGS. 2A and 2B are schematics of the hardware implementation of the User Configuration in a Local Area Network and in a stand-alone environment, respectively. FIGS. 1B, 2A and 43 represent a fully operational User Configuration of the Knowledge System 10 as used, for example, by the customer service department of an insurance company, the sales office of a parts supplier, or any variety of other organizations or departments within organizations. The preferred embodiment of the invention will be described herein with respect to a large organization in which the administrative component 14, user component 12, and content maintenance component 16 interact with database 18, which contains the knowledgebase. Although the full knowledge system 10 is suitable for internal use in a large organization, the minimum knowledge system configuration consisting of the user component 12 and database 18 as more fully described below, could be sold or licensed separately to small end users, including individuals.

The User Component 12 allows end-users 20 operational access to the knowledgebase and some of the session base portion of database 18 for on-the-job assistance in three different modes. In the interactive Challenger mode, the system may act as a desktop advisor, coach or in-house expert by employing a question and answer dialogue to assist the users in solving business problems. With cross-references to the multi-media information of Super-Ref, users can explore issues raised in the dialogue to any degree of depth. When presented with a question or prompt, the user is afforded the options of responding directly, responding that more clarification or exploration is needed (in which case the issue is explored in detail), reviewing related cross-reference information, glossaries or graphics, or jumping to a different question or topic altogether. Challenger activity, e.g., the questions and the user responses, is stored individually by session and retrievable at any time. This is especially useful when it represents a customer profile or problem analysis that can be retrieved for effective follow-up activity. It can also be reviewed electronically by supervisors 26a who can add comments and notes. With the use of "qualifiers", or filters, users may customize their view of the data by their job, experience level or any other criteria predefined by the knowledgebase developer. In Browse mode, users may freely display and manipulate combinations of windowed information for quick reference purposes. This is most helpful for ad hoc informational analysis or customer and sales reps who need to answer customer questions quickly. For example, rather than looking through several manuals or on-line systems to review product price, descriptions, procedures and pictures, all of these types of information, already cross-referenced and stored separately, can be retrieved and displayed together on demand. Reports mode allows for a variety of hardcopy printouts of Challenger activity.

The Content Maintenance Component 16 is made up of two separate, independently run programs: Outline Maintenance, used to define the hierarchy of topics in the knowledgebase, and Content Maintenance for actual entry and maintenance of the information content.

The Administrative Component 14 (Admin) is made up of three independent programs: Session Maintenance, to purge unwanted user sessions, User Maintenance to define authorized users and their access, and System Tables Maintenance to define unique knowledgebase values and parameters. Together they serve as an intuitively obvious alternative to using less friendly utility programs to perform these same functions.

Each database 18 that is created can accommodate any number of user types, as defined in the Admin User Maintenance table. End Users 20 access only the User component 12 and may retrieve their own Challenger sessions for purposes of rework or review. They may also use Browse and Reports functions freely. Knowledge Engineers 22a,b, are responsible for content entry and maintenance and therefore have sole access to the Content Maintenance Component. They also have full access to the User component for testing purposes. Administrators 24 maintain the key tables that define users and ensure knowledgebase data integrity. They alone have access to all three Administrative Component programs for system control purposes. Supervisors 26a,b may access the User component with full access to all user sessions stored. This is to allow a manager to electronically review and comment on a subordinate's work session. Supervisors also have access to the Session and User Maintenance function of Admin to purge employee sessions, and update the authorized user table. These user types and their respective authorized access provides the main data security feature of the knowledge system as created.

III. THE KNOWLEDGEBASE

At the broadest or highest levels, each knowledgebase portion of database 18 is comprised of a set of related but different Subjects. These may be types of products, procedures, customers, training course, or whatever classification suits the needs. Each Subject has its own unique Table of Contents, which outlines its hierarchy of topics and subtopics. The system places no restriction on the number of Subjects, topics or subtopics that may be created in a knowledge base.

The invention, unlike other systems, defines a topic as the sum of its related, automatically cross-referenced information units and other information files, collectively known as Super Ref and Challenger.

III.A. Super Ref

Super Ref is like a special reference library whose information is viewed on demand by the user. It includes access to auxiliary information contained, for example, in Microsoft's Cardfile program for additional text and graphics, two glossaries, and several cross-referenced content categories for each topic. The available information storage units in the cross-referenced categories of Super Ref can be filled with content only when needed. Content can be changed or deleted without any reprogramming, as the cross-referenced structure is pre-established. Super Ref categories can represent a variety of kinds of information concerning a given subject. The standard categories include Knowledge, References, What's Hot, Company Policy, and Help.

Knowledge can be used to hold the most comprehensive information about the topic, and that which is least likely to change (e.g., fairly permanent facts, principles, descriptions). In contrast, What's Hot may be used for temporary content to alert the user of new or upcoming items. Company Policy contains information about how to apply general Knowledge content in one's own organization and Help may provide hints, pictures or short explanations to assist users in topic understanding. Together these topic categories should serve to meet most users' information needs. If a user needs more detail, related subtopics can be reviewed. Alternatively, another category, References, can provide a list of resources available outside the knowledgebase that can address unique issues.

For example, assume the topic name is that of a company product. Knowledge might describe its features, Company Policy might list its current prices and sales procedures, What's Hot may announce an upcoming promotion, Help might provide ideas for best use with a picture, and References might list the in-house experts or reference manuals to consult. If the topic were "Credit Approval", Knowledge might describe credit procedures, Policy could list company terms and conditions, What's Hot could define a new law that may cause a rate change, Help could list best uses of options, and References could provide the name and phone extension of the in-house loan expert.

Glossaries are not cross-referenced by topic, as their content pertains to all topics. Specifically, each Subject defined in the knowledgebase has its own Subject Glossary to explain terms pertinent to all the topics in the Subject. At the higher, knowledgebase level, the General Glossary contains terms that are pertinent to all Subjects.

III.B. Challenger

Challenger is a category that is cross-referenced to Super Ref at the topic level, but unlike the "display only" function of Super Ref, Challenger provides an interactive or conversational function. It contains a set of questions and answers to be presented to the user to assist in applying Super Ref information to a specific job task. It uses the Socratic method of questioning whereby a user, upon answering a question, is presented with another logically connected question. This method represents how professionals converse with each other and the system is geared so that Challenger can provide unlimited guidance for the users to arrive at the best solutions to job problems themselves. With Challenger coupled to Super Ref, maximum learning with minimum maintenance is achieved.

Using the above examples again, a customer service rep on the telephone with customers can, by displaying multiple categories together on a terminal screen, answer questions immediately about products, prices and upcoming promotions without having to look this up in separate manuals or on-line systems. Challenger questions can simultaneously profile the customer's detailed needs and assist in a best product recommendation. Reviewed remotely by a manager, comments can be added by superiors, and the profile can be retrieved still later for customer follow-up activity. If used specifically for learning, the invention provides a broader learning environment than structured computer-based training allows. The user can jump around to perform activities in a personally desired sequence, can learn in multi-media wherever desired, and with windowing Super Ref knowledge, can "look up" the answer to quiz questions before entering an answer. If linked to an external time-sharing database, information access is extended. An investment counselor, for example, linked to Dow Jones could simultaneously display Knowledge's description of a new company stock offering, its current Down Jones price, a graph of its past performance history and in-house sales terms and conditions. Where content is entered via keyboards or scanners, text can be entered and displayed in foreign languages to assist in maximum learning.

Together the windowed, cross-referenced knowledge approach has allowed interactive, multi-dimensional, user-controlled learning and information delivery like no other system. It is the only type of system that can display any combination of multi-media, multilingual content geared to any individual learning style, experience level or information need. The system allows for non-technical creation of unlimited subject matter, unlimited cross-referencing and true integration with other remote systems and other data.

III.C. Data Organization

As shown in FIG. 1B, the Database 18 can be considered as having three types of data: a knowledge base, in which data relating to subject matter knowledge to be accessed by or transferred to the end user is stored; a session base, which contains all Challenger activity entered by the end user; and a table handling base or other data that are not part of the knowledge base, but which relate to the administration of the knowledge system, such as authorization, logging, security, and the like.

Data may originate from the User either directly or indirectly, i.e., by explicit entry, or as a result of user selection of displayed options and the knowledge system generating and storing data in response to user inputs. In general, however, the knowledge system is preferably organized so that in both the Development Configuration and the User Configuration, the User interfaces with the knowledge system by prompt-response, or data entry, rather than algorithm or language programming.

The database 18 has a relational data base structure where client information is organized by subject, topics within a subject, subtopics within each topic, sub-subtopics within each subtopic, etc. Each of these various levels of content is comprised of the multiple, cross-referenced categories of information associated with it. Since navigation through the system is totally under user control, a user may, during a given session, "hop around" between subjects and topics during the course of a self-directed learning or problem-solving endeavor.

Figure 3:
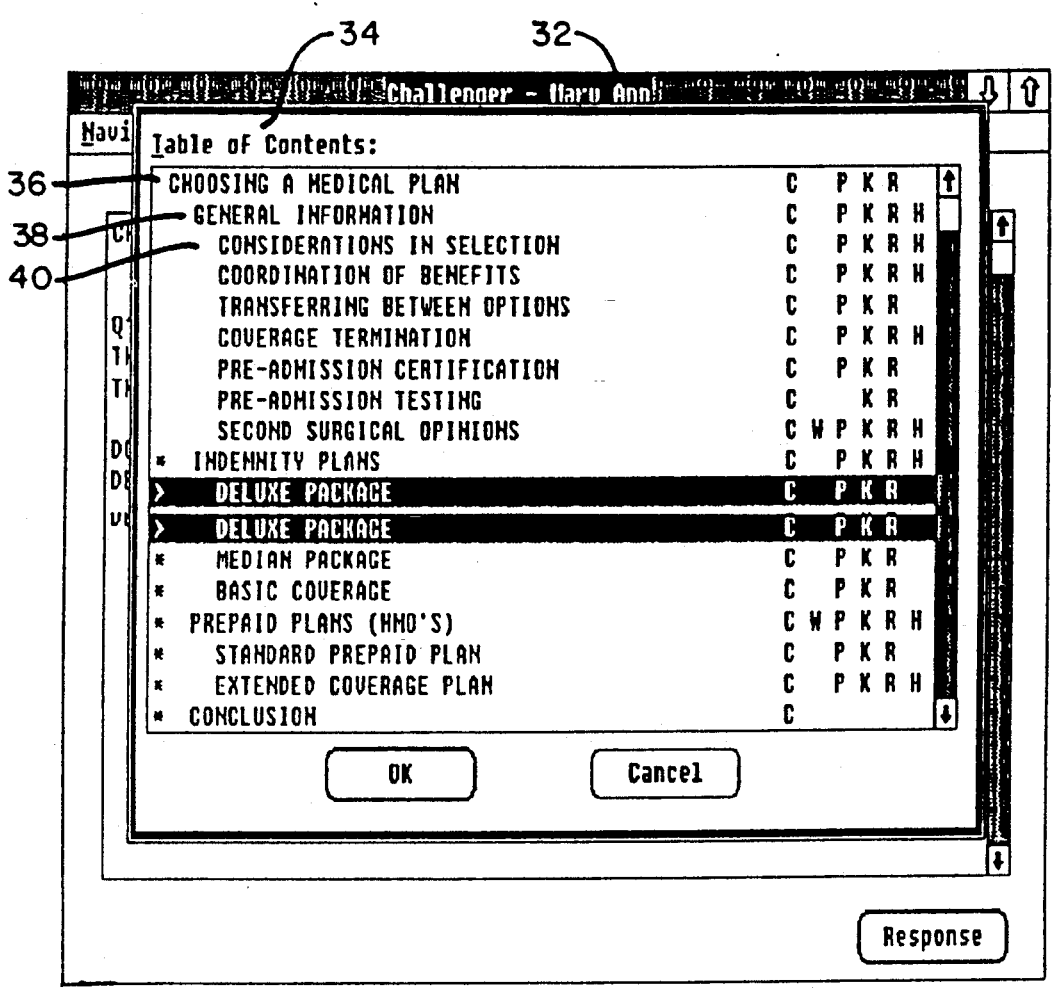
FIG. 3 is a User Component screen display of a portion of the Table of Contents for a particular subject in a Knowledgebase.

FIG. 3 illustrates the Main Challenger window 32 overlayed by its user-invoked window showing a portion of a typical table of contents 34 for the subject 36 of "Choosing a Medical Plan". Topic 38, "General Information", has seven subtopics 40, each of of which can have sub-subtopics and sub-subtopics, etc. The hierarchical outline of the table of contents defines the basic indexing scheme for cross-referencing the information content of the given subject.

FIG. 4 represents schematically the multi-dimensional nature of the content information structure in accordance with the present invention. The key index is the subject, topic, and subtopic nodes 34. Each topic node provides access to multiple information blocks associated with multiple categories. Challenger 44, Knowledge 48, References 50, What's Hot 52, Company Policy 54, and Help 56 information categories contain information units such as 70, 58, 62, 64, 66 and 68, respectively, that are cross-referenced with one of the topic entries 34, e.g., node 38, "phones". The Subject Glossary 72, General Glossary 74 and MS-Cardfile 76 are information units accessible from any topic, and are not cross-referenced. While informational units in the Super Ref categories 48–56 store data internally in text format, they may alternatively access externally stored audio, graphics, or full motion video. MS-Cardfile 76 stores both text or still image data. Thus, each topic 34 presents the user with several information units that are cross-referenced to a single node (a Challenger unit and five other Super Ref units, one in each category), and other units in full multi-media format that are common to multiple nodes.

An additional feature of the present invention is the further indexing of the topics by Qualifiers 78 such that for a given user qualification, cross-referenced information units are pre-screened for availability to the user. For example, if the system has three qualifiers, such as expert (E), customer service (C), and billing (B), the expert user can customize the viewed data by accessing just those topics associated with those qualifiers. The expert is thus guided through a training session differently than a novice. Similarly, a billing department employee would be precluded from accessing customer service information units for which such employee would have no need if the qualifier "B" is applied to the Challenger session. Users who do not apply qualifiers, or filters, to their sessions, are presented with all topics.

In the content screen 32 shown in FIG. 3, the six columns to the right indicate to the user, by topic, which Challenger and Super Ref information blocks (such as 70 and 58–68 in FIG. 4) contain content for the selected subject.

IV. User Configuration Modes of Use

As shown in FIGS. 44–47, the user component has three modes of use, entered through the mode selection module. The prompting, or Challenger, mode is a conversational function that allows the system to play a number of roles to the end user. Challenger 44 (FIG. 4) may act as a desk top advisor, an on-line coach, or tutor, depending on the overall functionality specified by the system manager. By asking the user key questions and storing them with their user responses, Challenger accelerates on-the-job learning and retains a complete record of this problem-solving and/or learning activity.

The Browse mode, a non-conversational, display mode, enables the user to view directly all the information content in Super Ref 46 and the Challenger 44 questions and responses. The information can be browsed by subject matter, in which the entire knowledge base of the specified subject is available. Another Browse function is the ability to view just the content that has changed since the last release or update of the system. The third Browse option is to retrieve a prior Challenger session and review the activity, i.e., the analysis or learning that took place. This can be quite helpful when a particular business problem reappears after the user had previously thoroughly analyzed it via Challenger.

The last mode of use of the user component is the Reports mode. Three types of Challenger reports are available on request.

A typical user session will be described below including start-up and the three modes of Challenger, Browse, and Report. This description assumes the system 18 is fully operational and that the user 20 has logged into the User Component 12 by employing the appropriate identification as specified in the Administrative Component.

IV.A. Starting a Session

Figure 5:
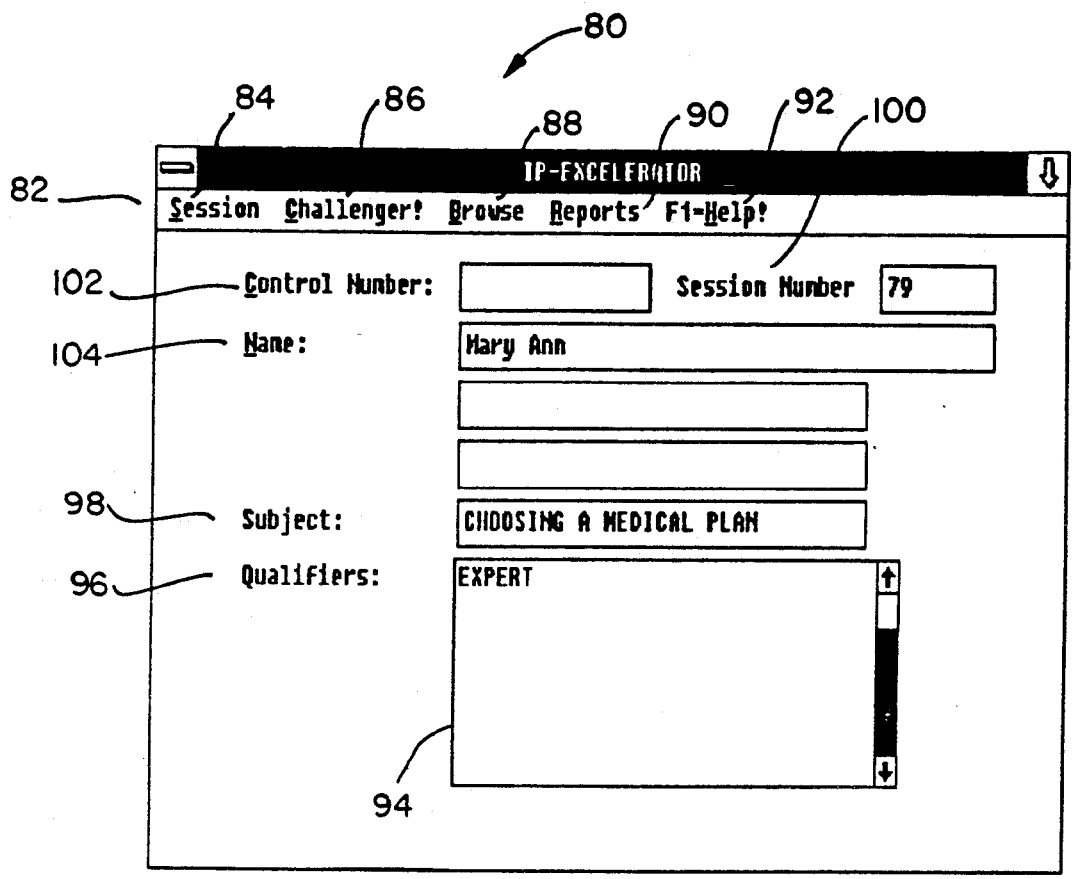
FIG. 5 is a screen display of the User Component main window.

Upon proper logging on, the start-up main window 80 as shown in FIG. 5, will appear. This window is used to establish a session, select the mode of use, and specify the parameters that will define the session.

Figure 6:
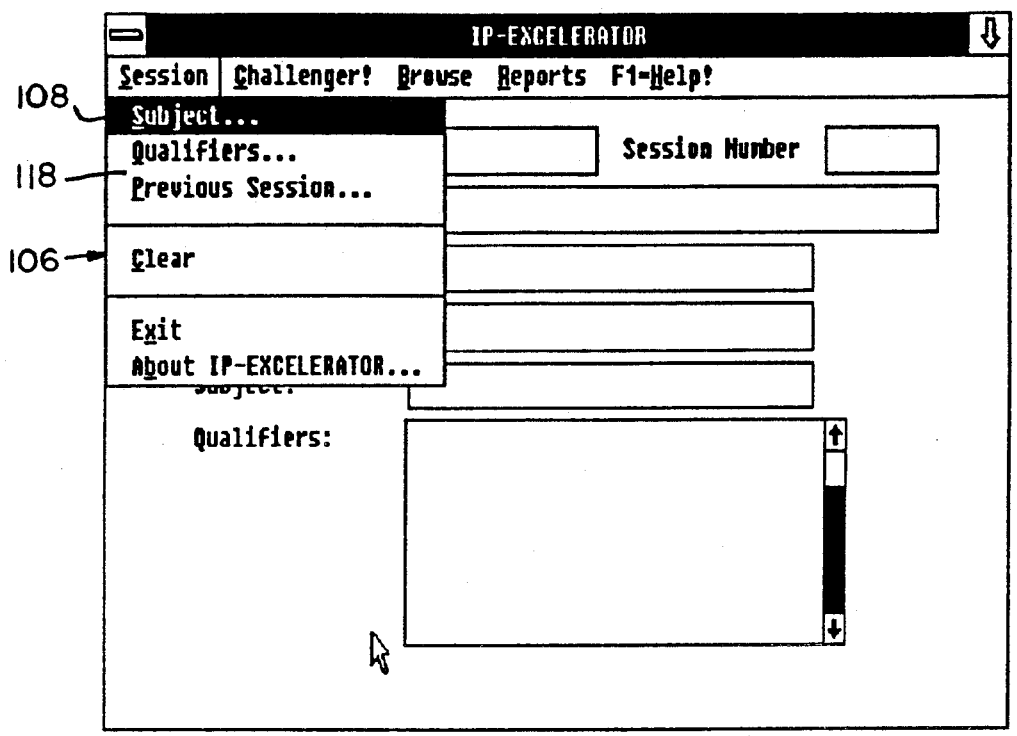
FIG. 6 is a screen display of the User Component session options window.

Five selections are available in the main window menu bar 82: Session 84, Challenger 86, Browse 88, Reports 90 and F1=Help!92. Session 84 lets the user define and begin a new session or select a previously stored session for review or rework. The Session menu (FIG. 6) also includes an About menu item used to view the program and copyright information, and an Exit selection to leave the application system. Challenger, Browse, Reports and F1-Help! initiate these respective modes, which are described in more detail below.

The main area of the window 80 contains all the information that may need to be provided before beginning a session. User-supplied information can be typed in directly or selected from various appropriate list boxes. When the user first enters the main window 80, default qualifiers 96 associated with the user ID (if they exist) will appear in box 94. Qualifiers may be changed to suit the needs of the current session. The subject 98 and qualifiers 96, once selected, may not be changed for a session once the session has been initiated. The Session Number 100 is a unique, system-assigned number used to identify a particular session. The Control Number 102 and Name 104 are optional, and may be used for any organizational purpose.

To begin a new session, the user must first select, at minimum, the subject 98 to be reviewed. Challenger mode also requires the user to enter a name in the Name box 104. To select a Subject, the user moves the cursor to and clicks the mouse on Session 84. This produces the pull-down menu 106 shown in FIG. 6. A further click on the Subject menu item 108, brings on the list box 110 shown in FIG. 7. A list of all valid subjects is displayed in this box, with a scroll bar 112 on the right that allows the user to "page down" through the list.

Figure 7:
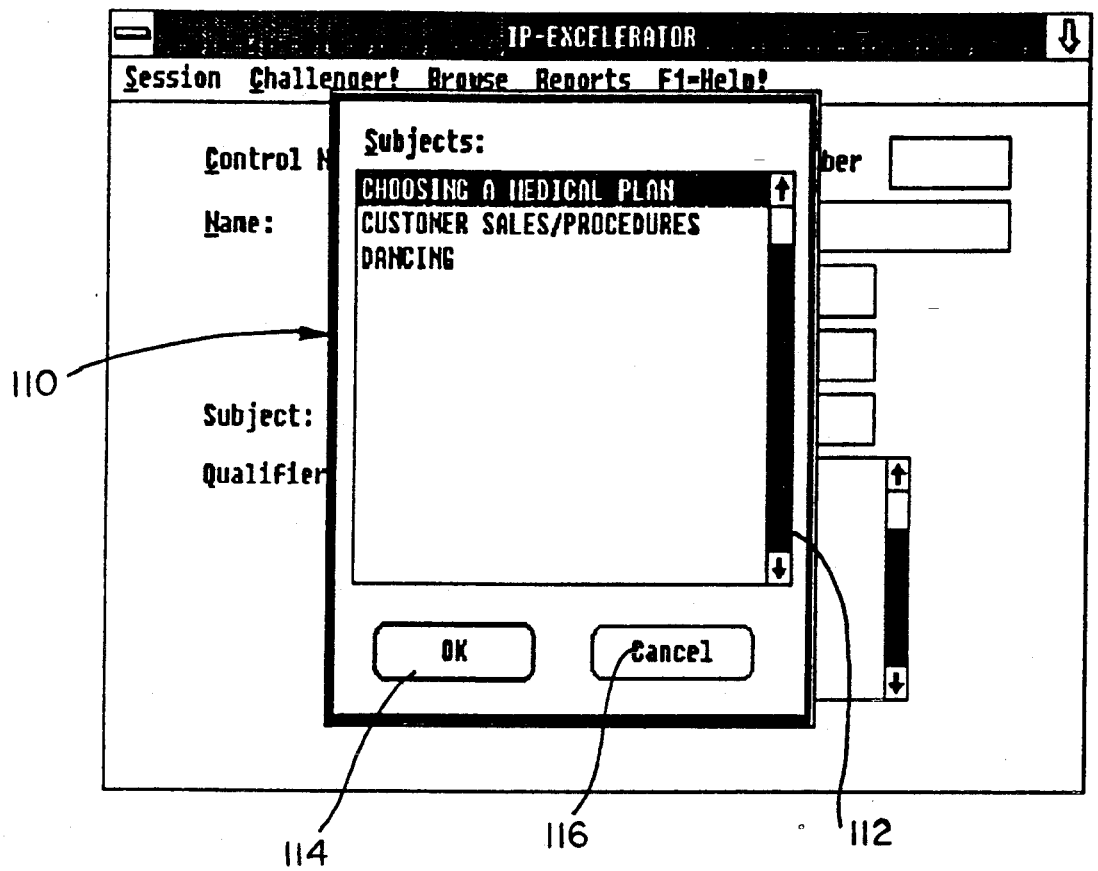
FIG. 7 is a screen display of the User Component window for choosing a subject.

To select a Subject from the list, the arrow key or the mouse is moved to highlight the appropriate row and Enter is pressed or the mouse is clicked on the OK push-button 114 shown in FIG. 7. This returns the user to the Main Window (FIG. 5) where the subject name is displayed in the appropriate field 98. Cancel 116 in FIG. 7 returns the user to the Main Window without selecting a subject.

Once the Subject is selected, the user may wish to further customize the session with qualifiers. These determine which portion of the content will be displayed. Qualifiers are inclusive; in other words, the user will be presented only with the content of those topics associated specifically with the qualifiers chosen. Default qualifiers that have been established for a particular user ID appear automatically with the display of the Main Window. Whenever a user wants to view the Table of Contents (FIG. 3), qualified topics made available to that user will be marked with an asterisk on the left.

To retrieve a stored session (for review or rework), the user selects Previous Session 118 from the Session menu (FIG. 6) in the Main Window. A log of previously created and stored sessions will appear (not shown). To select one for review or rework, the user highlights the choice, then clicks on Session and Select from the pull-down menu. To get out of this window without retrieving a session, the user clicks on Session, then Cancel. After the user selects a previous session from the log, the Main Window will reappear. At this point, the user can work on this previous session in any of the three operating modes—Challenger, Browse or Reports. If Challenger mode is selected, the last question answered will be re-displayed.

IV.B. Challenger Mode

Figure 8:
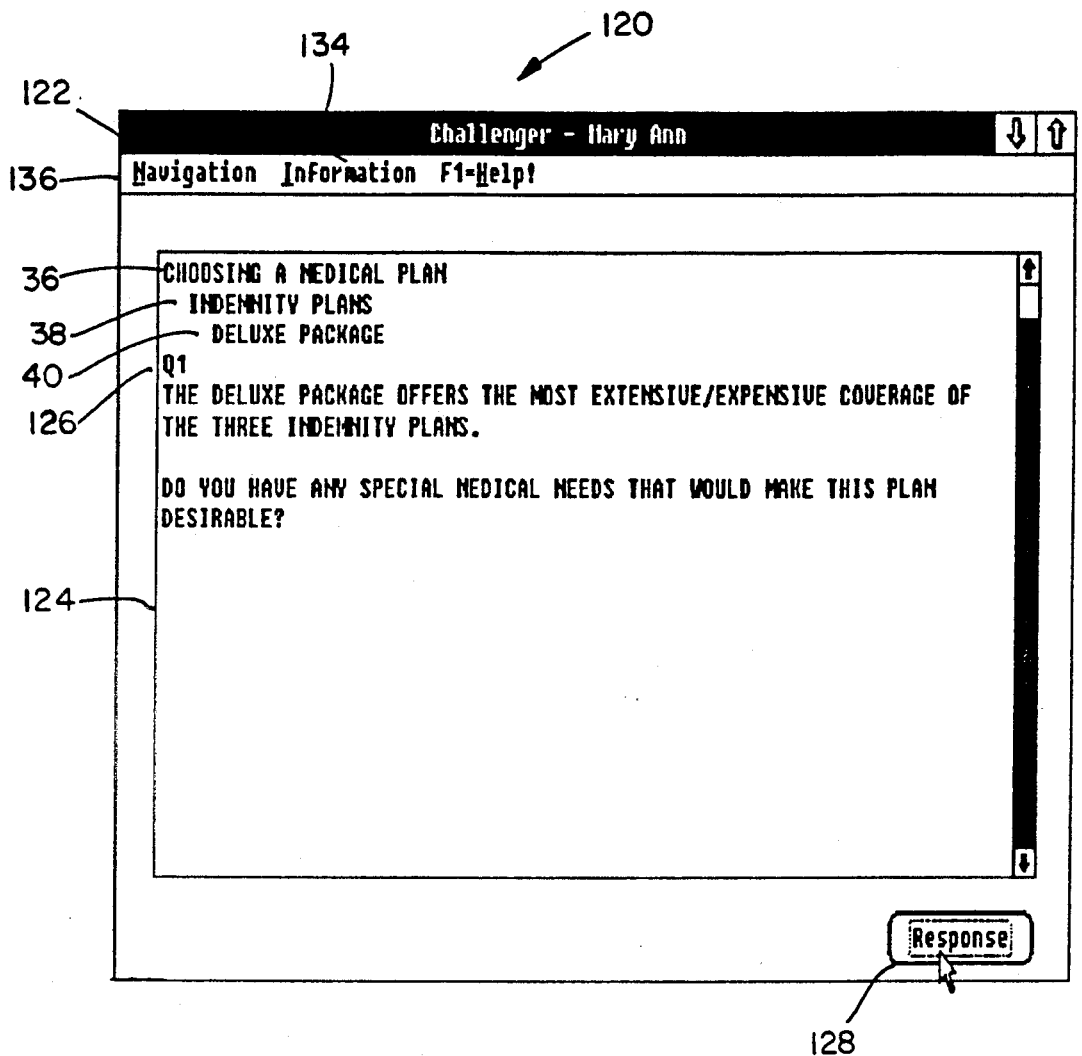
FIG. 8 is a screen display of the User Component Challenger window.

Once the user has selected a Subject, entered a Name, and is satisfied with the list of qualifiers in the Main Window, he is ready to begin a Challenger session by selecting Challenger 86 from the Main Window menu bar 82 (FIG. 5). The System will then generate a new session number and begin the Challenger session by displaying the Challenger Window 120 (FIG. 8).

The Challenger Window 120 (FIG. 8) directs all Challenger activities, including question display, response selection and access to Super Ref (Information 134) content categories. FIG. 8 shows the Challenger Window as it initially appears. At the top, the Title Bar 122 shows the Mode selected and Name field content, copied from the Main Window. In the upper left corner of the main area 124, the subtopic name 40 is displayed below the subject name 36 and higher level topic 38 to which it is related. The first topic question 126 is then shown. When answered, questions are replaced by new ones automatically. As the user completes the questions for one topic and moves to another, the topic name is automatically updated.

It should be remembered that the purpose of Challenger questions is to ensure that the user is applying critical knowledge (Super Ref) correctly to the task at hand. To assist in selecting the best, most thoughtful response, Challenger and all the Super Ref categories are available to help the user. Collectively, this information will (1) ensure clear communication of all questions, no matter what the user's experience level; (2) provide the user with additional content for consideration; and (3) provide for more in-depth exploration of any topic.

Whenever a question appears, the user may choose from four alternative courses of action: (1) ask for a restatement of the question for clarity or assistance in thinking it through, (2) view related Super Ref knowledge before answering, (3) answer the question directly, or (4) not answer at all, preferring instead to skip to other questions or topics first. Each of these navigation options is explained in detail immediately below.

Option 1

Figure 9:
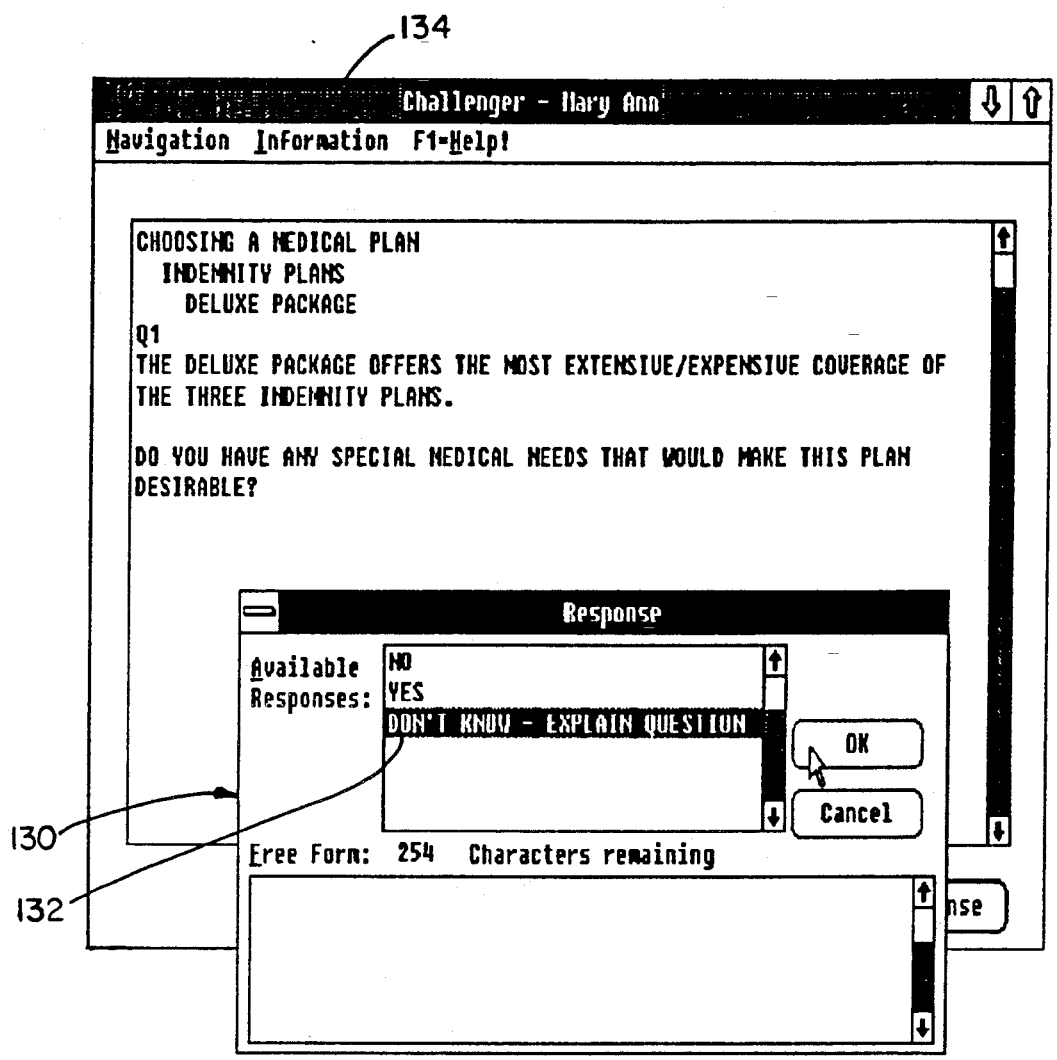
FIG. 9 is a screen display of the User Component window for responding to a Challenger prompt or question.

In most cases, the question will be clear and singular in meaning. However, to accommodate those employees with different backgrounds, some questions can be restated to ensure clarity. If this is the case, a special response, such as "More Info—Explain Question" will appear as a selection 132 (FIG. 9). Once this is selected, one or more different, explanatory questions will appear. Together these explanatory questions will assist the user in a deliberately detailed thought process prior to answering the original Challenger question. When the last of the Explanatory questions has been answered, the original Challenger question will reappear with the original answer. The user may then change his original response.

Option 2

If the question is clear, but the user needs more information from which to make a thoughtful response, he may review information from the topic's associated Super Ref categories. To review this content, the user positions the cursor on Information 134 on the menu bar 136 (FIG. 8), and clicks on the mouse. A pull-down menu 138 listing the topic's Super Ref categories will appear (FIG. 10). The user selects any category by clicking on it, and studies the information selected which is displayed alongside its related Challenger question.

Once the user has reviewed the Super Ref information, he can clear the Super Ref informational window by double-clicking on a small horizontal bar available in each window in its upper left corner.

Option 3

Figure 11:
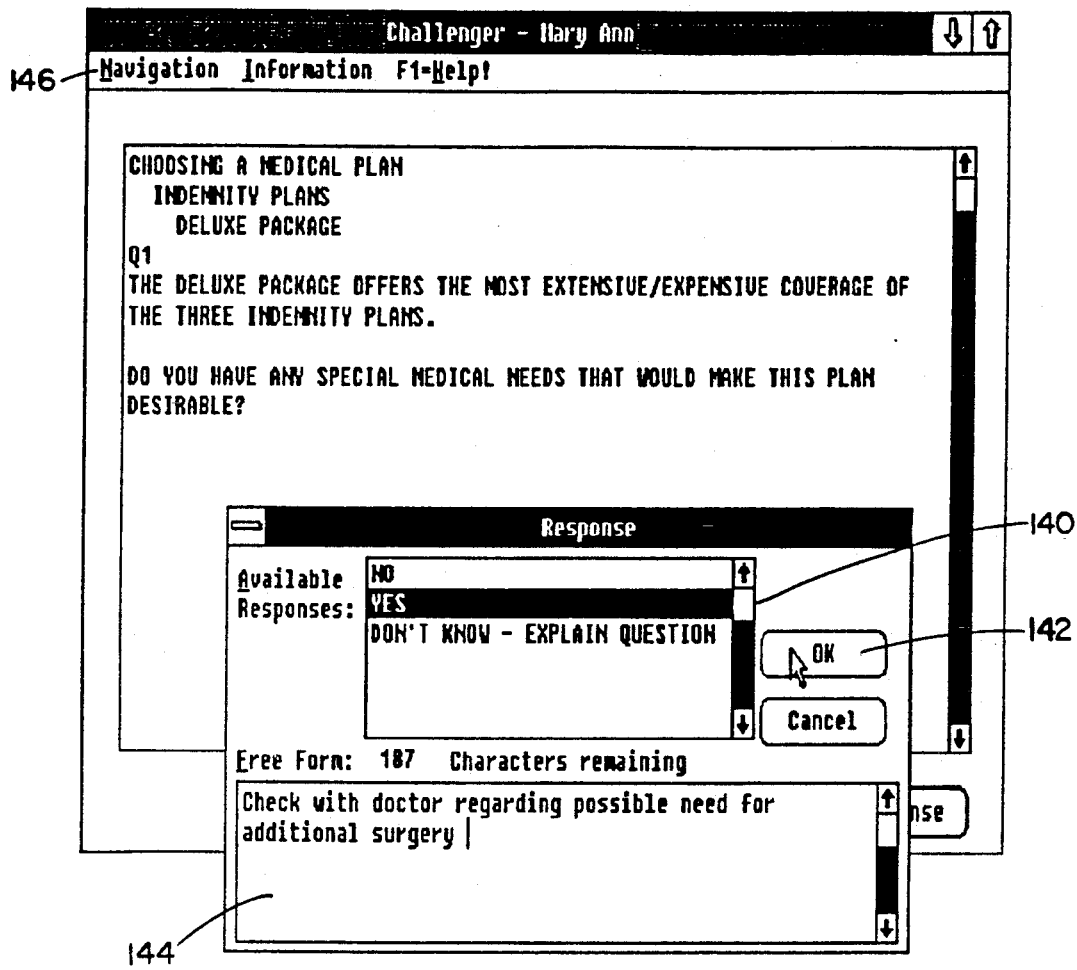
FIG. 11 is another User Component screen display for responding to a prompt or question in Challenger.

The question can be answered directly, for example "yes" 140 (FIG. 11) by: clicking on the Response button 28 to display the list 130 of available multiple choice responses, scrolling to the best answer and when ready, clicking on OK 142 to register the response. Sometimes, however, before registering a response the user may also wish to make a note, or jot down an idea. If that is the case, the user highlights the chosen response, then moves the cursor to the Free Form Box 144, clicks on the mouse, and begins typing in his comments. This Free Form Box 144 is also used when the question calls for an answer. In this case, "Free Form" will show up as a response selection. When the user has finished selecting an answer and completed any notes he clicks on OK 142.

Option 4

To view the preceding or next question in sequence, the user selects Navigation 146 from the menu bar, then Previous or Next as provided in appropriate windows (not shown). To view any related Explanatory questions, he selects Navigation then Explain (not shown). To skip to a completely different topic, the user clicks on Navigation, then Table of Contents. Next, the user highlights the topic choice and clicks on OK. The first question for that topic will appear.

Figure 40:
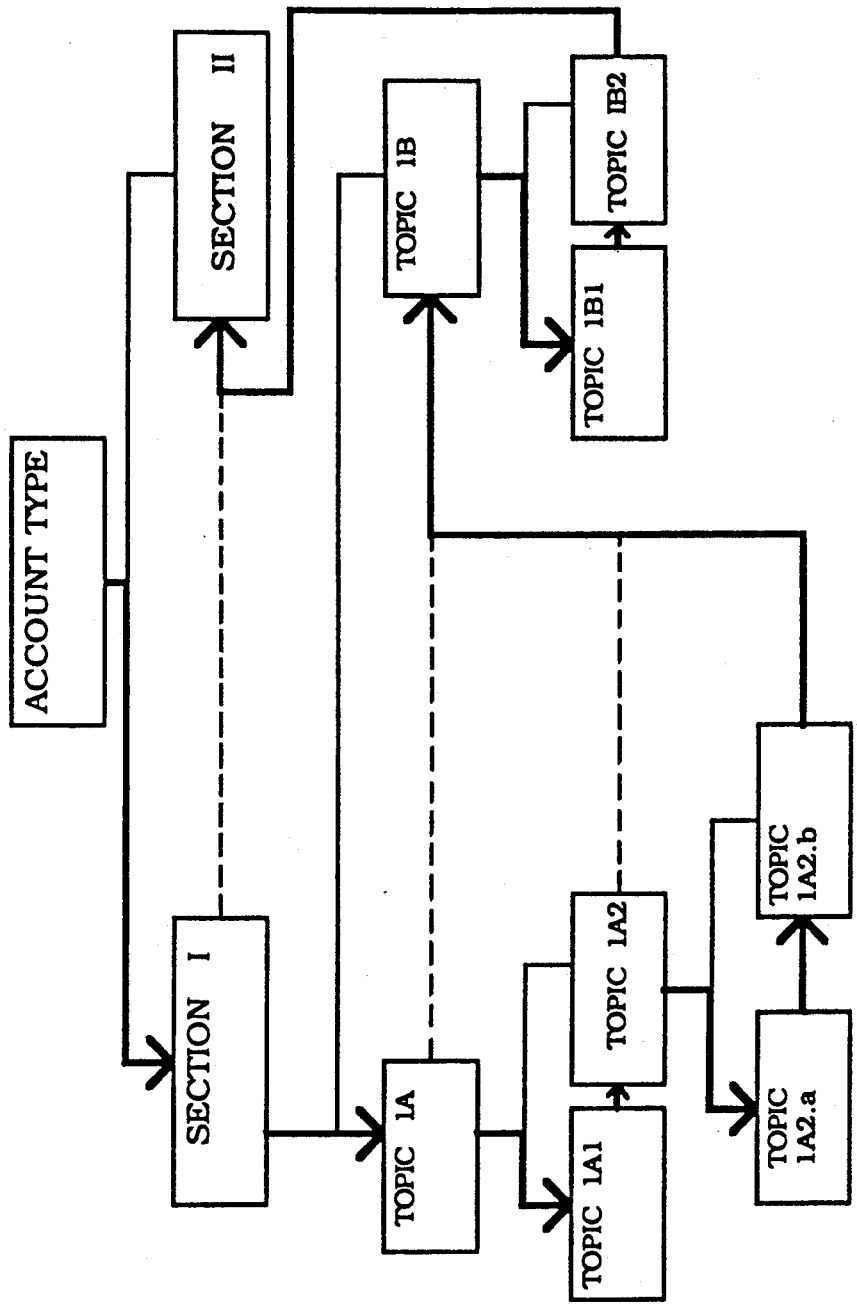
FIG. 40 is a diagrammatic representation of the standard navigation provided in the preferred embodiment of the Challenger portion of the User Component.

FIGS. 40-42 schematically illustrate the essence of the flexibility afforded by the navigational options of the Challenger interaction function of the present invention. There are three basic types of navigation options, i.e., how the user "travels" through the questions contained in the topics and subtopics, each of which can be considered a node. For example, if the knowledge system were implemented in an insurance company and a particular subject were "Account Type", FIG. 40 indicates the standard path of navigation. FIG. 41 illustrates the "user navigation" technique because the user directs the paths to be taken through the hierarchy and, finally, FIG. 42 represents a "qualified navigation" by which the user screens out unwanted information through the selection of the appropriate qualifier code as described in Sections II and III above.

As shown in FIG. 40, the standard navigation through the topic or node structure is from top to bottom and left to right. Responses to Challenger questions will cause the system to take an alternate route. If a parent topic has children, the default movement is to ignore them, and move to its twin. The knowledge engineer can optionally specify the vector codes so that the default movement is to traverse down and then left to right through the children before moving to a twin of the parent topic. If the response to a parent level question is such that the question at the children's level need not be asked, the system will move directly to the parent's twin (system action navigation). If no twin exists for the current topic, the system will continue navigating to the right and up, to the next higher topic in the hierarchy. For example, when the last question in topic node 1A2 is answered, its default navigation would be to go to topic 1B, as 1A2 as no twin 1A3. In FIG. 40, the system default navigation is indicated by the broken lines with arrows, and the user optional navigation is indicated by the said connecting line with arrows.

Figures 41A, 41B, 41C:
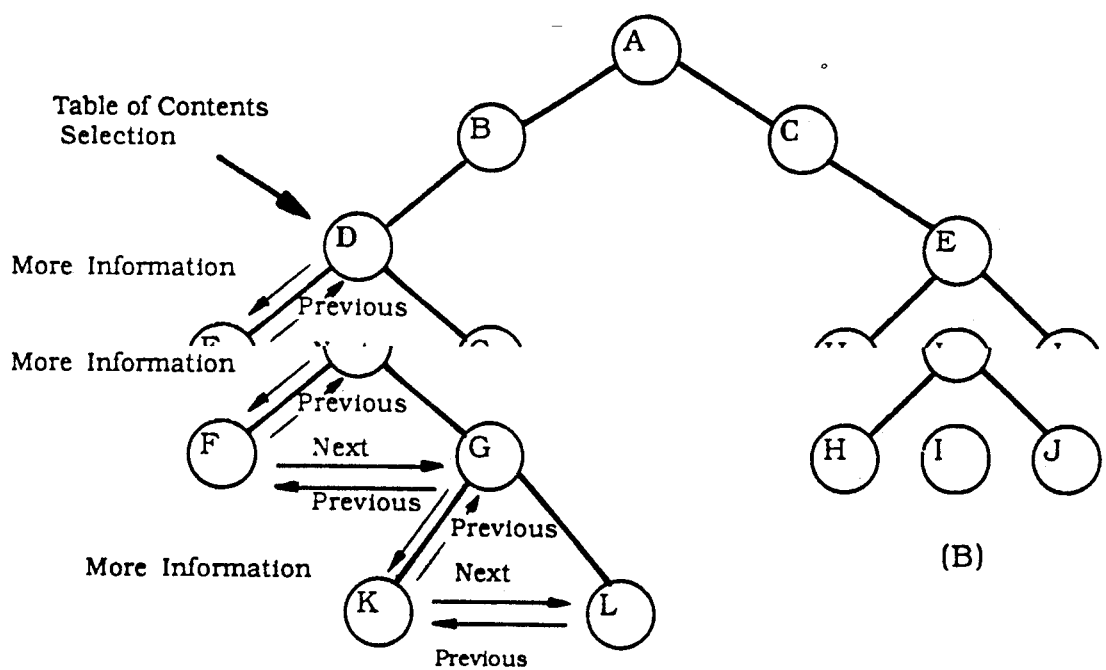
FIGS. 41A, 41B and 41C diagrammatically illustrate the optional navigation paths available to the user in the Challenger mode of operation.

FIG. 41 illustrates a user control navigation through a topic selected from a schematic table of contents in FIG. 41(a). The Table of Contents lists the topic names of the account type subject in the order that they occur in the data structure. A user may select any topic in the Table of Contents and instruct the system to go directly to that topic. The system design also provides for a set of single step actions that allow the user to move through the multiple questions within a topic one question at a time, as shown in FIG. 41(c), the consequences of which are shown in FIG. 41(b). Thus, Next accesses the next question in the topic, More Information accesses down to the first explanatory question and Previous accesses the next question on the left.

FIG. 42 illustrates qualified navigation through the topic outline, accomplished using criteria that qualifies the information of each topic according to whether the topic relates to property or casualty lines of insurance. For example, assume that the topic A leg of the hierarchy had been assigned a property qualifier and the topic B leg was assigned a casualty qualifier by the Knowledge Engineer. If the user qualifies his or her session with a casualty qualification, topic A will be bypassed and the user will see only Challenger questions and other categories of data content related to topic B.

Of course, as described above, the user can, while in a given topic such as IB1, engage in the Challenger dialogue and, during the course of such dialogue, obtain any information associated with that topic in Super Ref (see FIG. 4). If the user, by any navigational means, moves to another topic such as IB2, the Super Ref knowledge base associated with that topic will be available for reference or study. Since qualifiers limit access to just those topics that use them, the more qualifiers a user selects, the smaller the amount of informational topics available to him.

It should thus be appreciated that, particularly with the Challenger mode of operation, the user of the present invention has a very powerful knowledge base and navigational techniques for enabling the user to learn, be advised, or perform problem-solving research, in a very personalized manner that takes into account both the existing skill level of the user and the user's unique, preferred learning style. It should be further evident that the menus, windows, and navigational techniques of the present invention can be easily mastered by persons who are not familiar with computer technology or even word processing skills. Thus, the invention is usable even by persons who have never used a computer workstation.

IV.C. Browse Mode

Figure 12:
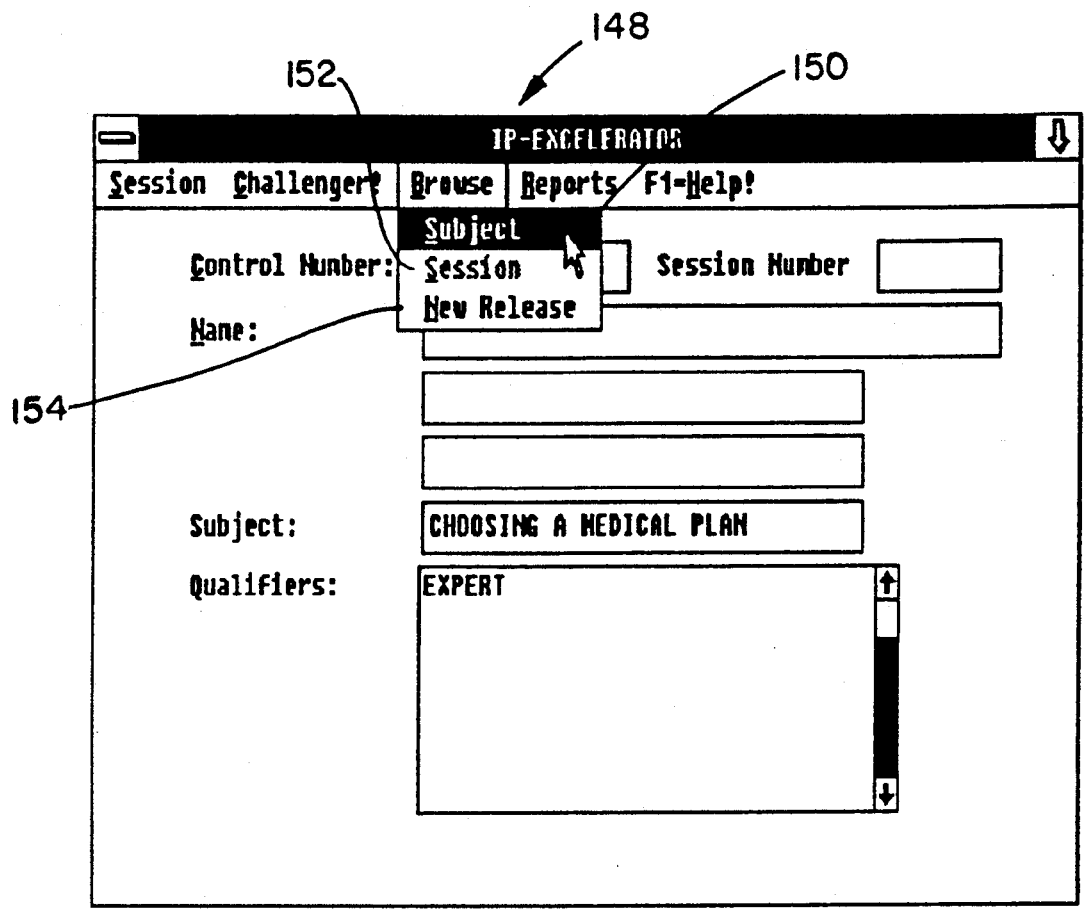
FIG. 12 is a User Component main window screen display for selecting a subject in the Browse mode.

The Browse mode is strictly for viewing Super Ref and Challenger content and therefore precludes answering any Challenger questions. Once the user has selected Browse from the Main Window menu bar 82 (FIG. 5), a pull-down menu 148 appears (FIG. 12) to let her select one of the following three Browse choices:

Browse/Subject 150 gives the user access to a subject's entire Super Ref and Challenger content, including all topics and subtopics under that subject using a navigation capability analogous to that of Challenger. For any given topic, multiple Super Ref content categories can be viewed simultaneously. Browse/Session 152 lets the user browse through the questions and answers of a previously performed Challenger session. Browse/New Release 154 identifies and explains the information that changed since the last System update.

Figure 13:
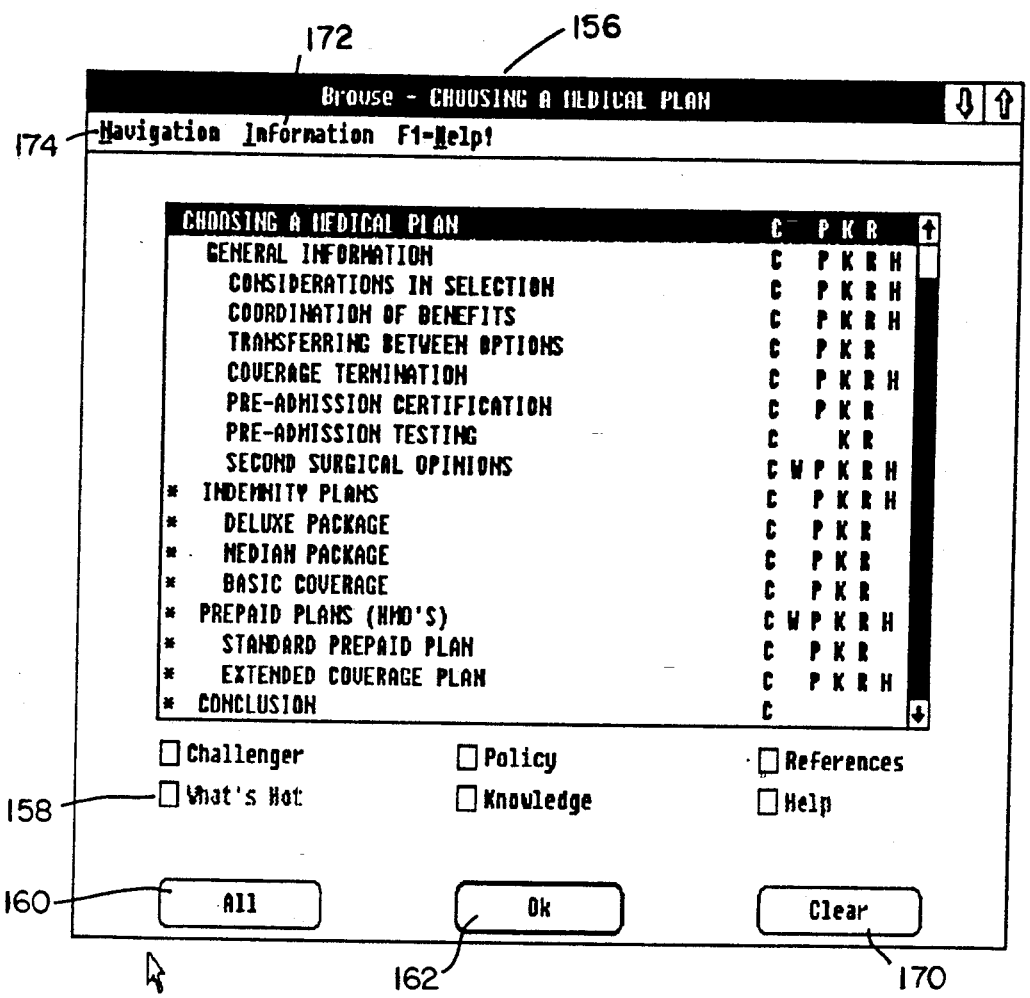
FIG. 13 is a User Component screen display of the Table of Contents in the Browse subject mode.
Figure 14:
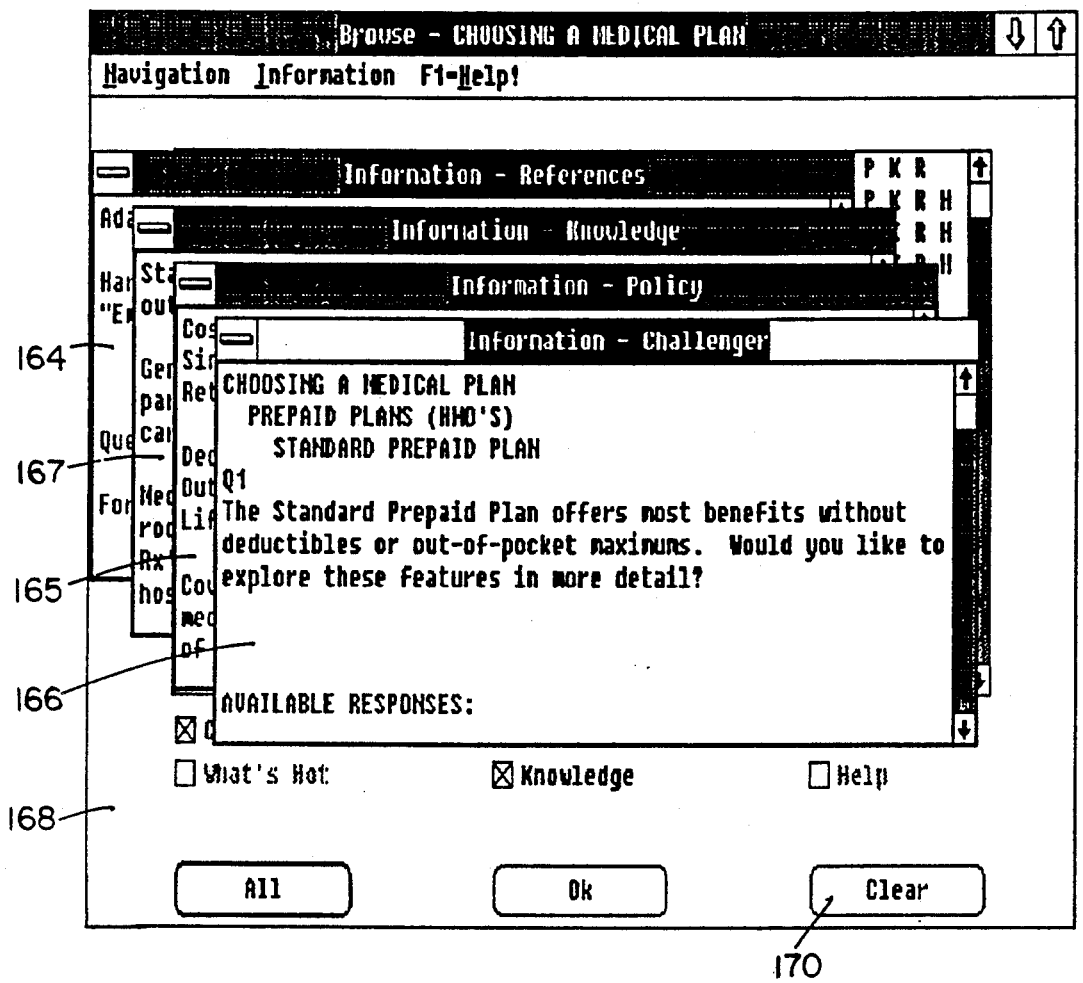
FIGS. 14A 14B and 14C illustrate typical User Component screen displays for viewing text and graphics in multiple information categories for a given topic.
Figure 14B:
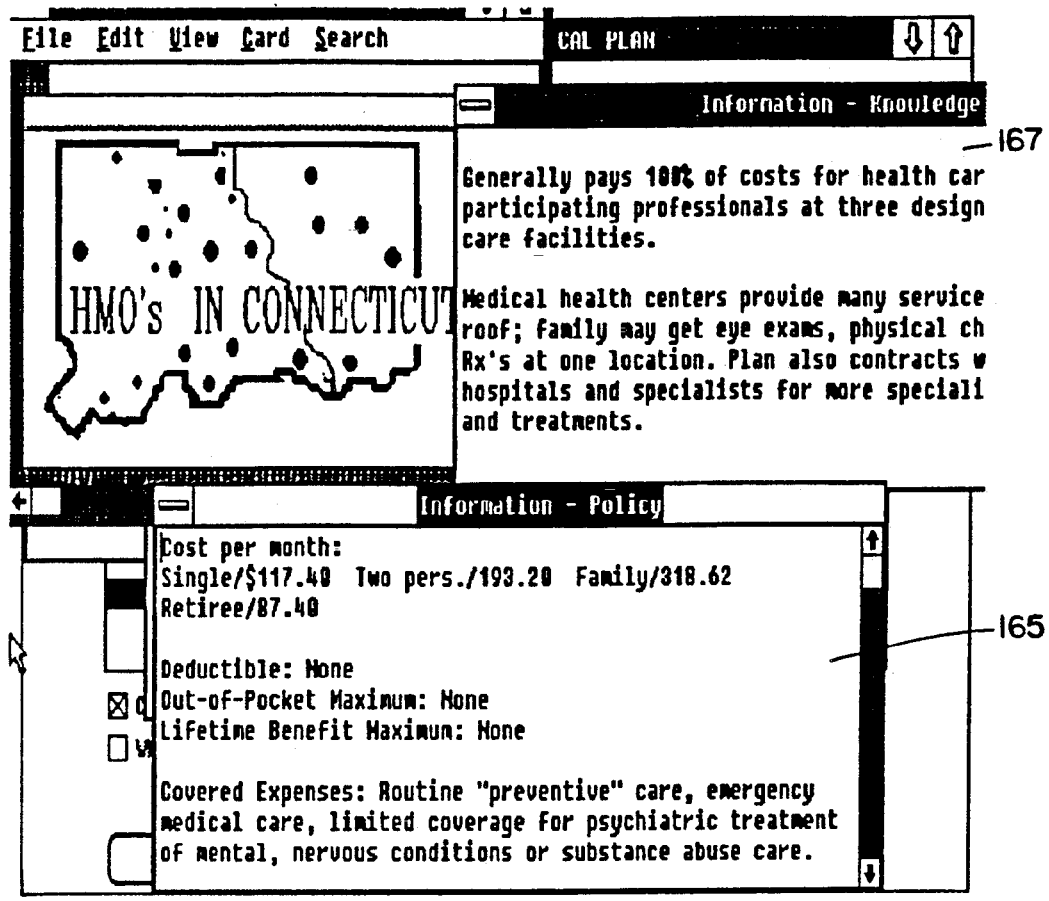
Figure 14:
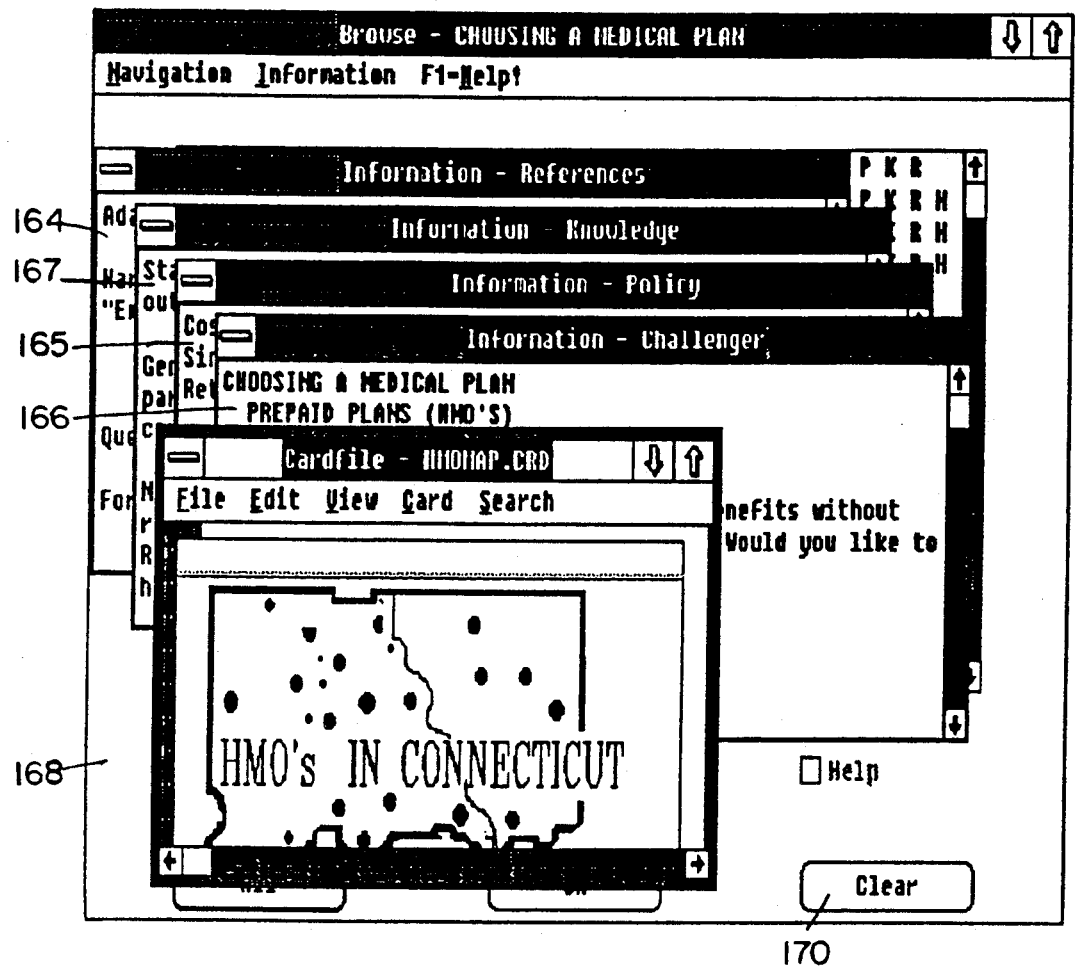

When Subject 150 is selected from the Browse pull-down menu 48, the Table of Contents window 156 for that Subject appears (FIG. 13). All Subject topics to be browsed are selected from this window. After scrolling to highlight a desired topic, the boxes such as 158 at the bottom are used to select those information categories and/or Challenger that the user would like displayed. The user can select the categories individually or retrieve all available topic content by selecting All 160. When the user is satisfied with her information choices, she clicks on OK 162 and the categories will appear immediately in stacked window fashion (FIG. 14A). The user can swap the content windows 164, 165, 166, 167 back and forth or move them around as desired (FIG. 14B), or retrieve the Table of Contents from the back 168 to make new choices. Each content window contains one information unit. After viewing, the user clicks on Clear 170, and the content windows disappear to make room for the next topic choices.

To view the glossaries or images that may be stored in MS-Cardfile (FIG. 14C), the user clicks on Information 172, then clicks on MS-Cardfile, then the filename to be displayed. If the user is viewing Challenger questions, she can use the Navigation selection 174 on the menu bar to display the Previous, Next or related Explanatory (Explain) questions. To return to the Main Window 80 (FIG. 5), the user simply clicks on Navigation 174 (FIG. 13), then Exit.

The Browse Session menu 148 (FIG. 12) selection lets the user review the Challenger activity for the session defined in the Main Window 80 (the session just performed or the previous session retrieved). Browse Session 152 begins by displaying the first topic question and the response that was chosen. To move to another question or topic, the user employs the Navigation 174 pull-down menu selections. To display the related topic Super Ref content, the Information 172 pull-down menu options are selected.

IV.D. Reports Mode

Figure 15:
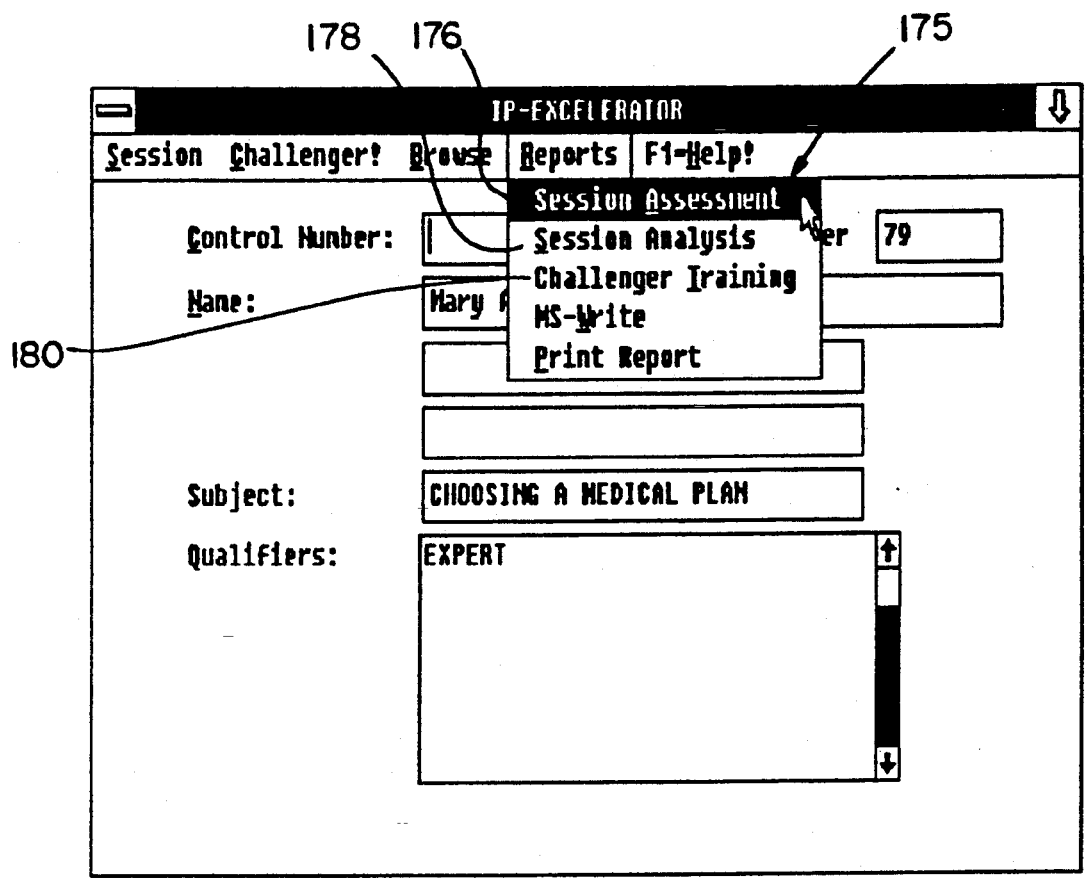
FIG. 15 is a User Component screen display for selecting a report in the Reports mode.

After completing a Challenger session (or retrieving a prior one), the user may elect to print the activity. From the Main Window 80 (FIG. 5) selecting Reports 90 produces a pull-down menu 175 (FIG. 15) with three choices: The Session Assessment Report 176 lists just the answered Challenger questions with any free-form notes taken during the session. The Session Analysis Report 178 also lists answered Challenger questions, but embeds them in the subject outline for reference. It also includes all unanswered questions, by topic, with their associated responses and any free-form notes taken during the session. The Challenger Training Report 180 lists all topic questions with spaces for writing in answers. This provides the user with a useful training worksheet.

Once the choice is made, generating the report is easy. A message tells the user the report is being formatted in memory. When formatting is complete, another message box asks if the report should be sent directly to the printer (Print), viewed first (View), or Cancelled.

IV.E. System Help

Figure 16:
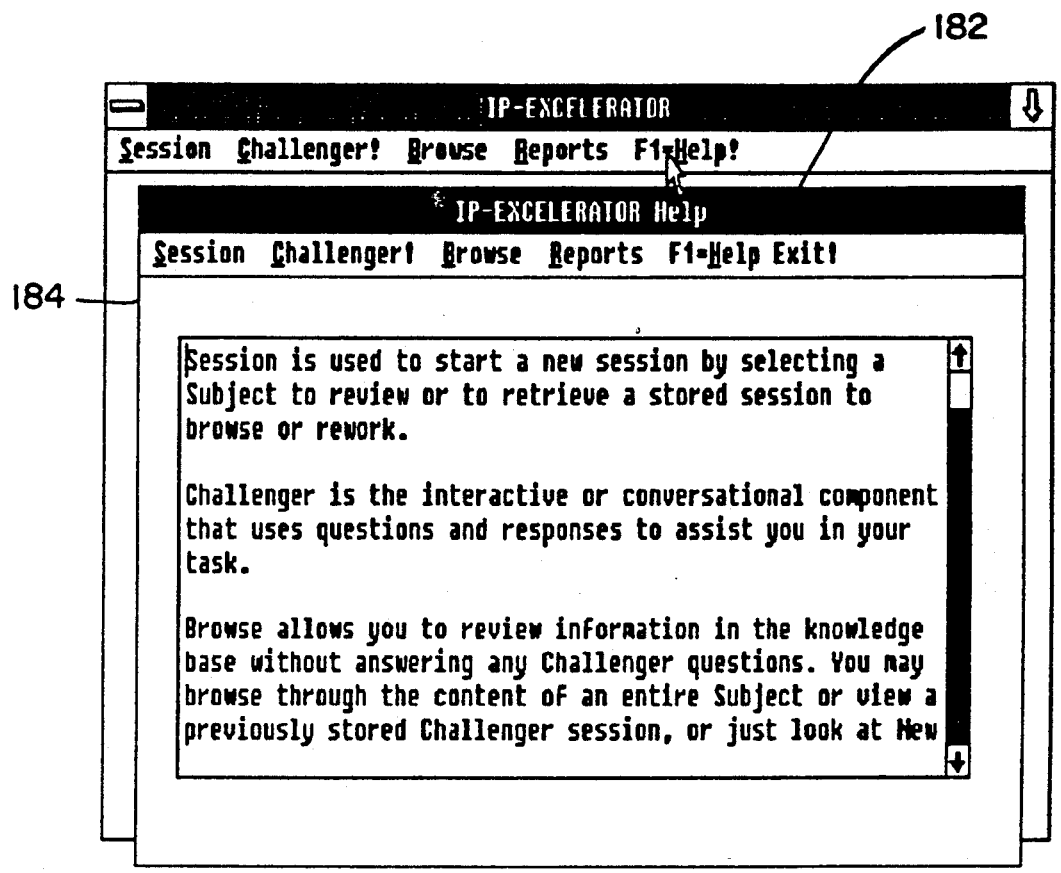
FIG. 16 is a User Component screen display for a System Help window.

The System supports a comprehensive Help facility designed to assist user with all system functions and commands. The F1-Help! selection 92 (FIG. ), available on all main windows, provides explanatory Help content for all system menus and menu items. System Help is initiated for any window by clicking on F1=Help! (or hitting the F1 Function key). This brings up a special System Help Window which duplicates and overlays the window the user was working in when she asked for Help. (See FIG. 16). By positioning the cursor in the title bar 182 of the Help Window 184 and dragging the mouse to the bottom or side of the screen, the user may view both the application window and the System Help window simultaneously. To view Help content for any command or menu item, the user merely clicks on that command or menu item in the Help window.

V. Development Configuration

V.A. Modes of Use

The Knowledge Engineer is responsible for creating and maintaining the Super Ref and Challenger content, i.e., the Knowledge Base (FIG. 4). The Content Maintenance component consists of two programs developed to support these functions as shown in FIGS. 48–51. Outline Maintenance is used to establish and maintain the subject outline, i.e., topics and subtopics in the knowledge base. Content Maintenance is used to enter, modify or delete the content of the information units that is keyed or indexed to this outline.

V.A.1. Outline Maintenance

Before the Knowledge Engineer adds actual content to the data base, the Subject must be identified and its outline established. The outline then becomes the master framework for entering the actual content. Each topic may or may not have related subtopics. If subtopics do exist, they are listed below their associated topics.

FIG. 17 shows a sample outline structure of a typical knowledgebase. Easy-to-use maintenance operations such as inserting new topics within existing outlines, deleting topics and changing topic names are all available. To illustrate this process, the outline for a new subject Utilities will be entered. A partial outline appears in FIG. 18.

Figure 19:
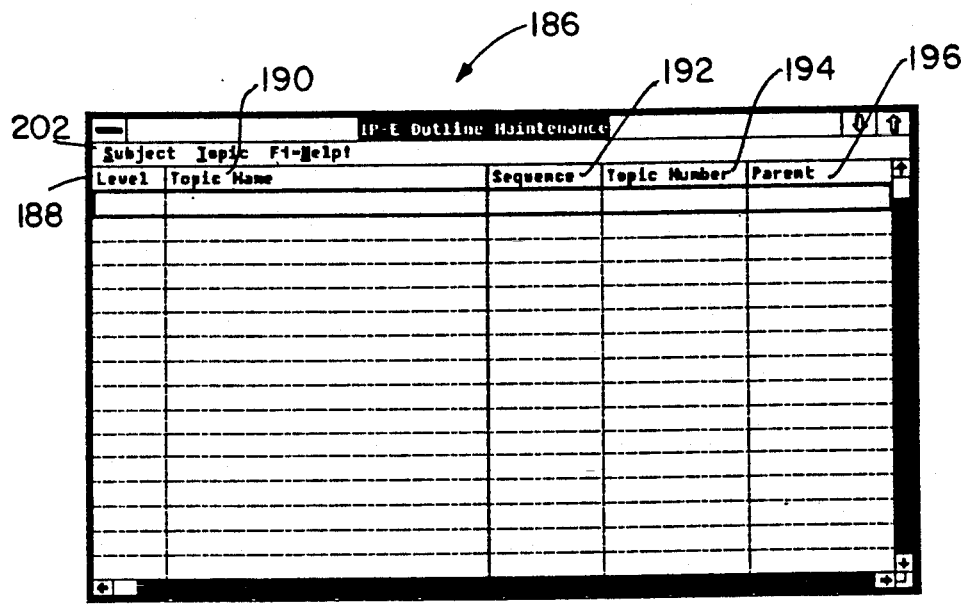
FIGS. 19A and 19B are screen displays from the Outline Maintenance portion of the Maintenance Component, for the table definitions of the topic nodes.
Figure 19:
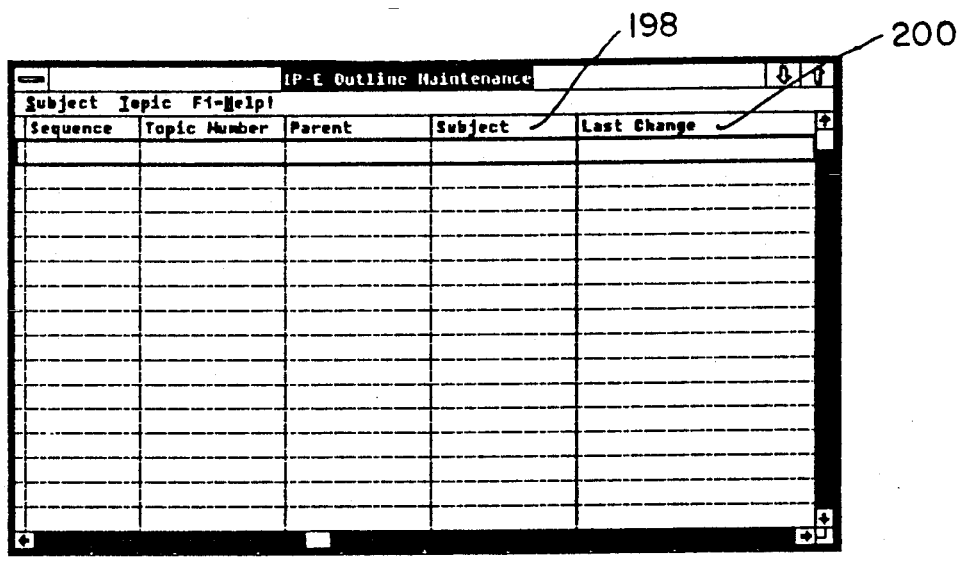

The Outline Maintenance function, once selected, presents the Outline Maintenance window 186 shown in FIGS. 19A and B. This window is the starting point for all outline maintenance activities and provides a visual reference for work in progress.

The table in the main window 186 defines the complete outline of a selected Subject. It displays required information for each topic, including level in the outline hierarchy 188, topic name 190, Outline Sequence number 192, Topic number 194, Parent Topic number 196, Subject Topic number 198 and Last Change date 200. Topics are listed in the table in vertical sequence.

The first step in creating the outline for a new Subject is to enter the Subject name into the system. To do this, the Knowledge Engineer clicks on Subject 202, then on Add 210 in the Subject list box 208 that appears. (See FIG. 20.)

Figure 20:
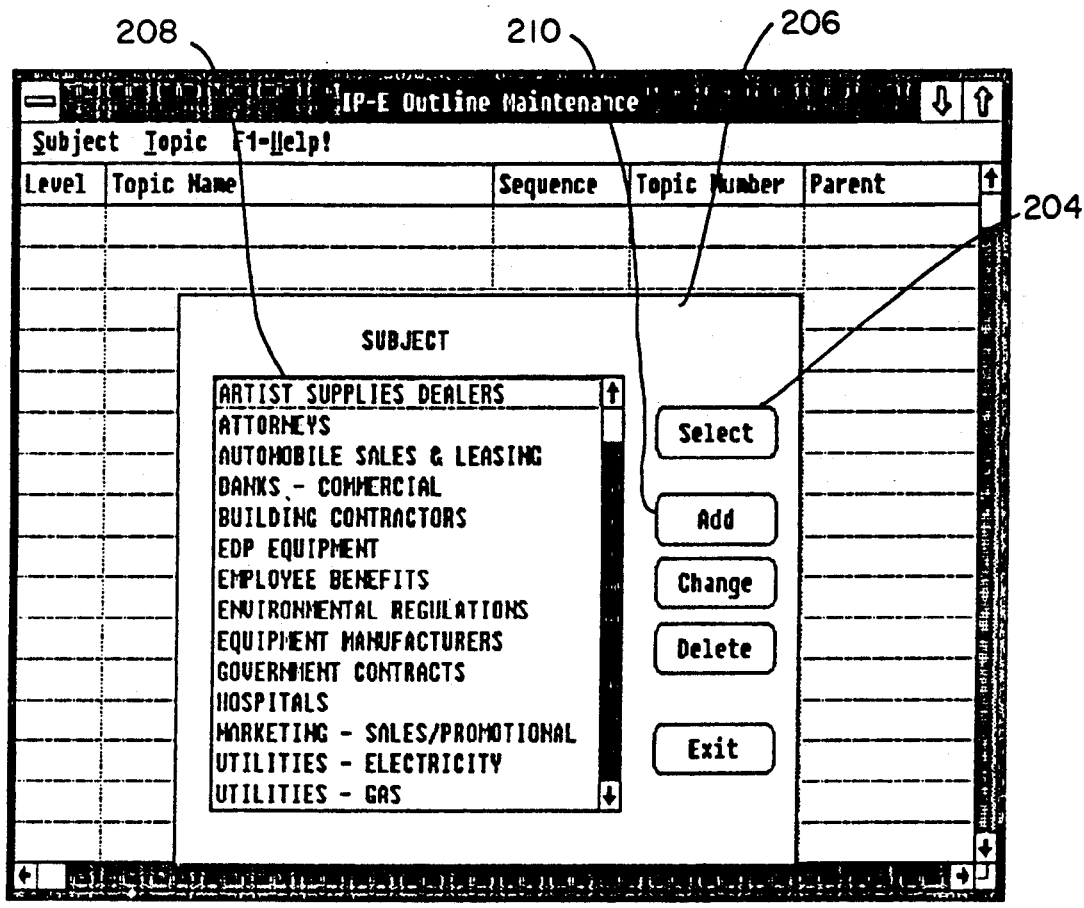
FIGS. 20 and 21 are screen displays from the Outline Maintenance portion of the maintenance component, showing how the subject name can be added or changed.
Figure 21:
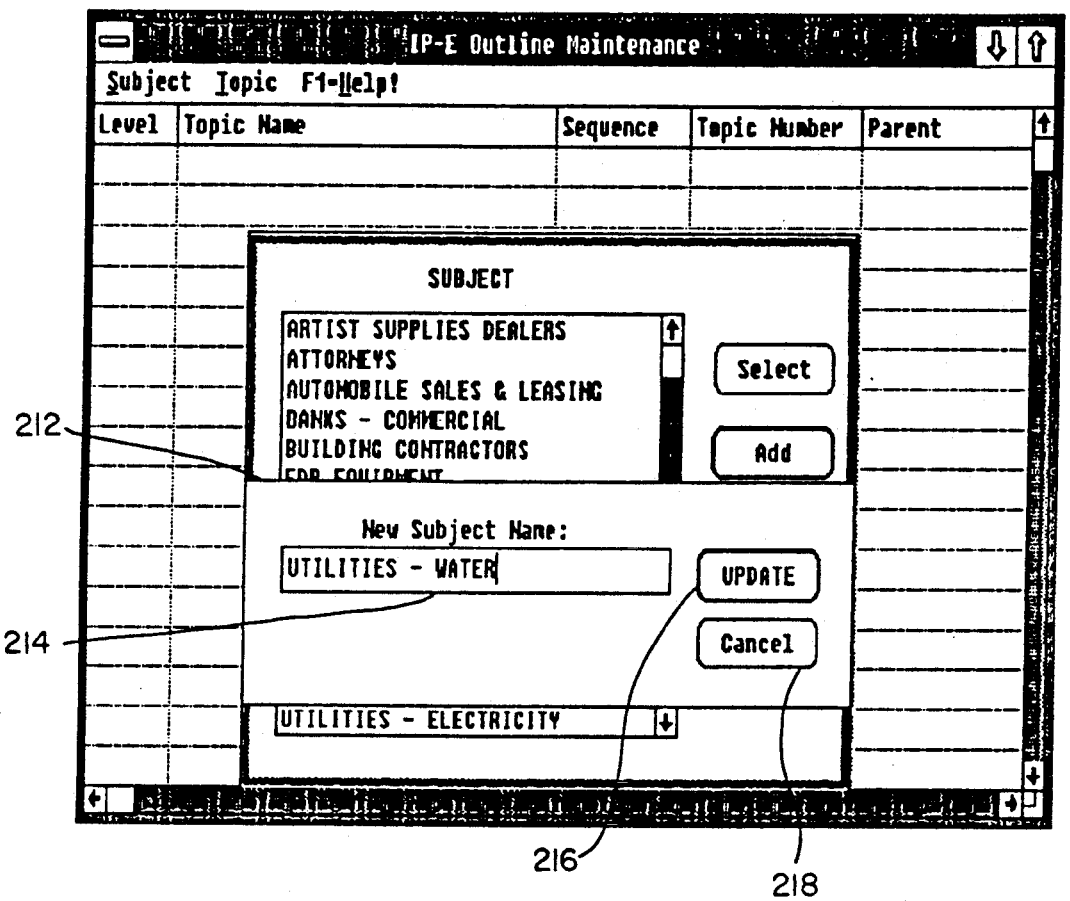

This causes a second box 212 to appear, shown in FIG. 21. When the Knowledge Engineer has typed in the correct name 214, he clicks Update 216. The display will automatically return to the Subject list 208 where the name of the new Subject has been added in alphabetical order. The Cancel push-button 218 returns to the existing Subject list 208 (FIG. 20) without adding the new Subject.

Once the new Subject name is established, the Knowledge Engineer may begin building the topic outline. Immediately after adding a new Subject name, it is automatically highlighted on the list 208 (FIG. 20). Clicking on Select 204 informs the system that the Knowledge Engineer wishes to work with this new Subject. (Or, a different Subject may be selected by highlighting its name in the list 208 and clicking on Select.)

Figure 22:
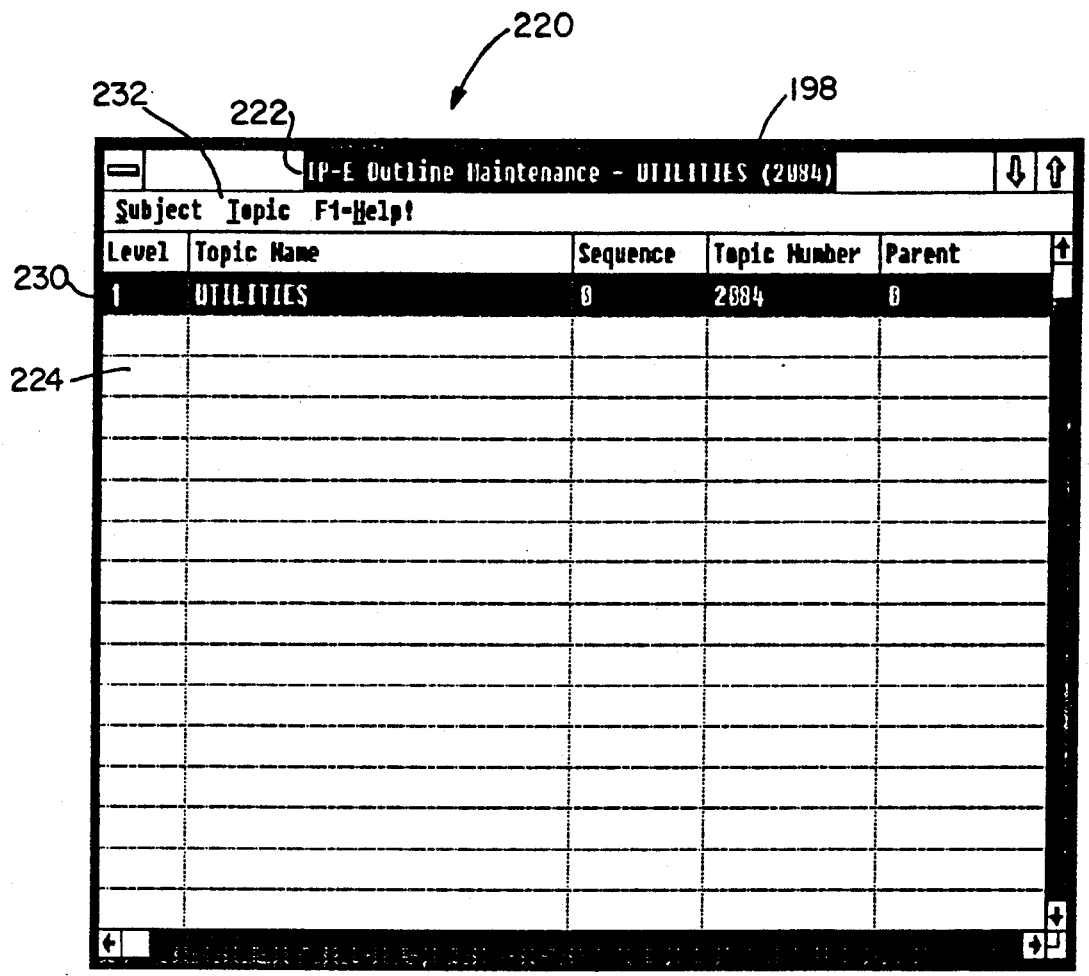

After clicking on Select, the display will return to the Main Window Topic Table 220 (FIG. 22). The selected Subject name and its system-assigned topic number will appear on the title bar 222 (FIG. 22).

As with topic headings in a book's table of contents, each row 224 in the topic table defines a single topic in the outline. Topic rows are displayed in the vertical order that they are established. Each time a topic is added, changed, or deleted, the topic table is automatically adjusted to display the change. The following explains the column information, reading from left to right (see FIGS. 18, 19A and B, 22 and 26).

1. Level 188—A number automatically assigned by the system to indicate the topic's place in the outline hierarchy. The Subject name is always assigned Level 1. All other topics are assigned higher level numbers in subsequent ascending order, with the Subject's children residing at level 2, their children at level 3, etc.

2. Topic Name 190—contains the name entered by the Knowledge Engineer.

3. Sequence 192—is a system-assigned number that identifies the topic's relative position in the outline, assigned in ascending order. This can be changed by the Knowledge Engineer to change the topic order.

4. Topic Number 194—is a system-assigned identifier used only by the system and it cannot be modified.

5. Parent Topic 196—is the system-assigned, identifying number of the topic's parent. The parent topic of the Subject name is always zero.

6. Subject Topic 198—is the topic number for the selected Subject, and thus will be the same for each topic in the outline.

7. Last Change 200—contains the date that the topic was last modified.

Referring back to the outline in FIG. 18, the first topic to be added is Operations. The topic the Knowledge Engineer highlights in the topic table !86 determines the exact position of the new topic in the outline, since new topics are added to the outline directly below the highlighted topic.

Figure 23:
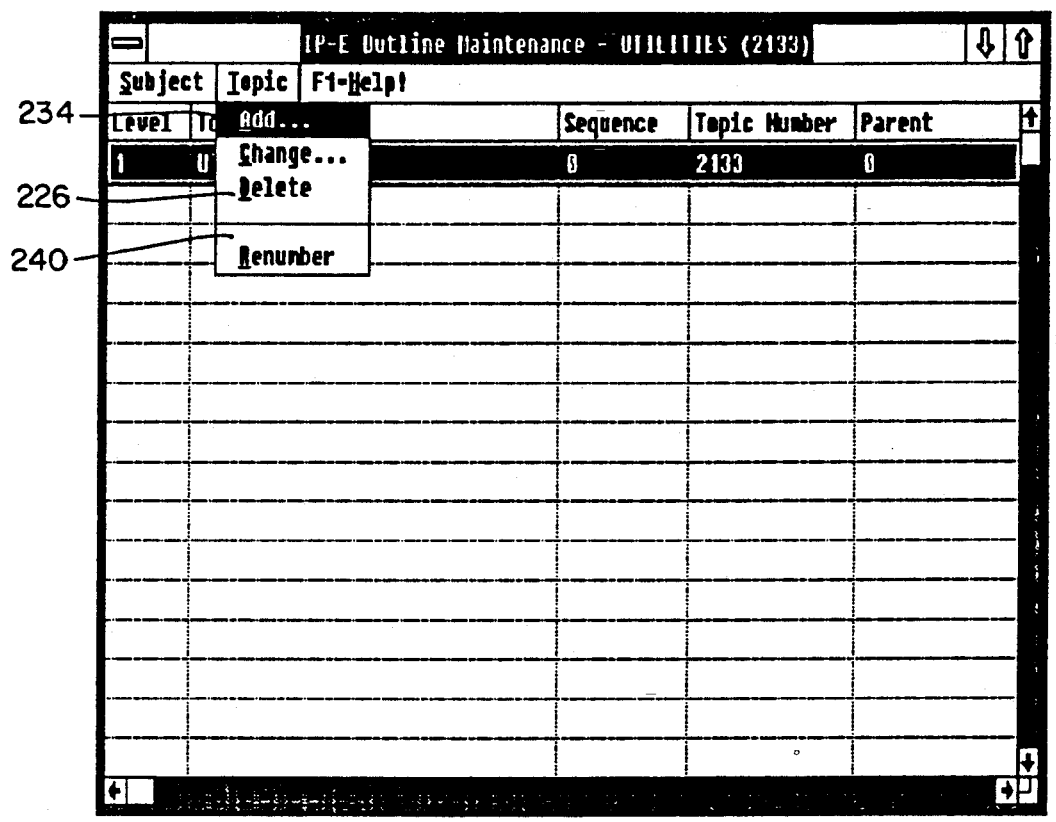
Figure 24:
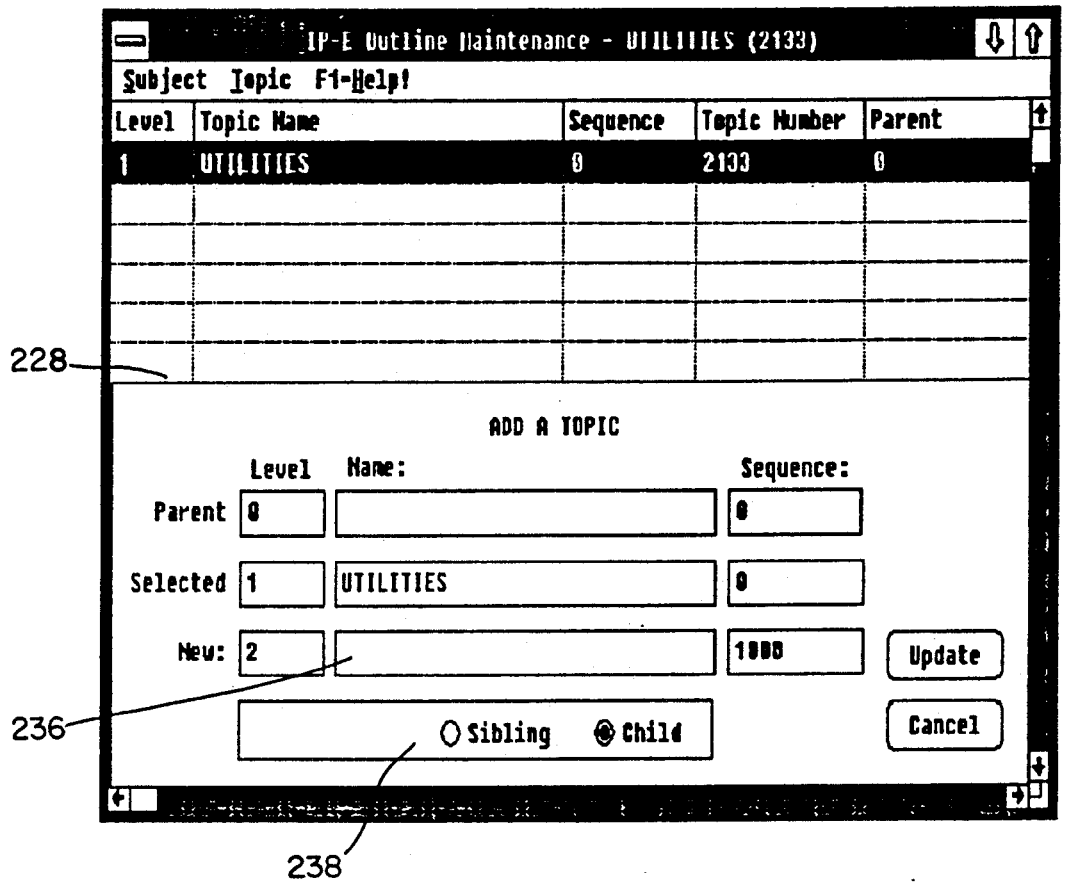

Changes are not made directly on the topic table 186 but through a series of boxes 226, 228 that appear as a result of Topic menu selections, shown in FIGS. 22, 23 and 24. To add the new topic, e.g., Operations, the parent topic, Utilities is highlighted, as at 230 (FIG. 22). Next the Knowledge Engineer clicks on Topic 232 which displays the Topic pull down menu shown in FIG. 23 and selects Add 234. This produces the Add a Topic box 228 (FIG. 24). In box 228 information about the higher levels topics displayed, alongside boxes for information about the new topic.

The first topic (Operation) is added by typing its name 236 at the blinking cursor. Typographical errors may be corrected with the backspace key. The Relationship (child/subtopic or sibling/same level topic) that specifies the relationship of the new topic to the one highlighted in the Main Window is entered at 238. If the highlighted topic is the Subject name (Level 1) it will automatically be added as a child. When the Child relationship is selected, the system automatically fills in the level and sequence number of the new topic based on the level and sequence number of its associated, highlighted topic.

Figure 25:
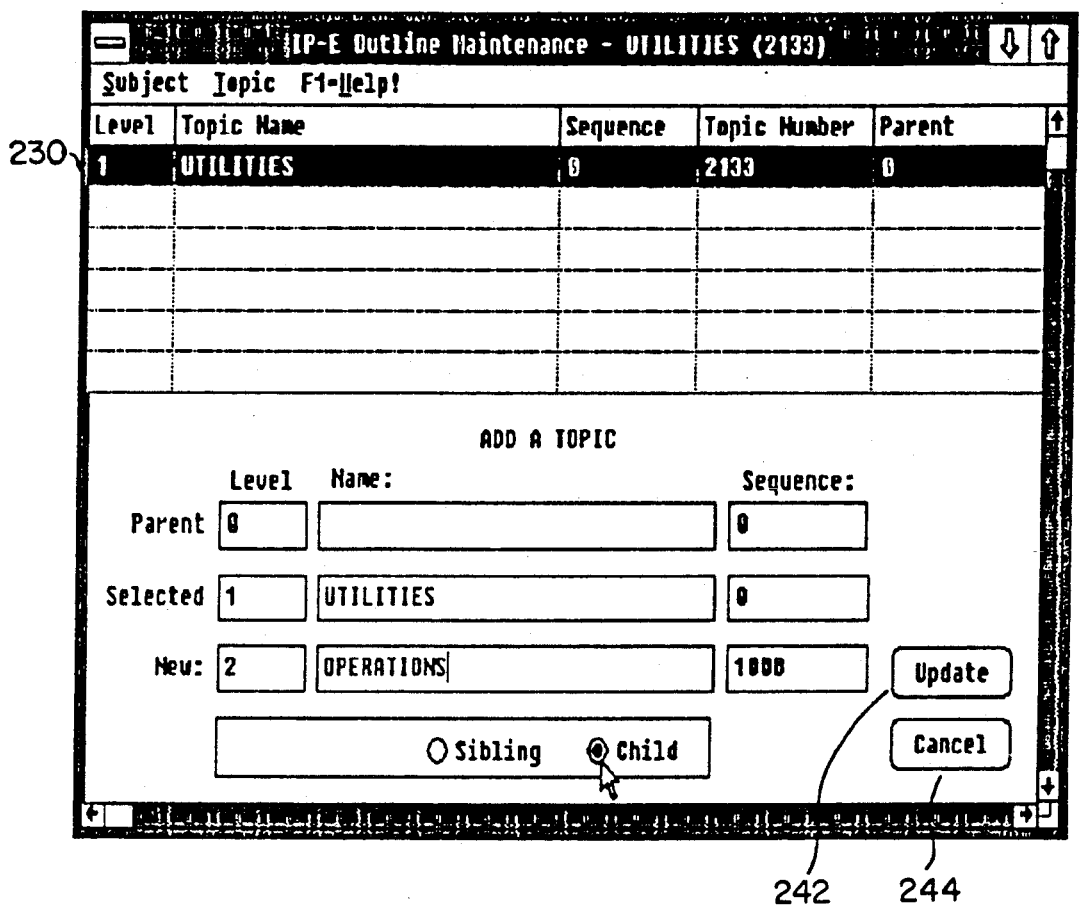

In the example shown in FIG. 25, Operations was designated as a Child (subtopic) of the highlighted topic, Utilities. Because Utilities resides at level 1, the system assigned a level to its child. The sequence number assigned to Operations is 1000, the first sequence number after 0. (The system assigns sequence numbers in increments of 1000 to allow room for future insertions.)

If a topic is inserted between two others, the system assigns a sequence number in between the existing two. If the Knowledge Engineer desires, he may renumber all sequence numbers in increments of 1000 by simply clicking on Renumber 240 in the Topic menu (FIG. 23).

Figure 26:
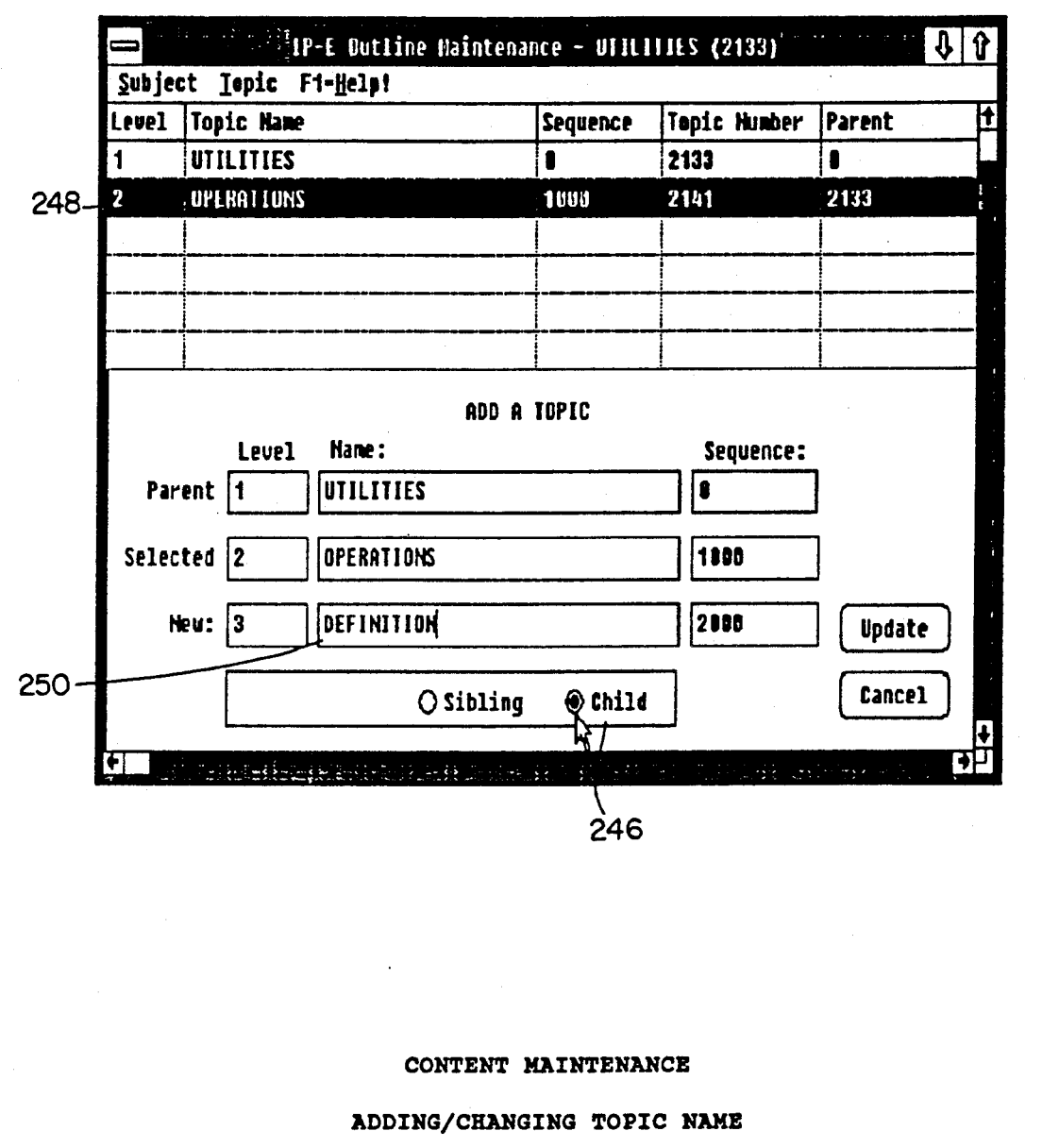

When the topic name and relationship are correct, the topic table is updated by clicking on Update 242 (FIG. 25). This returns the Knowledge Engineer to the Main Window where the new topic is displayed in its proper place in the topic table (see FIG. 26). Cancel 244 (FIG. 25) returns to the Main Window without adding the new topic to the table.

Continuing with the example based on FIG. 18, the next topic to be added is Definitions. A new topic can be added by referencing either the parent or the sibling of the new topic, depending on where the new topic is to fall in the outline. The new topic will appear directly after the highlighted one in the topic table. In this example, Operations is highlighted (FIG. 26) and, when Add from the Topic pull-down menu is clicked, the Add a Topic box appears (See FIG. 26). The Child relationship button 246 is selected to indicate that Definitions 250 is a child of the topic, Operations 248.

The system automatically assigns Definition to level 3 in the hierarchy, since its parent topic, Operations, is a level 2 topic. All topics designated as children of Operations will be assigned to level 3. The sequence number calculated for a new topic will always be higher than the sequence number of the highlighted topic. Since Definition is being added as a child directly below Operations, it is assigned the next highest sequence number, 2000.

It should be appreciated that the position in the outline assumed by the Description topic (FIG. 18) depends on whether it is added as a child of Operations (where it will fall immediately after it, as the first child) or as a sibling of Definition (where it will fall after Definition, second in the sequence of Children.) In either case, Description will be assigned a level 2 by the system. In other words, when adding a topic to the structure, the existing topic highlighted in the table and the relationship defined by the Knowledge Engineer determine the level, sequence number and position of the new topic.

The topic Operations now has two children, Definition and Description. The outline in FIG. 18 shows that Description follows Definition in the outline. Therefore, Description should be added as a sibling of the Definition topic. When clicked on the Sibling relationship button, the new topic is given a sequence number of 3000, indicating that it follows Definition in the outline.

It should be appreciated that the basic outlining sequence described above can readily be adapted for making changes to an existing outline. These changes include correcting the relationship of topics, changing topic names, deleting topics and repositioning topics.

The relationships of outline topics can also be affected by changing the sequence numbers. The hierarchy outline of a given subject is built in a top-down, left to right order. The sequence number assigned to each topic dictates the sequence in which topics are presented in the user component. Sequence numbers increase as one scrolls through the outline. Topics are added to the outline in conformance with this principal. The maintenance of the sequential numbers must be kept in mind when the Knowledge Engineer utilizes changes in the sequence numbers to effectuate the changes in the outline.

V.A.2. Content Maintenance

Once a topic has been entered accurately in the subject outline, the Knowledge Engineer may enter the content for that topic. In a preferred embodiment, content can be created and stored on a separate file using Microsoft-Write, a word processing program included in the standard MS-Windows software package, and then transferred to the data base using its cut and paste Edit feature. Content Maintenance also provides standard text editing facilities to create or modify content directly. Newly created or modified content may be verified by the Knowledge Engineer using the Reports function.

Figure 27:
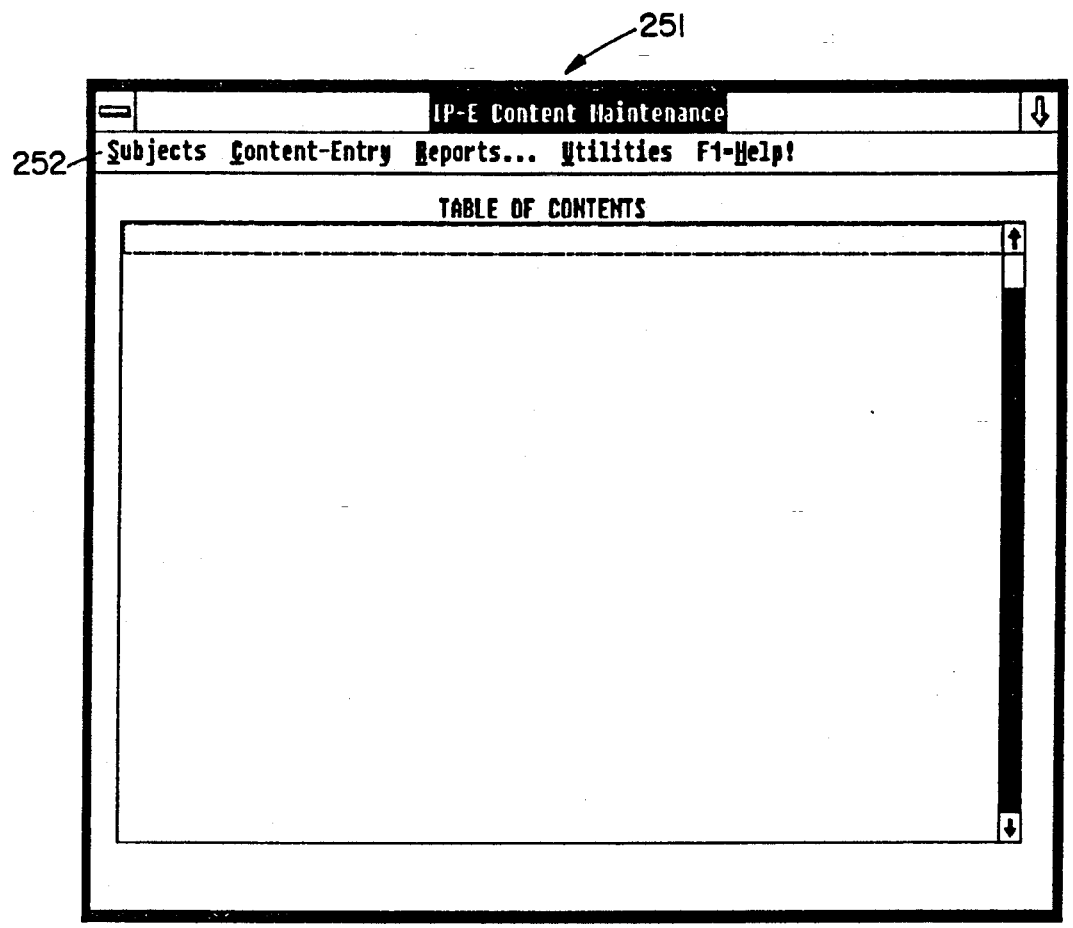

The Content Maintenance program when invoked by the Knowledge Engineer first presents the Content Maintenance Main Window 251, (FIG. 27), from which all content maintenance activities are initiated.

Figure 28:
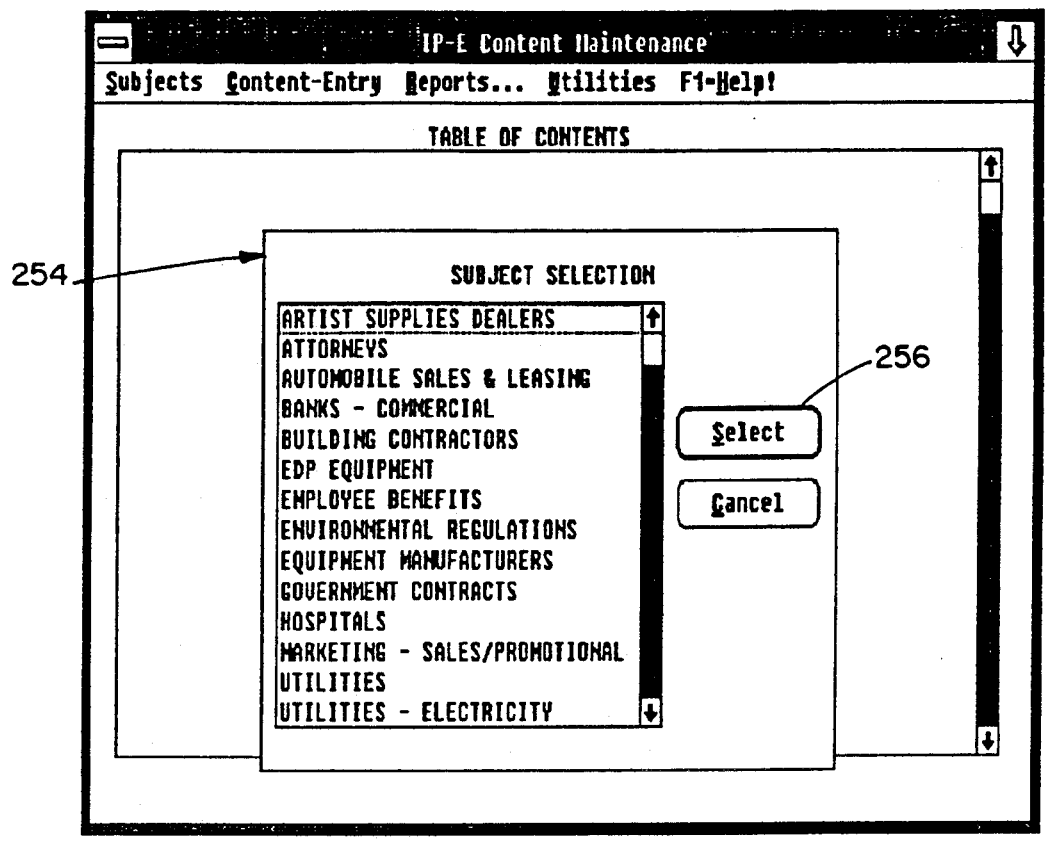
FIG. 28 is a content maintenance screen display for add/changing the content of selecting a subject.

Before entering content text in any category, the Knowledge Engineer must first identify the desired Subject topic and information unit. To select the Subject, she/he clicks on the Subjects 252 in the Main Window to produce the subject selection list box 254 (FIG. 28), which lists all current subjects contained in the selected knowledgebase. To select a Subject, the Knowledge Engineer highlights its name in the list, then clicks on Select 256. This causes the subject's structural outline to be displayed in a window 262 (see FIG. 29). To the right of the outline are symbols that indicate those categories or information units which contain content for the topic. (The letter "C" is displayed if Challenger questions exist, "K" indicates available Knowledge content, and so on.) As content to each topic category is added or deleted, the symbols are updated in the outline to reflect the current status of the content.

Since the System stores content in a series of information units uniquely identified by subject topic and category, these same identifiers locate content in the system for those working with the User Component and the Maintenance Component. Information units are thus the basic units of information storage which can be indexed internally by the system or displayed to the user or knowledge engineer. Each information unit can vary in quantity of content, i.e., byte capacity, up to the limit set by the particular database management program.

The topic in window 262 (FIG. 29) is selected by highlighting its name. The topics information unit is identified by clicking on Content-Entry 264 and selecting the desired content category from the pull-down menu 266 (FIG. 30) that appears. If the Knowledge Engineer clicks on Challenger 274 in window 266, a Challenger content entry window 268 appears, such as shown in FIG. 31. A slightly different window (not shown) would appear if the Knowledge Engineer clicked on any of the other five categories within portion 276 of window 266, i.e., for entry of content in the other cross-referenced categories (Knowledge, What's Hot, Company Policy, References, Help, etc.). Similarly, the Glossary content and Qualifier content are added by first clicking on the desired entry in the respective portions 270 and 272 of window 266.

Figure 32:
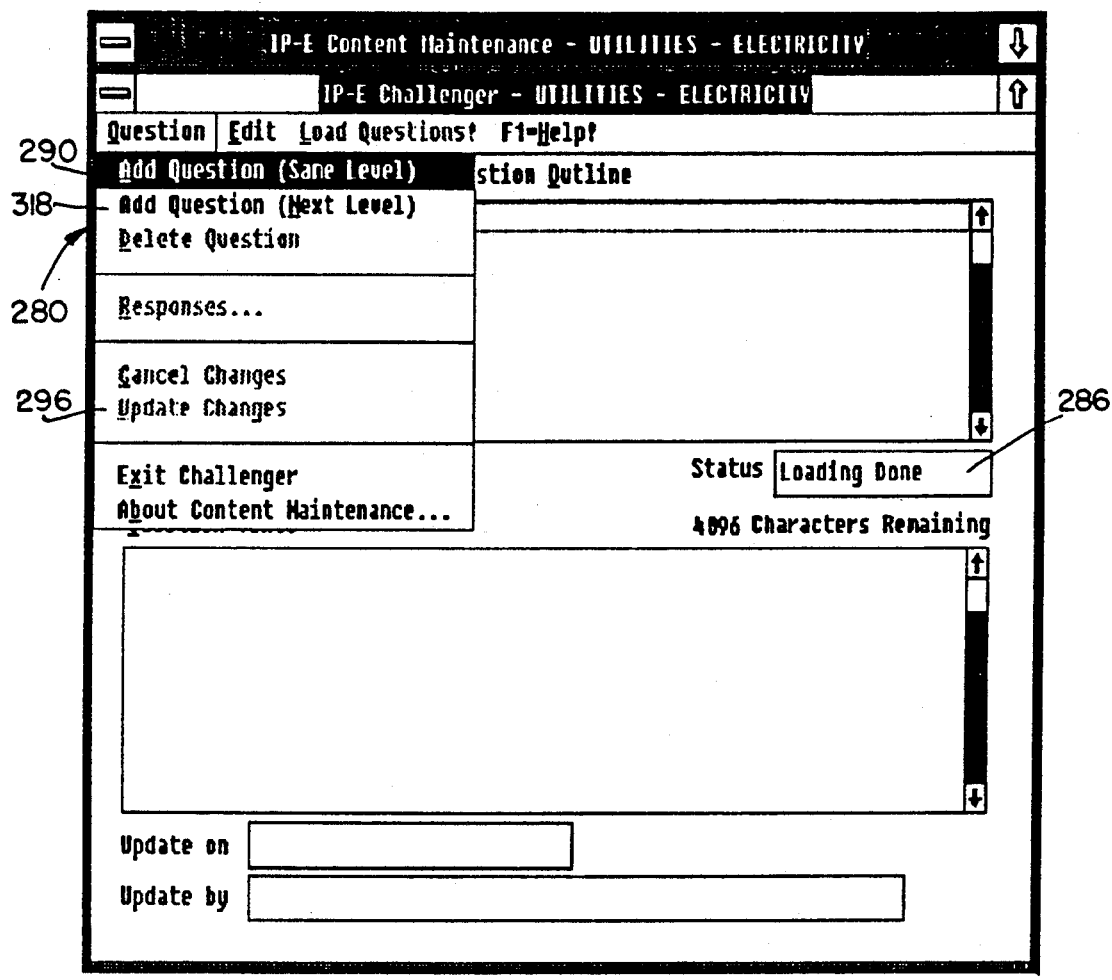
Figure 33:
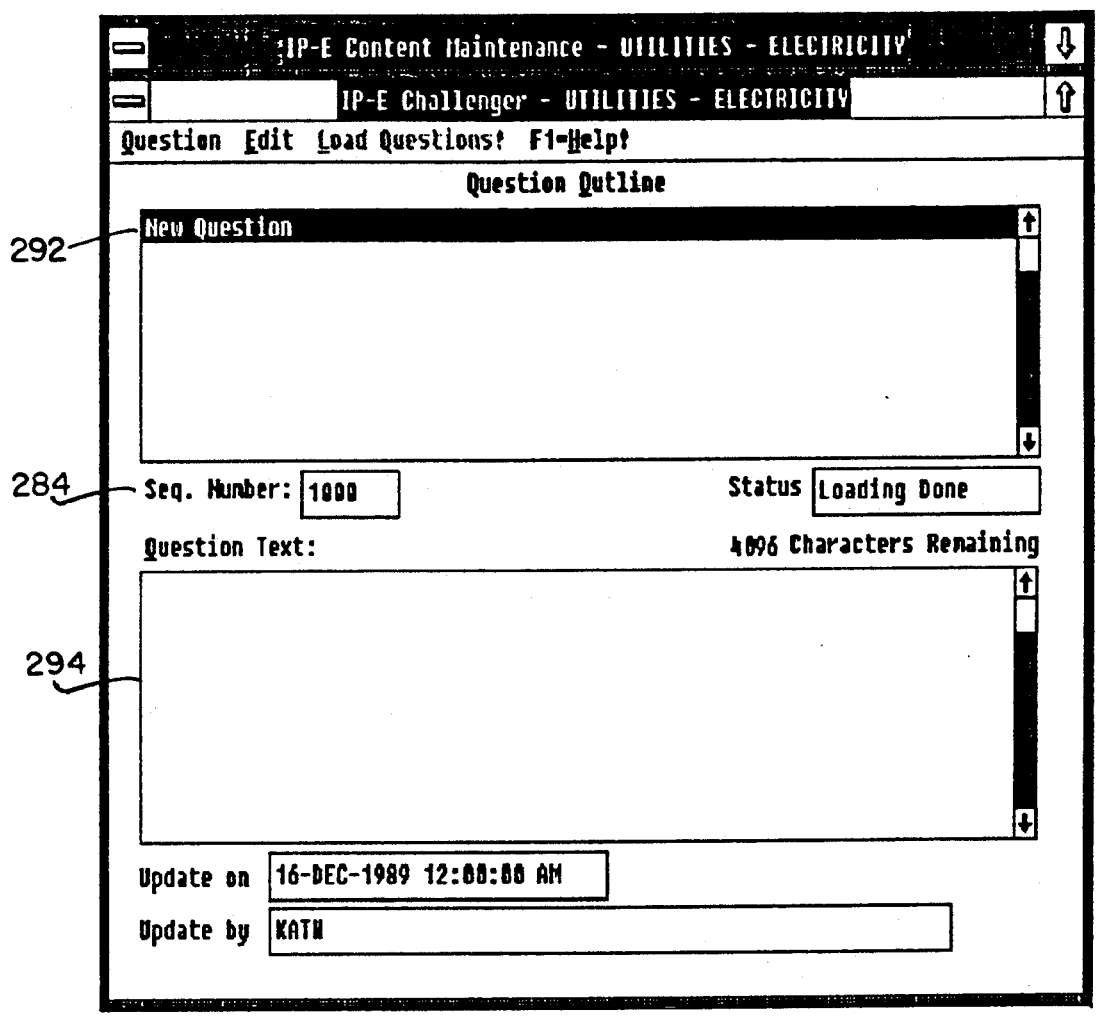

If the Challenger is selected from the content entry menu 266, the Challenger content entry window appears (FIG. 31). From this point, the creation of questions involves a three step process. The first step requires the system to load all existing topic questions by clicking on 278 (FIG. 31). To add a question, clicking on Question 288 then Question 290 (FIG. 32) produces an entry window (FIG. 33). Next, the actual question content is written in the box assigned 294. Finally, one or more responses are assigned to each question.

Figure 30:
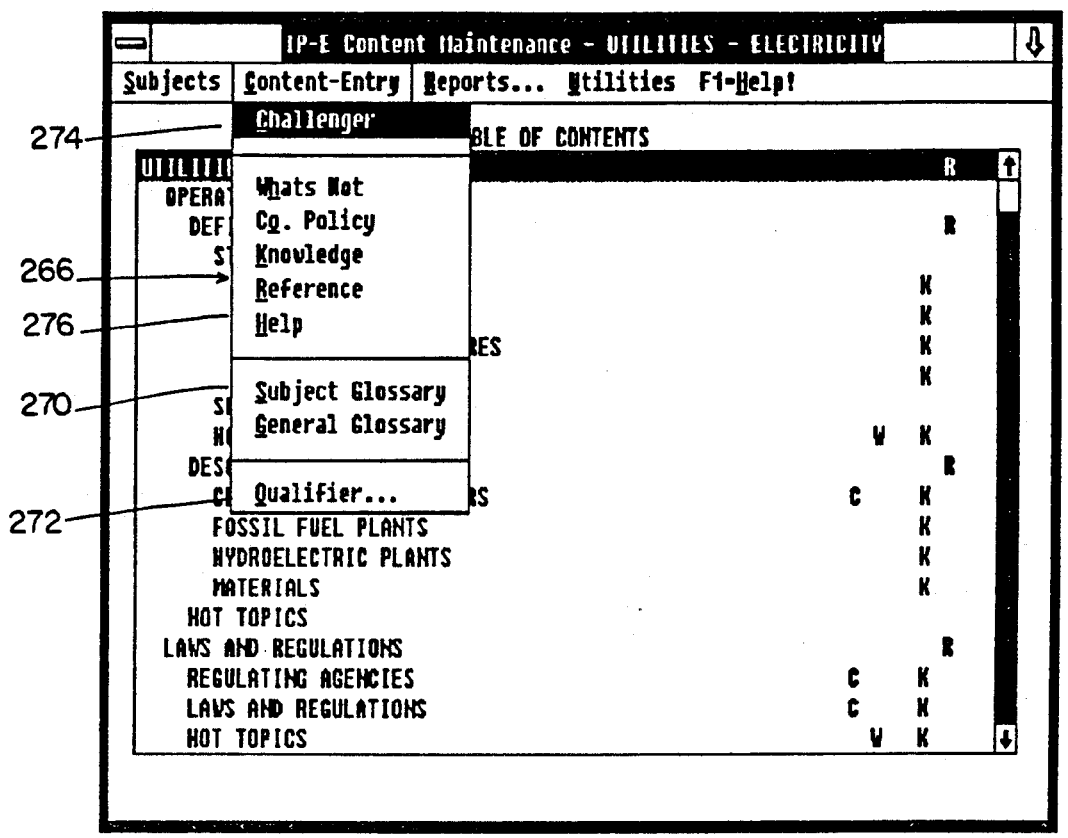
FIG. 30 is a screen display from the Content Maintenance portion of the Maintenance Component, for selecting a category whose content is to be added to or changed.
Figure 31:
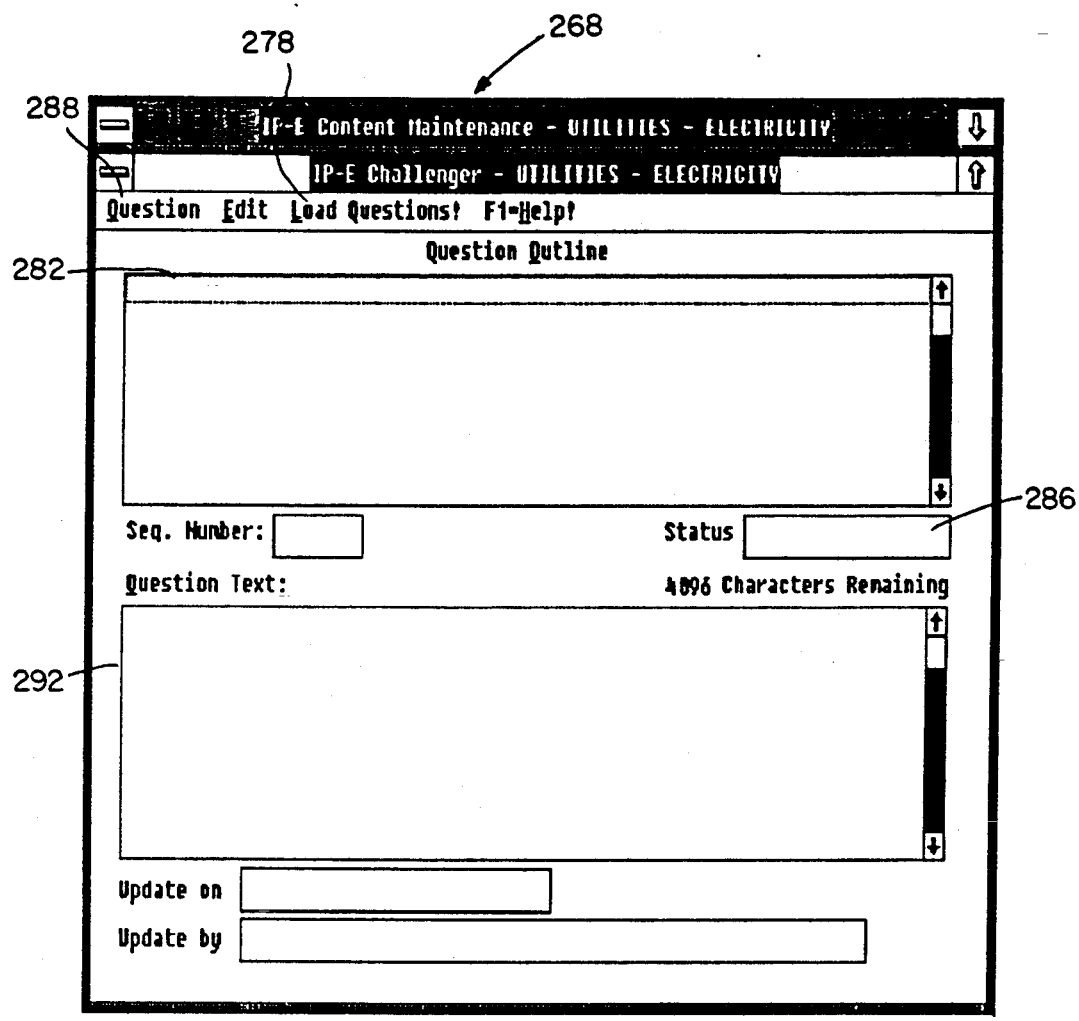
FIGS. 31, 32, and 33 are screen displays from the Content Maintenance portion of the Maintenance Component, for adding or changing the prompts or questions in the Challenger mode of the user component.
Figure 34:
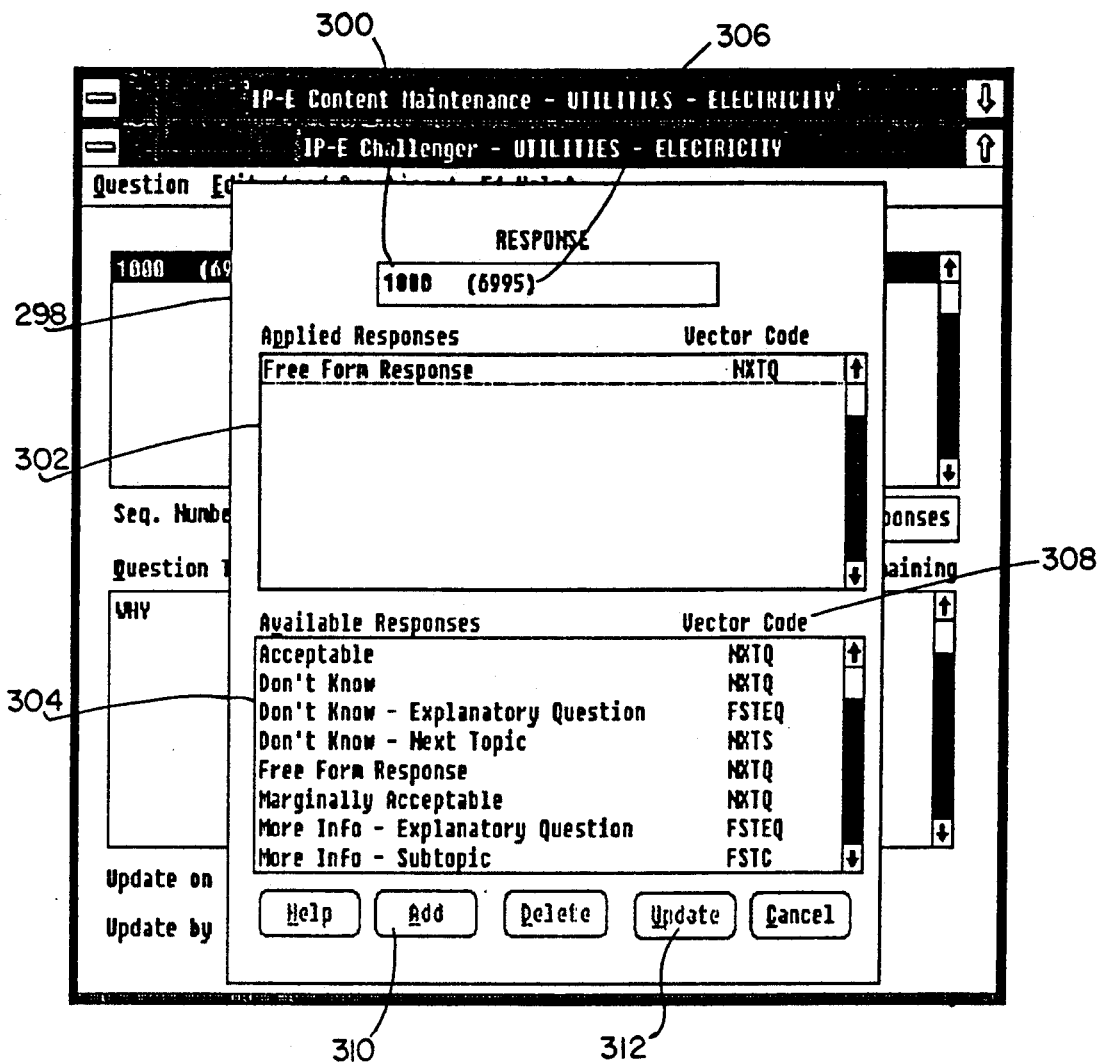
FIGS. 34 and 35 are screen displays from the Content Maintenance portion of the Maintenance Component, for establishing the available user responses to Challenger prompts or questions.

FIG. 31 shows the Challenger Content Entry window as it appears when a topic was highlighted in the main window (FIG. 29) and Challenger 274 was selected from the content entry menu 266 (FIG. 30). Once Load Questions 278 has been clicked on, the question outline box 282 in the upper portion will display the sequence numbers of any questions that currently exist for the selected topic. (If none exists, the box will be blank as shown). The status box 286 indicates the loading has been completed. The question menu 288 is used to add, change, or delete Challenger questions. To add a question, the Knowledge Engineer clicks on question 288, then Add Question (same level) 290 from the pull-down menu 280 (see FIG. 32) that appears. The words "New Question" appear in the question outline field 292 (FIG. 33), and a sequence number is assigned 284, indicating that a new question is being added (Fig. 33). The actual question is entered by placing the cursor in the question text box 294, clicking on it, and typing in the question. After clicking on Question, then Update Changes from the pull-down menu that appears, the question is entered into the system and a Response window 298 appears (FIG. 34) for the Knowledge Engineer to select associated responses (FIG. 34).

The sequence and content information unit number 306 of the question are displayed at the top of the box for reference. Note that the question is thus a different information unit from the associated responses.

The Response boxes 302,304 contain two lists of responses. At the bottom 304, Available Responses lists those from which the Knowledge Engineer may select. At the top 302, Applied Responses are those responses already associated with the question. For a new question, the list of Applied Responses will initially be blank. Each available response has a corresponding vector code 308, which defines the branching activity that occurs when the response is selected by the end-user.

Figure 35:
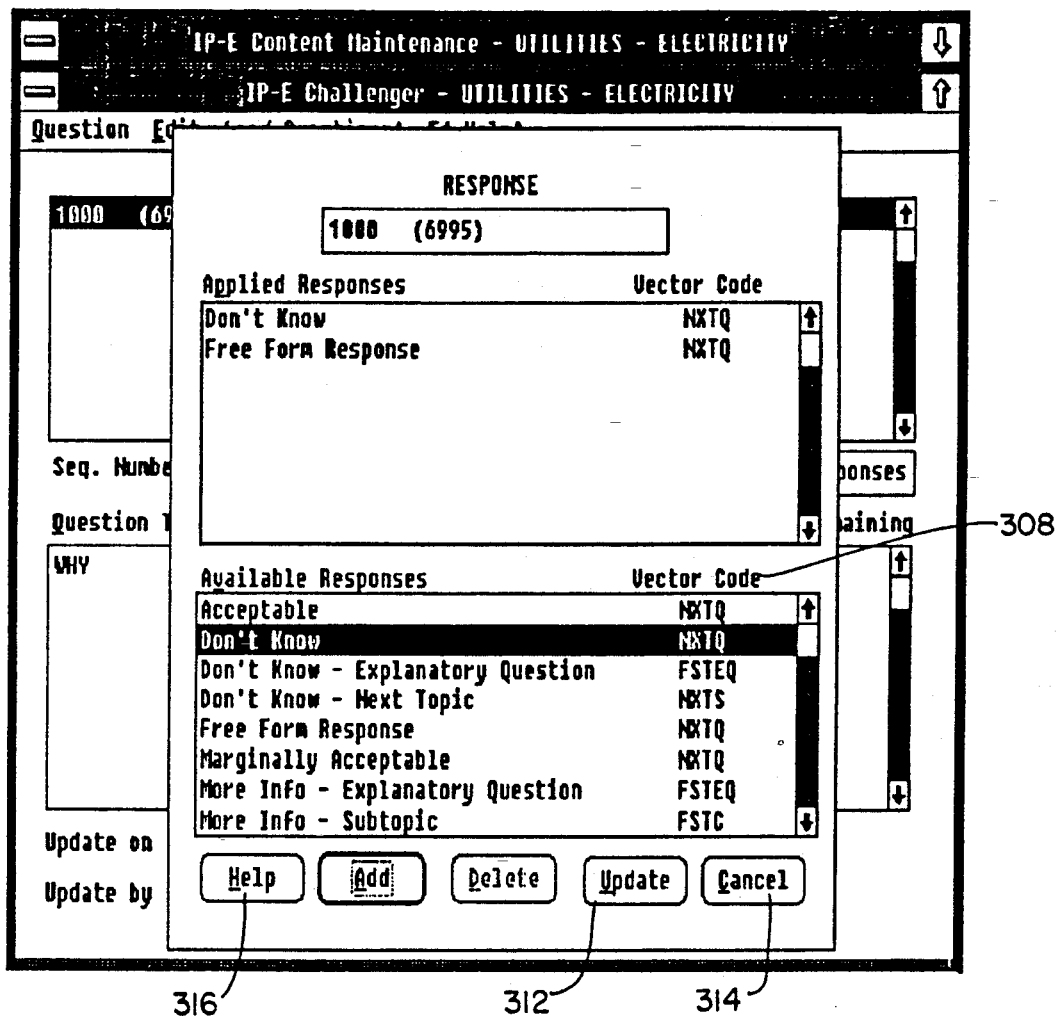

To assign a response, it is highlighted in the Available Responses list box 304 and the Add push-button 310 is clicked on. This causes the highlighted response to be added to the list of Applied Responses 302. Conversely, highlighting an Applied Response and clicking on Delete causes that highlighted response to be deleted from the applied list. The Applied Responses are those that will be displayed to the end-user with its associated Challenger question. Additional responses may be added or deleted, one at a time, until all desired responses have been applied. When the list of Applied Responses is complete, the list is saved in the data base by clicking on the Update push-button 312 which then automatically returns the Engineer to the Challenger Content Entry Window 280 (FIG. 32). The Cancel push-button 314 (FIG. 35) returns to the Challenger Window without saving any of the proposed new responses. The Help push-button 316 (FIG. 35) provides explanations of the vector 308 of the highlighted response. Each applied response is stored as an information unit, associated with a particular question and having a vector index.

Figure 36:
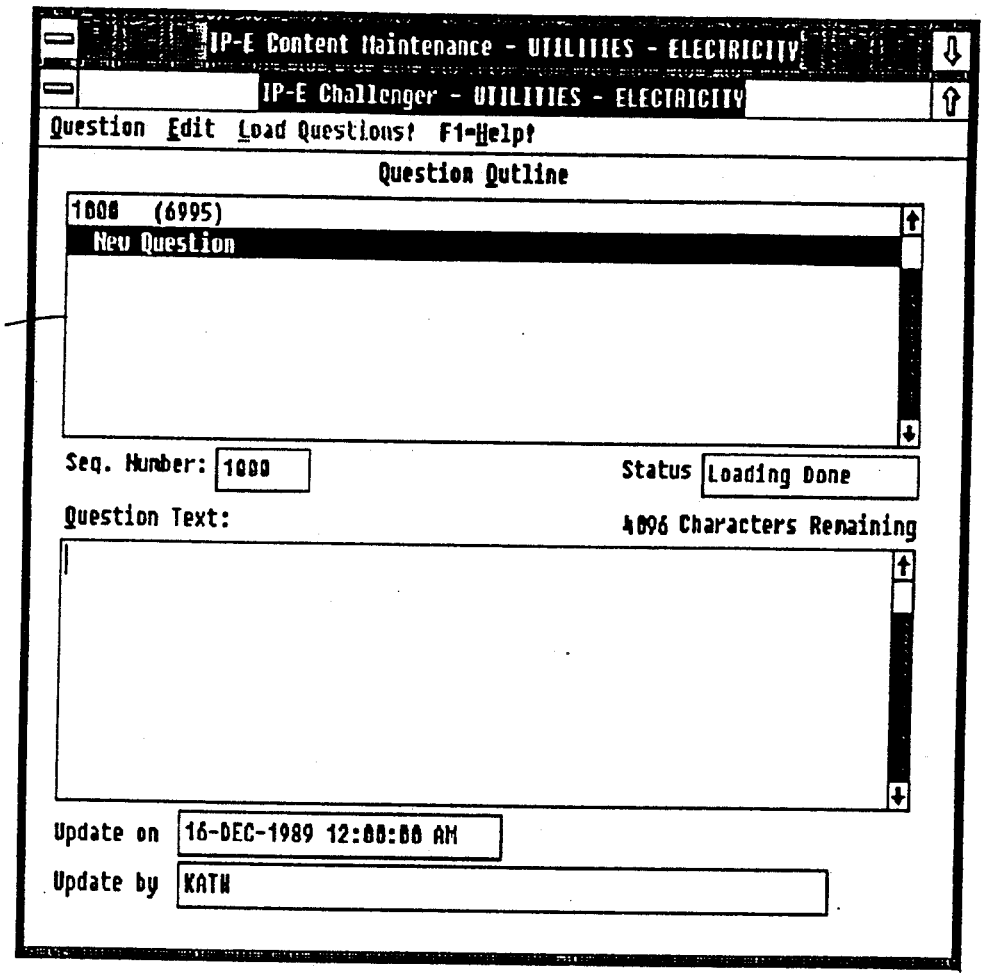
FIG. 36 is a screen display from the Content Maintenance portion of the Maintenance Component, for adding a new prompt or question in Challenger.

When the Challenger question and its associated responses are saved, the Knowledge Engineer may begin entering any related Explanatory questions. Not all Challenger questions will have Explanatory questions; this is determined by the content developer. The first Explanatory question is added by highlighting its related Challenger question sequence number in the Question Outline field 282 (FIG. 31). This causes the highlighted Challenger question to appear in the box 292 at the bottom of the screen. Add Question (Next Level) 318 is then generated from the Question menu 280 (FIG. 32). This creates a space 320 marked "New Question" at the next level below the Challenger question, as shown in FIG. 36.

Explanatory questions at one or several levels may continue to be added as described for Challenger questions until all questions have been completed and responses selected.

To ensure a meaningful conversational flow between the user and the system in the Challenger mode of the User Component, the Knowledge Engineer chooses the responses to each question carefully, not only for their appropriateness to the question, but for the vector, or "branching" code 08 associated with each. This code is very important because it determines which question will next be displayed to the user.

The first vector is NXTQ—Next Question (Challenger or Explanatory). If the user selects a response with this vector, the system presents the next topic question of the same type in sequence. In other words, if the displayed question is a Challenger question, the next Challenger question for the current topic will be displayed; if the displayed question is an Explanatory question, it will present the next Explanatory question available. If the last displayed Challenger question is the last for the topic, the first question of the next sibling or higher level topic in the topic structure will appear (whichever comes first in the topic hierarchy). If the last display is an Explanatory question, the original Challenger question to which it is related will reappear to the user for a new response.

The second vector is FSTEQ—First Explanatory Question. If the selected response has this vector, the system will present the first Explanatory question associated with the displayed question. (If no Explanatory questions exist for the one displayed, a response with this vector should not be assigned by the Knowledge Engineer).

The third vector is NXTS—Next Sibling/Higher Topic. If the selected response has this vector, the system displays the first Challenger question of the next sibling topic, or, if none exist, the next higher level topic in the Table of Contents, thereby skipping over any remaining Challenger and Explanatory questions for the current topic and all its subtopics.

The last vector is FSTC—First Child Topic. This vector causes the system to display the first Challenger question of the first subtopic of the currently displayed topic. This is often used when the Challenger question is the last one in the topic. If used on other than the last question, it will cause Challenger to skip over any remaining questions in the topic and display the first question of the first child topic. (If no subtopic exists for the current topic, a response with this code should not be assigned by the Knowledge Engineer.)

It should be appreciated that changing the order of questions, deleting questions, rewriting or changing the question and changing the responses, can be accomplished in a straight forward manner once the sequence for entering a question initially and its responses has been understood.

Figure 37:
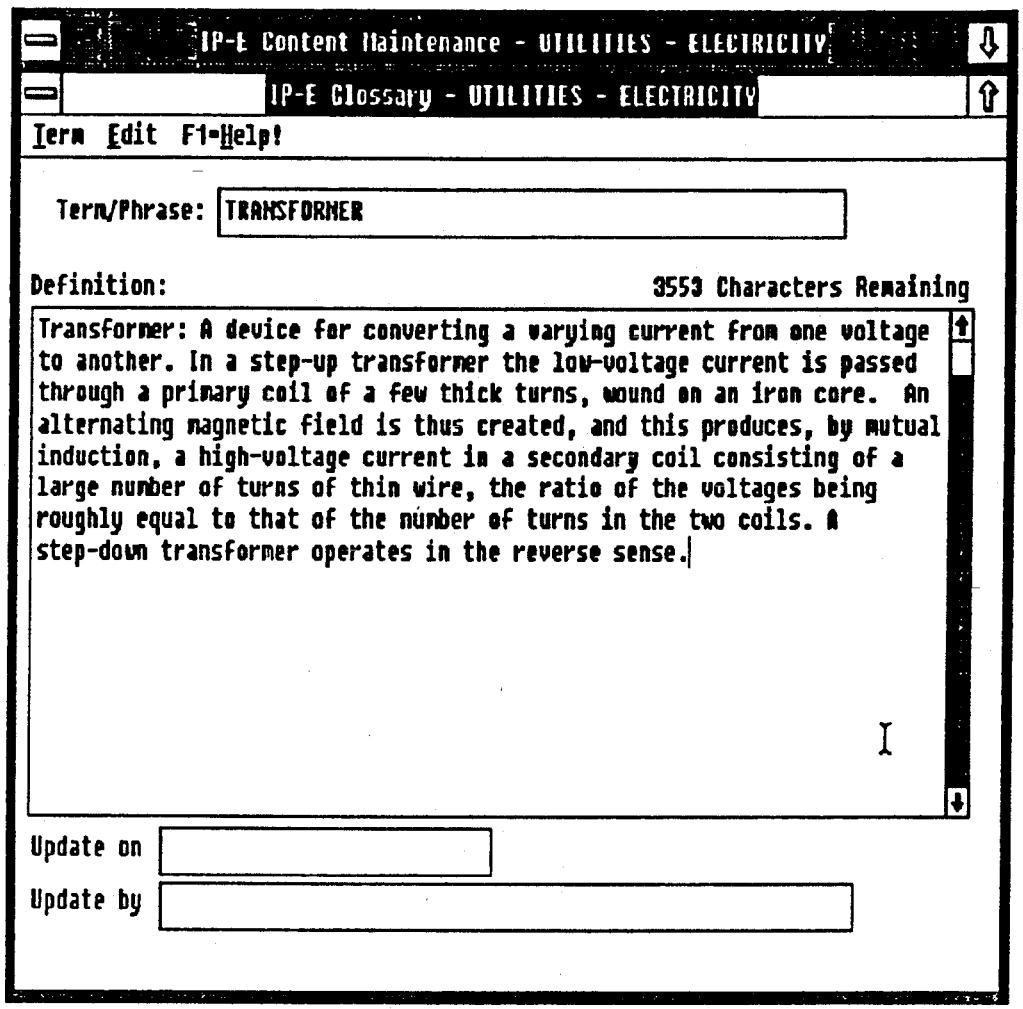
FIG. 37 is a screen display from the Content Maintenance portion of the Maintenance Component, by which the knowledge engineer enters a term and its definition for a glossary category of the Knowledgebase.

Referring again to the types of content entries available from the options shown in FIG. 30, the glossary content procedures differ from those of the other content categories of the system. Unlike the cross-referenced units, glossary content is not associated with individual topics in an outline. To enter content into the General Glossary, which serves all subjects in the entire knowledge base of the system, the General Glossary is selected from the window 270 in FIG. 30, whereas for the Subject Glossary, whose content is available only to one subject, the corresponding entry is selected from window 270. Once this selection has been made, the procedures for entering content into either glossary is the same. A set of straight forward prompts assist the Knowledge Engineer in entering a term and its definition, as shown in FIG. 37.

The final content entry procedure relates to assigning qualifiers to topics. Qualifiers limit the cross-referenced information units accessible to a user who applies them to a particular session. Qualifiers are assigned to topics by the Knowledge Engineer and are defined by the knowledgebase tables maintained by the System Administrative component.

Figure 38:
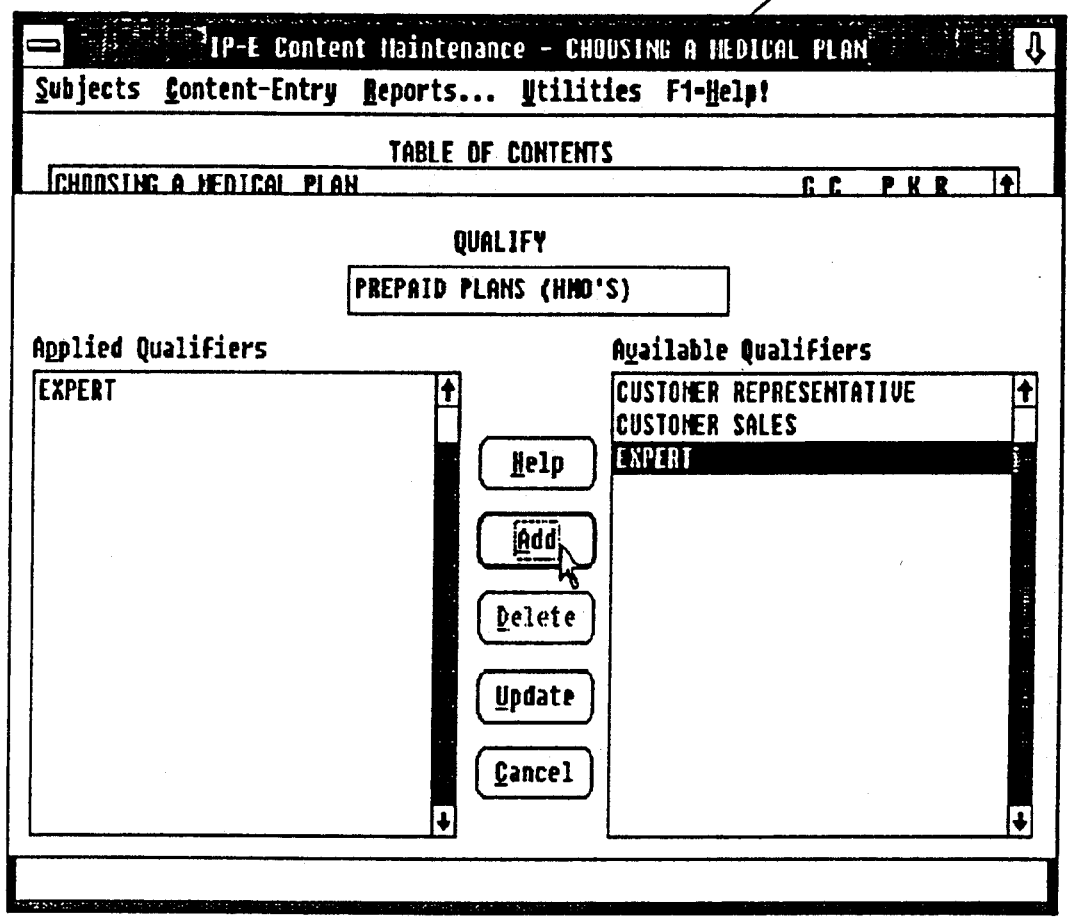
FIG. 38 is a screen display of the Content Maintenance portion of the Maintenance Component, by which the knowledge engineer assigns a qualifier to a particular topic node.

To qualify a topic or subtopic, the Content Maintenance main window (FIG. 29) is located, the desired topic is highlighted and content entry is clicked on. A further click on qualifier 272 (FIG. 30) brings up the Qualifier box 322 (FIG. 38). On the left is a list of Applied Qualifiers; to the right a list of Available Qualifiers. To assign the Qualifier, the Knowledge Engineer highlights the desired one in the Available Qualifier's list and clicks on add. Additional Qualifiers can be added in a similar fashion. Conversely, assigned Qualifiers can be removed by highlighting them in the Available Qualifiers box and clicking on Delete. When the list of Applied Qualifiers is completed, it may be saved in an index file in the data base by clicking on Update. Each qualifier is thus an index associated with a topic and its cross-referenced information units.

V.A.3. Reports

Once the Subject outline and content have been created or modified by the Knowledge Engineer, they can be verified by the Content Reports function which produces hard copy of all informational units for topic order. This feature also permits viewing prior to printing with a cancel feature should an actual hard copy edition not be required.

V.A.4. The Administrative Component

The Administrative Component 14 represented in FIG. 1 comprises three separate programs to maintain the tables that define key database variables. Accessible only to an authorized Administrator or designated Supervisor for that database, these tables provide system access security and selections for authorized knowledge engineers, users and supervisors. These tables are electronically stored with the knowledgebase with which they are associated and are used by each of the system's three components to ensure data integrity.

The Session Maintenance program allows Administrators and Supervisors access to a log of stored Challenger sessions. This log acts as a master list of all stored user sessions and allows for easy purging of single or multiple sessions that are no longer needed.

The User Maintenance program identifies each system user by name, password ID, and system user type (User, Supervisor, etc.). Additionally, Users and Supervisors may also have entries for default qualifiers. When default qualifiers are listed, they are automatically applied to users sessions to customize that user's view of the knowledgebase. This feature serves as a convenience to those users who may use the same qualifiers frequently by eliminating the need for manual selection.

In a standard version of the knowledge system, the System Table Maintenance program maintains three basic tables, the content of which is used by Knowledge Engineers. Response table entries list predefined user responses that content developers select and apply to Challenger questions or prompts. The User component then displays these associated Challenger prompts with their associated user responses for multiple-choice User selection. The Qualifier table defines the qualifiers or filters that may be applied to topics by the content developer. Once applied, users, beginning a new work session in the User Component, may select one or more to customize their view of the knowledgebase. The Release Look Table provides a facility to notify end-users of recent changes to the knowledgebase. Since the date of every update to an informational unit is saved by the system, this table allows Administrators to specify a range of dates in which topic changes were made, and to enter a text message to explain these changes to end-users. Then, an end-user selecting the New Release function of Browse mode is automatically displayed this explanatory message, followed by a display of the Table of Contents that marks each changed topic with an asterisk.

In a custom version of the knowledge system, two additional tables may exist. The Vector Table allows changes to the list of vectors predefined in the code of the program that may be provided to Knowledge Engineers for association with responses. The System Help Table allows for client creation and maintenance of Help Window text modules that explain system commands and menu items to users of all three Components.

In summary, the Administrative Component establishes users, qualifier, Challenger responses and maintains Challenger session activity, all with the use of easy table selection and updating techniques. Qualifier tables define the qualifiers or topic filters that are to be applied to topics in the knowledgebase for customized user view of the information. They are applied to topics by knowledgebase developers and selected by users at the start of a new Challenger session. User tables identify authorized users individually by name, password, system user type, and default qualifiers to be applied to his/her user sessions at logon. This is used as an identification check for each component accessing the knowledgebase. Response table entires contain available responses that the content developer can selected to be shown to users with a prompt or question, the vector or branching code associated with that response to determine which prompt or question is to be displayed next, and optional help messages to explain the responses to users. The Session Maintenace function allows for purging of unwanted stored Challenger activity.

V.B. Structure

Figure 39:
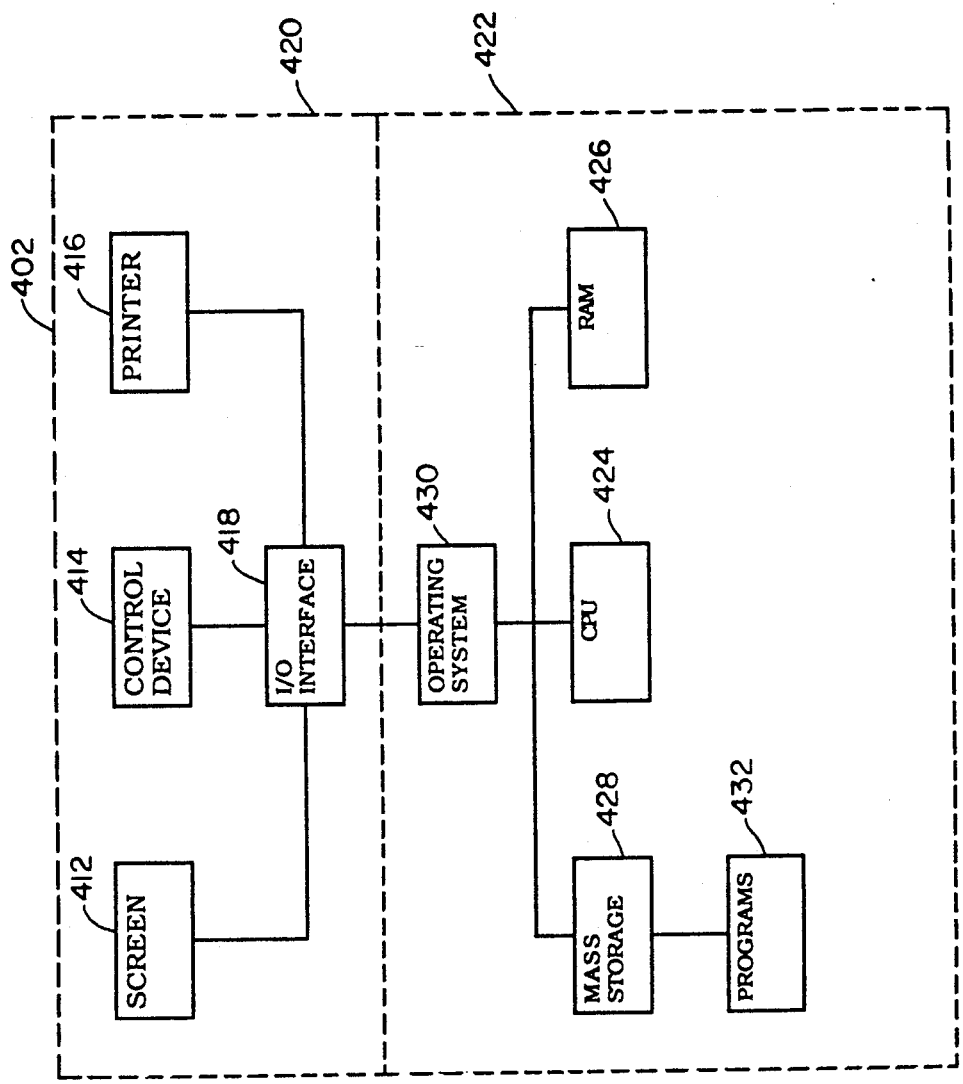
FIG. 39 is a schematic representation of the hardware devices which, together with the associated programs and data, are utilized for implementing the invention in the form shown in FIG. 2.

The following description should be understood as referring to the invention at a point in time when the knowledge system has been delivered and installed as a development tool to a user organization (client), and is ready for use by the client in the Development Configuration. As shown in FIGS. 2 and 39, the knowledge system would be installed on a local area network (LAN) 400 having, for example, five PC workstations, including a user workstation 402, a supervisor/manager workstation 404, an administrator workstation 406, knowledge engineer's workstation 408, and a database server 410.

As shown in FIG. 39, the typical workstation 402 of the type shown in FIG. 2A includes a display screen 412, a control device 414 such as a keyboard and/or "mouse", and optionally a printer 416, all of which are connected to an input/output interface 418. The devices 412-418 taken together as terminal 420, are connected integrally by wire or remotely by modem to the computer 422 which, for present purposes, is assumed to include the combination of hardware and software including a central processing unit 424, a working or random access memory 426, a mass storage memory 428, and an operating system program 430 for controlling the interaction of the input/output interface, working memory, and mass memory with the central processing unit. The mass storage device, such as a hard disk, is adapted to store application programs 432 (and data in the stand-alone environment shown in FIG. 2B). The terminal 420 and computer 422 described with respect to FIG. 39, represent commonly available hardware.

As a foundation for the description of how the knowledge system 10 (FIG. 1) is developed, applicant incorporates by reference herein the Technical Summaries for the SQLBase Relational Database Server and SQLWindows Application Development System, available from Gupta Technologies, Inc., Menlo Park, California. SQLBase is a multi-user relational database management system, for which SQL Windows, its associated language, enables professional programmers to create end user application systems. As set forth in the SQLBase Technical Summary, SQL Network can be used in conjunction with SQLBase for connectivity of a personal computer application system to remote mini and main frame computers and SQR and SQRW provides the report writing facility.

It should be understood that the terms "program", "module", and "tables" should not necessarily be considered mutually exclusive or otherwise unnecessarily limited. As is well known in the field of computer science, particularly database management applications, the designer of the database has a variety of options for the data structure or format by which each byte of instruction or data is digitally stored on the disk. Moreover, the manner in which the data are stored can vary depending on the optimization choices of the designer.

With reference again to FIGS. 2 and 39, the workstations 402, 404, 406, 408, and optionally the database server 410, have several layers of programs 432 layered on the operating system 430. The preferred operating system program 430, MS-DOS, typically is bundled at the time the user purchases the terminal hardware. The Microsoft Windows program 436 can be purchased by the end user on the open market. The SQL Windows 438 and SQL Base 440, SQR/SQRW 442 programs are available from GUTPA Technologies. The application programs 444, 446, 448 provide the run time logic to implement the User Component, Maintenance Component, and Admin Component functionality of the present invention. This application program can be developed and coded in a straightforward manner by anyone ordinarily skilled in the field of database management, who is familiar with data modeling to define data items in the third normal form, relational database table handling, SQL Base or a comparable relational database management system, SQL Windows or other fourth or higher generation language, and Microsoft Windows or a comparable display/presentation manager, and has access to the information contained in the present specification and drawings.

The database server workstation 410 contains SQL Base or equivalent means for storing data in a relational database. The database server 410 contains a variety of tables generally divisible as between information tables and outline tables, which are part of the knowledge base, and session tables, which are part of the session base. The other workstations would not normally have data stored in SQL Base tables. The information content in the information tables is typically in the form of text. The outline tables define the subject outline, with each entry viewed as a node, along with relationships such as the association with a particular category, and thus implies the available navigational paths among nodes. A list of tables for use in a full knowledge system of the type shown in FIG. 1, appears immediately below. The tables are listed in an order such that the table is presented before it is used in a relationship with another table.

EXEMPLARY LIST
OF TABLES IN THE SQL DATABASE SERVER

| Table No. | Table Name |
| --- | --- |
| 1 | System Assign Table |
| 2 | Text Module |
| 3 | Response |
| 4 | Question/Response |
| 5 | Question/Question |
| 6 | Glossary |
| 7 | Qualifier |
| 8 | Node |
| 9 | Node/Qualifier |
| 10 | Node/Question |
| 11 | Node/Glossary |
| 12 | User |
| 13 | User/Qualifier |
| 14 | Vector |
| 15 | Session |
| 16 | Session/Qualifier |
| 17 | Session/Log |
| 18 | Release Log |
| 19 | System Help |

A significant advantage of the structure of the invention from the point of view of the System Manager and the Knowledge Engineer, is that the information units are stored in tables separate from the relational linkage (indices) and navigational vectors. Even the responses for questions in Challenger are preferably stored in a separate table, such that alteration or maintenance of the questions and answers, and the navigational paths, are easily accomplished by redefining the relationships and linkages, rather than by extensive reprogramming of interrelated logical relationships.

We claim:

1. In a knowledge system for making available to each of a plurality of end users in an organization, a shared digital database of content information concerning a plurality of subjects relevant to the organization, the knowledge system having a computer and related hardware including means for storing a plurality of programs including an operating program for carrying out digital processing functions of the knowledge system and a plurality of application programs interacting with user interface means for selectively accessing and presenting information in the data base to the end users, the knowledge systems having a plurality of program modules including a combination of stored program instructions and computer hardware for performing a specified application function in the knowledge system, the improvement wherein the plurality of program modules comprises:

a subject outline module for,
    defining a plurality of said subjects,
    defining a plurality of topics, each topic being associated with one of the subjects,
    defining a plurality of subtopics, each subtopic being associated with one of the topics,
    wherein each topic and subtopic is digitally stored and associated as a node in a hierarchical outline of a subject;

an information content module having predetermined information content associated with each node, said information content being digitally stored as a plurality of information units, each information unit being a predetermined, associated subset of a category of information, and each category of information being a predetermined subset of one of at least to two types of information, the types of information including,
    a cross reference type which includes a plurality of cross-referenced categories in which each information unit is associated with only one node and with all other cross reference category information units that are associated with said one node, and
    a general type which includes at least one general category in which each of the information units which is not in the cross reference categories, is associated with all nodes of a subject;

a navigation module responsive to the user interface means and interacting with the subject outline module and the information content module for the end user to, select a subject and node for which the associated information units are to be presented, select a particular information category associated with the selected node to be presented, such that the knowledge system presents to the end user a particular information unit in the selected category that is associated with the selected node, select one of a plurality of options while said particular information unit is presented to the end user, including accessing and being presented with at least one of the information units in a cross-referenced type category, which is associated only with the selected node, and then returning to said particular information unit, and accessing and being presented with at least one of the information units in a general type of category and then returning to said particular information unit.

2. The system of claim 1, wherein the information units in one of the categories in the data base includes a pattern of knowledge system prompts and possible end user responses relating to a topic node.

3. The knowledge system of claim 1, wherein one of the general type of categories includes definitions concerning said subject.

4. The system of claim 1, wherein said plurality of options includes selecting any other node of the selected subject, for presentation of the information units associated only with said other node.

5. In a knowledge system development platform for use by a developer in an organization who is to construct a knowledge base of information content that is accessible by end users in the organization for selectively accessing the information, the platform including a digital computer for performing digital data processing functions including executing logical operations in a processing unit, a computer operating system program for carrying out the digital processing functions of the computer, means for storing a plurality of computer application programs each including a set of coded instructions defining logical operations to be performed in the processing unit, means for storing a data base, and interface means including a display device for the developer to interact with the computer and programs, the improvement wherein the means for storing a data base contains relational data base tables each having a plurality of rows for receiving and storing data entered by the developer, said data tables including, an outline table for storing data defining a subject outline consisting of a plurality of nodes each corresponding to one position in a hierarchy of topics and subtopics wherein the topics are related to the subtopics as parent and child, and the topics are related to other topics, as siblings, information tables for storing data that specify information units, each information unit defining a self-contained field of information content about the subject; and linkage tables that associate each of the nodes of the outline table with at least two information units in the information table;

the means for storing the computer applications programs contains, a graphics definitions program interacting with the operating system program, an application logic program interacting with the database, a database management system program interacting with the logic program, and a language interpreter program interacting with the data base management system program, the logic program, and the graphics definition program; and the stored computer applications programs, the means for storing a data base and said interface means, operate together as a developer module for the developer to enter said data into the data base tables without changing the coded instructions in the stored applications programs.

6. The development platform of claim 5, wherein the linkage tables associate each node of the outline table with at least two categories of information units, and each information unit is associated with a node by the association of the information unit with only one category of information.

7. The development platform of claim 5, wherein said developer module includes means for generating a sequence of screen displays in the display device, each screen display constituting a data input form through which the developer makes additions to, changes in, or deletions from, data in said tables without changing the coded instructions in the stored applications programs.

8. The development platform of claim 5, wherein the developer module includes, an outline maintenance module including the outline tables and order identification means including at least one of the linkage tables, for defining the hierarchical relationship of the nodes, for associating a subject, topic, or subtopic name to each node, and for adding, changing, deleting and modifying the hierarchical relationship of the nodes, and a content maintenance module including the information tables and content identification means including at least one of the linkage tables for defining said relationship of each information unit with at least one node, and means for defining user navigation options by which the user can access different information units in a user selected sequence.

9. The development platform of claim 8, wherein the linkage tables associate each node of the outline table with at least two categories of information units, and each information unit is associated with a node by the association of the information unit with only one category of information.

10. An interactive learning system for an end user to acquire knowledge about a particular subject, comprising:

a general purpose digital computer and associated operating system adapted to execute and be controlled by a plurality of related stored programs accessible to the computer, including a relational data base management program, a user interface program, and a learning application program;

an end user terminal having input means for the end user to control the interface program and output means including a presentation device for the interface program to communicate with the end user by stimulating the end user's sensory perceptions;

a relational data base containing said knowledge in the form of digitally stored data selectively retrieved by the end user through said related stored programs for communication of the knowledge to the end user at said terminal, said data including, data that specify nodes of a hierarchical outline of preestablished topics and subtopics relevant to said subject;

data that specify a list of a plurality of categories of information concerning said subject, each category containing a plurality of preestablished information units, each information unit defining a self-contained field of information content about the subject that is retrieved by and presented to the user, and data that specify a preestablished association of each node of the outline with an information unit in each of at least two categories;

wherein the terminal, stored programs, and data base define a navigation module including, first means, for the end user to be presented with said hierarchical outline of topic and subtopic nodes, second means, for the end user to be presented with said list of categories, third means, for the end user to select one of said nodes and one of said categories, fourth means, responsive to the third means, for presenting to the end user a firs information unit that is associated with said selected category and said selected node as preestablished by said data in the data base, and fifth means, for the end user to select, while presented with said first information unit, a second information unit that is also associated with said first node, and to be presented with the selected second information unit.

11. The learning system of claim 10, wherein the fifth means presents the first information unit and the second information unit simultaneously to the end user.

12. The learning system of claim 10, wherein said plurality of categories includes, a first category, containing information units that define at least one type of information content from the group consisting of facts, principles and descriptions concerning a subtopic, a second category, containing information units that define summaries of information that has recently become important concerning a subtopic, and a third category, containing information units which define a bibliography of sources of information available outside the system, concerning a subtopic.

13. The system of claim 10, wherein said fifth means in the navigation module includes means for the end user to optionally and repetitively implement the first through fifth of said means, for a plurality of nodes selected in any order by the end user.

14. The system of claim 10, wherein the data that specify a preestablished association include at least one qualifier table which associates each node with one or more optional qualifier entries, such that each end user may by activating such entries, limit the information units that are retrievable by said end user.

15. The system of claim 10, wherein one of the categories in the data base includes a plurality of information units associated so as to define a pattern of system prompts to the end user and possible end user responses relating to each topic node.

16. The system of claim 15, wherein the prompts are in the form of questions and the possible responses are in the form of several answers including a correct answer, and wherein at least some of the answers are related to an information unit of another category associated with said node.

17. The system of claim 15, wherein the data base includes at least three other categories of information in addition to said one category, and wherein at least one of the prompts and responses associated with a selected topic node, is also associated with an information unit in each of at least two of said other categories associated with said selected node.

18. The learning system of claim 15, wherein the navigation module includes a prompter module having, selection means for the end user to select one of the possible responses associated with a given prompt, and sequence logic means having vector codes associated with each response, for specifying another prompt to be presented to the end user.

19. The learning system of claim 11, wherein at least some nodes have a preestablished association with an information unit in each of at least three categories, and wherein said navigation module includes sixth means, for the end user to select a third category containing a third information unit that is also associated with said first node, and to be presented with the third information unit simultaneously with the selected first and second information units.

20. The system of claim 18, wherein
the prompter module includes
at least some primary prompts having an associated secondary prompt which clarifies the primary prompt, and the vector codes include,
a first set of codes which specifies a standard order of presentation of the prompts if the user does not request any secondary prompts,
a second set of codes which specifies the order of presentation of the secondary prompts if the user requests a secondary prompt,
a third set of codes which returns the user to the primary prompt from the response to the last of the associated secondary prompts, and
the navigation module includes
said fifth means, for the user to access all information units associated with the selected node, from every category in the knowledge base, while the user is considering the responses associated with a particular prompt, and
sixth means, for the user to override the vector codes and select any other node and category for study before responding to all prompts associated with the first selected node.

21. The system of claim 20, wherein the prompts are in the form of questions and the possible responses are in the form of several answers including a correct answer, and at least one of the prompts and responses are associated with at least one information unit of another category that is associated with said node.

22. A method for an end user to use an interactive learning system to acquire knowledge about a particular subject, the system including a general purpose digital computer and associated operating system adapted to execute and be controlled by a plurality of related stored programs accessible to the computer, the programs including a relational data base management program, a user interface program, and a learning application program; an end user terminal having input means for the end user to control the interface program and output means including a presentation device for the interface program to communicate with the end user; a relational data base containing said knowledge in the form of digitally stored data selectively retrieved by the end user through said related stored programs for presentation of the knowledge to the end user at said terminal, said data including data that specify nodes of a hierarchical outline of preestablished topic and subtopic names relevant to said subject, data that specify a list of a plurality of categories of information concerning said subject, each category containing a plurality of preestablished information units, each information unit defining a self-contained field of information content about the subject that is retrievable by and presentable to the user, and data that specify a preestablished association of each node of the outline with an information unit in each of at least two categories; wherein the method comprises the end user operating the user terminal by:

retrieving and being presented, a list in outline form, of the name at each node;

selecting for a given name, a first category of information, and being presented a first information unit; and while being presented with said first information unit from the first category, selecting at least a second category associated with said name, and being presented at least a second information unit;

wherein the step of selecting the first category includes the step of electing a category in which the first information units are presented as a pattern of prompts and possible responses including a preferred response, and the step of selecting a second category includes selecting and being presented with another information unit which contains information that assists the user in selecting the preferred response to the prompt.

23. A computer system including an interactive knowledge support system for making available to each of a plurality of computer system end users in an organization, a shared digital database of content information concerning a plurality of subjects for which the computer system is used by the organization, wherein the computer system comprises:

computer hardware operationally under the control of a plurality of stored programs including an operating system program for carrying out digital processing functions of the system and a plurality of applications programs interacting with user interface means for selectively accessing and presenting information in the data base to the end users, including a relational data base management program, a user interface program, and a knowledge association program to provide run time logic;

said interface means including an end user terminal having input means for the end user to control the interface program and output means including a presentation device for the interface program to communicate with the end user by stimulating the end user's sensory perceptions;

a relational data base containing said knowledge in the form of digitally stored data selectively retrieved by the end user through said related stored programs for communication of the knowledge to the end user at said terminal, said data including, data that specify nodes of a hierarchical outline of preestablished topics and subtopics relevant to said subject;

data that specify a list of a plurality of categories of information concerning said subject, each category containing a plurality of preestablished information units, each information unit defining a self-contained field of information content about the subject that is retrieved by and presented to the user, and data that specify a preestablished association of each node of the outline with an information unit in each of at least two categories;

wherein the terminal, stored programs, and data base define a navigation module including, first means, for the end user to access data which specifies one of the nodes of the hierarchical outline of topic and subtopic nodes, second means, for the end user to be presented with said list of categories, third means, for the end user to select one of said categories, fourth means, responsive to the third means, for presenting to the end user a first information unit that is associated with said selected category and said accessed node as preestablished by said data in the data base, and fifth means, for the end user to select, while presented with said first information unit, a second information unit that is also associated with said accessed node, and to be presented with the second information unit.

24. A method for an end user to use an interactive learning system to acquire knowledge about a particular subject, the system including a general purpose digital computer and associated operating system adapted to execute and be controlled by a plurality of related stored programs accessible to the computer, the programs including a relational data base management program, a user interface program, and a learning application program; an end user terminal having input means for the end user to control the interface program and output means including a presentation device for the interface program to communicate with the end user; a relational data base containing said knowledge in the form of digitally stored data selectively retrieved by the end user through said related stored programs for presentation of the knowledge to the end user at said terminal, said data including data that specify nodes of a hierarchical outline of preestablished topic and subtopic names relevant to said subject, data that specify a list of a plurality of categories of information concerning said subject, each category containing a plurality of preestablished information units, each information unit defining a self-contained field of information content about the subject that is retrievable by and presentable to the user, and data that specify a preestablished association of each node of the outline with an information unit in each of at least two categories; wherein the method comprises the end user operating the user terminal by:

retrieving and being presented, a list in outline form, of the name at each node;

selecting for a given name, a first category of information, and being presented a first information unit; and while being presented with said first information unit from the first category, selecting at least a second category associated with said name, and being presented at least a second information unit;

wherein the steps of selecting a first category and selecting at least a second category, includes selecting second and third categories, the information unit in said second category being associated uniquely with said name, and the information unit associated with said third category being associated with every name.

* * * * *